US007501373B1

(12) United States Patent  (10) Patent No.: US 7,501,373 B1
Nakajima et al.  (45) Date of Patent: Mar. 10, 2009

(54) POLYMERIZATION CATALYST FOR POLYESTER PRODUCTION, POLYESTER, AND PROCESS FOR PRODUCING POLYESTER

(75) Inventors: Takahiro Nakajima, Ohtsu (JP); Shoichi Gyobu, Ohtsu (JP); Hiroaki Taguchi, Ohtsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/830,223

(22) PCT Filed: Oct. 25, 1999

(86) PCT No.: PCT/JP99/05866

§ 371 (c)(1),
(2), (4) Date: Nov. 18, 2003

(87) PCT Pub. No.: WO00/24804

PCT Pub. Date: May 4, 2000

(30) Foreign Application Priority Data

| Oct. 23, 1998 | (JP) | ............... | 10-302692 |
| Nov. 18, 1998 | (JP) | ............... | 10-328596 |
| Nov. 18, 1998 | (JP) | ............... | 10-328597 |
| Nov. 18, 1998 | (JP) | ............... | 10-328598 |
| Dec. 7, 1998 | (JP) | ............... | 10-347450 |
| Dec. 7, 1998 | (JP) | ............... | 10-347451 |
| Dec. 8, 1998 | (JP) | ............... | 10-348970 |
| Apr. 12, 1999 | (JP) | ............... | 11-104490 |
| May 14, 1999 | (JP) | ............... | 11-134878 |
| May 17, 1999 | (JP) | ............... | 11-135258 |
| Sep. 10, 1999 | (JP) | ............... | 11-257900 |
| Sep. 17, 1999 | (JP) | ............... | 11-264029 |
| Sep. 17, 1999 | (JP) | ............... | 11-264031 |
| Sep. 17, 1999 | (JP) | ............... | 11-264032 |
| Sep. 20, 1999 | (JP) | ............... | 11-265716 |
| Sep. 21, 1999 | (JP) | ............... | 11-267420 |
| Sep. 24, 1999 | (JP) | ............... | 11-270792 |
| Sep. 24, 1999 | (JP) | ............... | 11-270793 |
| Sep. 24, 1999 | (JP) | ............... | 11-270794 |
| Sep. 24, 1999 | (JP) | ............... | 11-270795 |
| Sep. 29, 1999 | (JP) | ............... | 11-277399 |

(51) Int. Cl.
*B01J 31/00* (2006.01)
(52) U.S. Cl. .............. 502/150; 502/156; 502/157; 502/167; 502/171; 502/172; 528/275; 528/285; 528/288; 528/302
(58) Field of Classification Search .......... 502/156, 502/157, 167, 171, 172; 528/275–285, 308, 528/288
See application file for complete search history.

(56) References Cited

U.S. PATENT DOCUMENTS

| 3,528,945 | A | * | 9/1970 | Price et al. | .............. | 528/282 |
| 3,528,946 | A | * | 9/1970 | Price et al. | .............. | 528/277 |
| 3,533,973 | A | * | 10/1970 | Price et al. | .............. | 528/282 |
| 4,101,517 | A | | 7/1978 | Ort | | |
| 4,565,845 | A | * | 1/1986 | Inoue et al. | .............. | 525/25 |
| 4,829,113 | A | | 5/1989 | Rosenfeld | | |
| H766 | H | | 4/1990 | Yu | | |
| 5,237,042 | A | | 8/1993 | Kim et al. | | |
| 5,260,246 | A | * | 11/1993 | Yuo et al. | .............. | 502/167 |
| 5,326,831 | A | | 7/1994 | Yezrielev et al. | | |
| 5,334,671 | A | | 8/1994 | Yezrielev et al. | | |
| 5,391,700 | A | * | 2/1995 | Itoh et al. | .............. | 528/297 |
| 5,512,340 | A | | 4/1996 | Goodley | | |
| 5,554,720 | A | | 9/1996 | Weaver et al. | | |
| 5,561,183 | A | * | 10/1996 | Kwon et al. | .............. | 524/413 |
| 5,596,069 | A | | 1/1997 | Goodley | | |
| 5,652,033 | A | | 7/1997 | Goodley | | |
| 5,674,801 | A | | 10/1997 | George | | |
| 5,693,786 | A | * | 12/1997 | Tanaka et al. | .............. | 536/107 |
| 5,719,214 | A | * | 2/1998 | Tanaka et al. | .............. | 524/47 |
| 5,744,572 | A | | 4/1998 | Schumann et al. | | |
| 5,770,682 | A | | 6/1998 | Ohara et al. | | |
| 5,782,935 | A | | 7/1998 | Hirt et al. | | |
| 5,847,011 | A | | 12/1998 | Terado et al. | | |
| 5,869,582 | A | | 2/1999 | Tang et al. | | |
| 6,034,202 | A | * | 3/2000 | Aharoni et al. | .............. | 528/279 |
| 6,156,867 | A | * | 12/2000 | Aoyama et al. | .............. | 528/282 |
| 6,589,324 | B2 | | 7/2003 | Kamo et al. | | |

FOREIGN PATENT DOCUMENTS

| CA | 2253515 | | 3/1998 |
| CH | 495 395 | * | 10/1970 |
| CN | 1153185 | | 7/1997 |
| EP | 0 909 775 A1 | | 4/1999 |

(Continued)

OTHER PUBLICATIONS

The specification and claims of U.S. Appl. No. 10/049,438, filed May 30, 2002.
The specification and claims of U.S. Appl. No. 10/186,634, filed Jul. 2, 2002.
The specification and claims of U.S. Appl. No. 10/169,491, filed Jul. 3, 2002.
The specification and claims of U.S. Appl. No. 10/363,648, filed Mar. 4, 2003.
English translation of International Search Report of PCT/JP99/05866, Jan. 25, 2000.
Office Action issued by European Patent Office in European Patent Applicaiton No. 99949387.7.

*Primary Examiner*—Jerry A. Lorengo
*Assistant Examiner*—James E McDonough
(74) *Attorney, Agent, or Firm*—Kenyon & Kenyon LLP

(57) ABSTRACT

Embodiments of the present invention are directed to a polymerization catalyst used to produce polyester. The catalyst comprises at least one metal-containing component, excluding antimony or germanium, and an organic compound component, containing at least one moiety of Ar—O— or Ar—N<, where Ar represents an aryl group.

73 Claims, No Drawings

FOREIGN PATENT DOCUMENTS

| | | | |
|---|---|---|---|
| GB | 1348146 | | 3/1974 |
| JP | 46-5395 | | 11/1971 |
| JP | 46-40711 | | 12/1971 |
| JP | 61-101527 | | 10/1984 |
| JP | 60-35023 | | 2/1985 |
| JP | 60-53532 | * | 3/1985 |
| JP | 3-231918 | * | 10/1991 |
| JP | 4-3409 | * | 1/1992 |
| JP | 4-49846 | * | 8/1992 |
| JP | 4-49847 | * | 8/1992 |
| JP | 5-287064 | | 11/1993 |
| JP | 7-53691 | * | 2/1995 |
| JP | 8-301994 | * | 11/1996 |
| JP | 9-31308 | * | 2/1997 |
| JP | 9-151242 | | 6/1997 |
| JP | 9-151243 | | 6/1997 |
| JP | 9-151244 | | 6/1997 |
| JP | 10-259296 | | 9/1998 |
| JP | 10-324741 | | 12/1998 |
| JP | 11-49852 | | 2/1999 |
| JP | 11049852 | | 2/1999 |
| JP | 2000-63504 | | 2/2000 |
| JP | 2000-302854 | | 10/2000 |
| JP | 2001-26639 | | 1/2001 |
| JP | 2001-131274 | | 5/2001 |
| JP | 2001-131276 | | 5/2001 |
| JP | 2001-163964 | | 6/2001 |
| JP | 2001-278970 | | 10/2001 |
| WO | WO 98/42769 | | 10/1998 |

* cited by examiner

POLYMERIZATION CATALYST FOR POLYESTER PRODUCTION, POLYESTER, AND PROCESS FOR PRODUCING POLYESTER

FIELD OF THE INVENTION

The present invention relates to a polyester polymerization catalyst, a polyester produced by using the same, a method for producing a polyester, a product using such polyester such as a fiber, a molded article and a film, more typically, to a novel polyester polymerization catalyst employing no germanium or antimony compound, a polyester produced by using the same, a method for producing a polyester, a product using such polyester such as a fiber, a molded article and a film.

BACKGROUND OF THE INVENTION

Polyester polymers having various compositions are present as described below and employed widely in various industrial fields.

A polyethylene terephthalate (hereinafter abbreviated as PET) is excellent in terms of mechanical properties, chemical properties, transparency, heat resistance and gas barrier performance, and can be used in various products such as fibers for clothing and industrial materials, films or sheets for packages or magnetic tapes, molded articles such as bottles and engineering plastics.

A PET is produced industrially by an esterification or a transesterification of terephthalic acid or dimethyl terephthalate with ethylene glycol to form bis(2-hydroxyethyl)terephthalate followed by a polycondensation at a high temperature under vacuum using a catalyst.

A polyethylene naphthalate (PEN) is excellent in terms of heat resistance, impact resistance, transparency, gas barrier performance, UV-shielding ability and chemical resistance, and thus is used in bottles, films, sheets and fibers for industrial materials.

A polyethylene naphthalate is produced industrially by an esterification or a transesterification of naphthalenedicarboxylic acid or dimethyl naphthalenedicarboxylate with ethylene glycol to form a low molecular weight oligomer followed by a polycondensation at a high temperature under vacuum using a catalyst.

A polybutylene terephthalate (PBT) is excellent in terms of moldability, heat resistance, mechanical properties, chemical resistance and the like, and thus is employed widely as a material for a molded article such as automobile parts and electric or electronic parts.

A PBT is produced industrially by an esterification or a transesterification of terephthalic acid or dimethyl terephthalate with 1,4-butanediol to form a low molecular weight oligomer followed by a polycondensation at a high temperature under vacuum using a catalyst.

A polypropylene terephthalate is excellent in terms of heat resistance, impact resistance, transparency, chemical resistance, weather resistance, electric properties, pliability and the like, and thus is employed widely in fibers, films, automobile parts, electric or electronic parts and the like.

A polypropylene terephthalate is produced industrially by an esterification or a transesterification of terephthalic acid or dimethyl terephthalate with propanediol to form a low molecular weight oligomer followed by a polycondensation at a high temperature under vacuum using a catalyst.

A cyclohexanedimethanol-modified polyethylene terephthalate (hereinafter referred to as CHDM-modified PET) is excellent in terms of impact resistance, transparency, gas barrier performance, chemical resistance, recycling applicability and the like, and thus is employed in various molded articles such as sheets.

A CHDM-modified PET is produced by an esterification of terephthalic acid with ethylene glycol and cyclohexanedimethanol, or a transesterification of dimethyl terephthalate with ethylene glycol and cyclohexanedimethanol to form a low molecular weight oligomer followed by a polycondensation at a high temperature under vacuum using a catalyst.

A polyester fiber employing a polyester described above, especially a PET or a PEN, is an organic fiber which is well-balanced between the physical properties and the cost, and used widely and in a large amount as a filament or a staple not only for clothing but also for various interior articles as well as industrial materials such as padding stuffs or unwoven fabrics.

As a polyester polymerization catalyst employed in a polycondensation to form a polyester as described above, i.e., a polycondensation catalyst, antimony trioxide is employed widely. While antimony trioxide is low-priced catalyst having an excellent catalytic activity, it undergoes the precipitation of a metal antimony upon a polycondensation, which leads to a problem of graying or foreign body formation in a resultant polyester. Under such circumstance, an antimony-free polyester is desired.

In a polyester for a film, the precipitation of metal antimony results in a foreign body in the polyester, which may lead not only to a dirt on a die upon an extrusion but also to a defect on the film surface. Also when used as a starting material for a molded hollow article, it allows a polyester to be crystallized rapidly, resulting in an extreme difficulty in obtaining a satisfactorily transparent molded hollow article.

A foreign body in a polyester then serves as a foreign body in a fiber which may leads to a reduction in the strength and a dirt on a die upon a spinning. Mainly in view of an operation in a process for a polyester fiber, a polyester polymerization catalyst causing no foreign body is desired.

An attempt has been made to use antimony trioxide as a polycondensation catalyst while suppressing the graying of a PET or a foreign body formation. For example in JP 266652, an antimony trioxide is used as a polycondensation catalyst together with a compound of bismuth and selenium to suppress the formation of a black foreign body in a PET. Also in JP-A-9-291141, a use of a sodium and iron oxide-containing antimony trioxide as a polycondensation catalyst is purported to suppress the precipitation of metal antimony. However, such polycondensation catalyst can not accomplish a reduction in the total amount of antimony contained.

In a use where a transparency is required such as a use in a PET bottle, the problem associated with an antimony catalyst is attempted to be solved for example by improving the transparency by specifying the ratio of the amounts of an antimony compound and a phosphorus compound as described in JP-A-6-279579. However, a molded hollow article obtained from a polyester produced by the method described above is not satisfactorily transparent.

JP-A-10-36495 also discloses a continuous method for producing a polyester having a high transparency using antimony trioxide, phosphoric acid and a sulfonic acid compound. However, a polyester obtained by this method has a poor themostability and a resultant molded hollow article has a problematically high acetaldehyde content.

As a catalyst providing a polyester having an excellent catalyst activity and a high thermal stability other than an antimony compound, a germanium compound has already been employed practically, but it is problematically expensive and tends to be distilled from a reaction system during a polymerization, resulting in a change in the catalyst concentration in the reaction system, which leads to a difficulty in controlling the polymerization.

Thus a polymerization catalyst other than such antimony or germanium compound is required which has an excellent catalyst activity and can provide a highly thermostable polyester undergoing almost no thermal degradation when melted for a molding.

As a polymerization catalyst having an excellent catalyst activity other than an antimony compound or a germanium compound, a titanium compound such as a tetraalkoxytitanate or a tin compound has already been proposed, but a polyester produced using such compound readily undergoes a thermal degradation when melted for a molding and a problematically discoloration of a polyester occurs.

A polyester fiber produced using a titanium compound such as a tetraalkoxytitanate or a tin compound readily undergoes a thermal degradation when melted for a molding and a problematically discoloration of a polyester occurs.

An attempt to suppress a thermal degradation in a molding process of a polyester produced using a titanium compound as a catalyst is disclosed in JP-A-10-259296 which involves a use of a titanium compound as a catalyst in a polymerization to obtain a polyester followed by an addition of a phosphorus-based compound. Although it is possible to improve the thermal stability of a polyester by adding a stabilizer such as a phosphorus-based compound to inactivate a catalyst, an efficient incorporation of an additive into a polymer once polymerized is accompanied not only with a technical difficulty but also with an increased expenditure, and thus is not employed practically. The use of an additive itself is not preferably since it serves to increase the expenditure.

Another attempt to suppress a thermal degradation upon a molding process of a polyester is a removal of a catalyst from the polyester. A method for removing a catalyst from a polyester is, for example, a contact between a polyester resin and an extraction solvent which is a supercritical fluid in the presence of an acidic substance as disclosed in JP-A-10-251394. However, a method employing such supercritical fluid is not preferable since it involves a technical difficulty as well as an increased expenditure.

An objective of the invention is to provide a polyester polymerization catalyst consisting mainly of components except for antimony compounds or germanium compounds which exhibits an excellent catalyst activity and yields a highly thermally stable polyester whose thermal degradation upon a molding process is suppressed efficiently without any need of an inactivation or a removal of the catalyst, a polyester obtained using said polyester polymerization catalyst, and a method for producing a polyester using said polyester polymerization catalyst.

Another objective of the invention is to provide PET, PBT, PEN, CHDM-modified PET and polypropylene terephthalate obtained using a polyester polymerization catalyst described above as well as a method for producing the same.

Still another objective of the invention is to provide molded articles, films, fibers, fibers for industrial materials, modified fibers and flame retardant fibers.

SUMMARY OF THE INVENTION

Now we discovered surprisingly that a coexistence of a first component and a second component, both of which have no sufficient polycondensation catalyst activities in themselves, resulted in a practically sufficient, increased activity as a polycondensation catalyst, thus establishing the invention.

Accordingly, the present invention is a polyester polymerization catalyst containing no antimony or germanium whose activity parameter (AP) fulfills Formula [1] shown below and the thermal stability degree (TD) of a polyethylene terephthalate polymerized using which fulfills Formula [2] shown below:

$$AP(min) < 2T(min) \qquad [1]$$

wherein AP is a time (min) required for a polymerization using the catalyst at 275° C. under reduced pressure of 0.1 Torr to obtain a polyethylene terephthalate whose intrinsic viscosity is 0.5 dl/g. T is an AP observed when using antimony trioxide as a catalyst. The added amount of antimony trioxide is 0.05 mol % as antimony atom based on an acid component in a resultant polyethylene terephthalate; and, $$TD(\%) < 25 \qquad [2]$$

wherein TD is a % reduction in the intrinsic viscosity after keeping 1 g of PET, whose initial intrinsic viscosity was 0.6 dl/g, in a glass tube as melt state under a nitrogen atmosphere at 300° C. for 2 hours after drying the PET at 130° C. for 12 hours in vacuum.

A preferred relationship is AP (min)<T1.5(min), more preferably AP (min)<T(min).

With regard to TD, a preferred relationship is TD<22%, more preferably TD<18%. A catalyst giving a TD of 25% or higher, a polyester obtained by a polymerization using this catalyst tends to be susceptible to a thermal degradation upon a molding process, resulting in a marked reduction in the strength and an evident discoloration of a resultant fiber or film.

Said catalyst preferably consists of at least one metal-containing component selected from metals and/or metal compounds comprising no antimony or germanium (including one which cannot be regarded substantially to have a catalyst activity and one which substantially has a catalytic activity but whose catalytic activity is not sufficient) and an organic compound component (including one which cannot be regarded substantially to have a catalyst activity and one which substantially has a catalytic activity but whose catalytic activity is not sufficient).

The structures of the chemical formulae described herein are a follows:

 (Formula 1)

 (Formula 2)

 (Formula 3)

 (Formula 4)

 (Formula 5)

 (Formula 6)

-continued
(Formula 7)
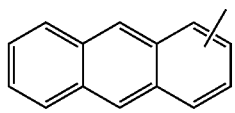
(Formula 8)
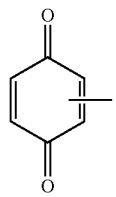
(Formula 9)
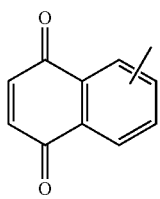
(Formula 10)
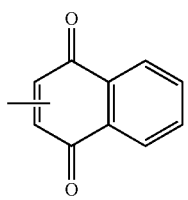
(Formula 11)
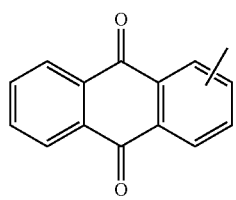
(Formula 12)
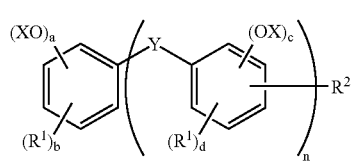
(Formula 13)
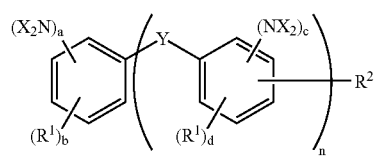
(Formula 14)
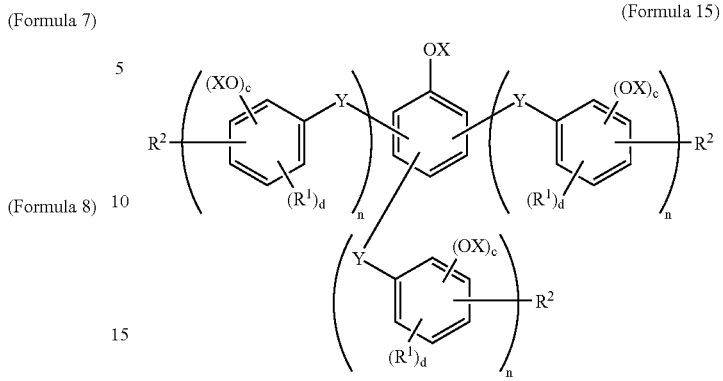
(Formula 15)
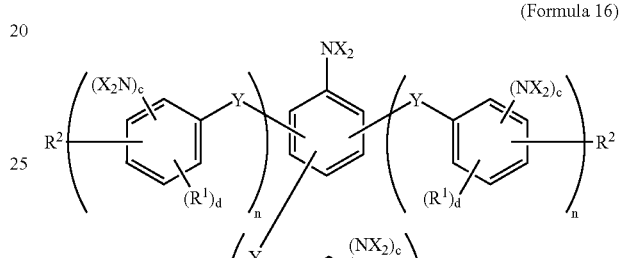
(Formula 16)
(Formula 17)
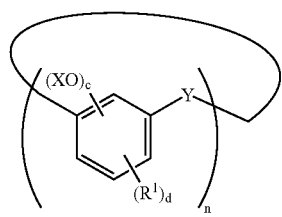
(Formula 18)
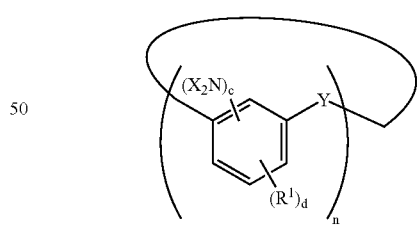
(Formula 19)
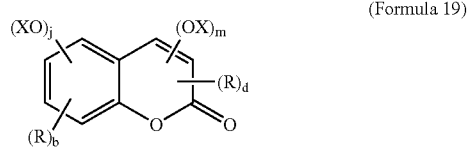
(Formula 20)
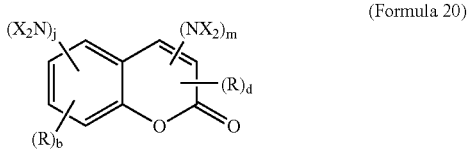

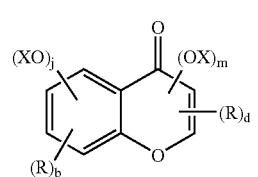 (Formula 21)
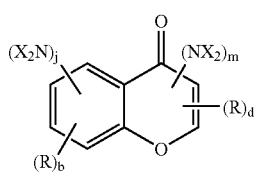 (Formula 22)
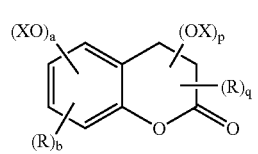 (Formula 23)
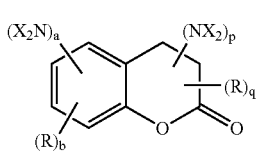 (Formula 24)
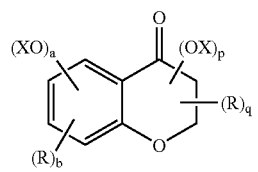 (Formula 25)
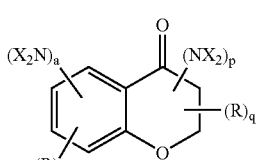 (Formula 26)
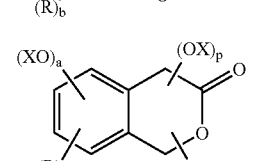 (Formula 27)
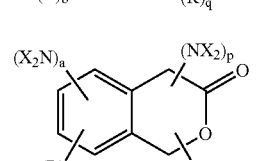 (Formula 28)
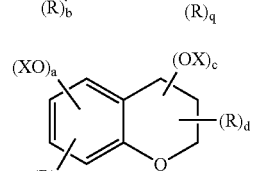 (Formula 29)
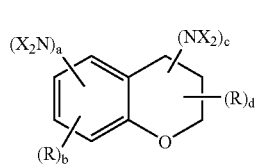 (Formula 30)
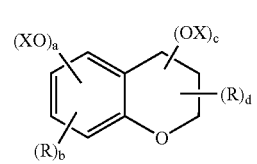 (Formula 31)
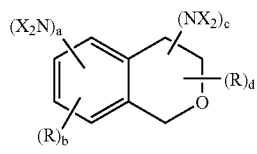 (Formula 32)
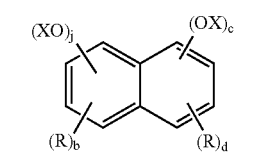 (Formula 33)
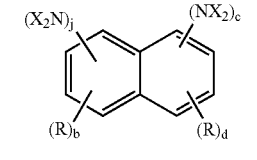 (Formula 34)
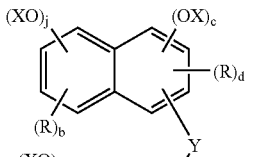 (Formula 35)
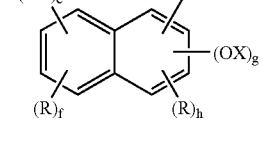 (Formula 36)
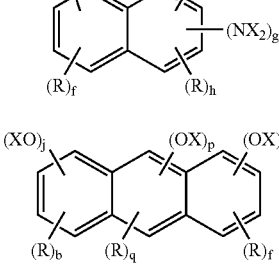 (Formula 37)

-continued
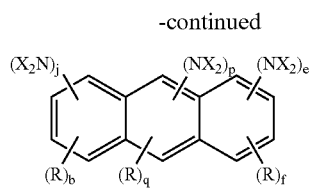
(Formula 38)
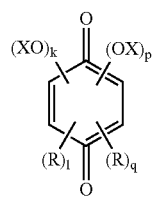
(Formula 39)
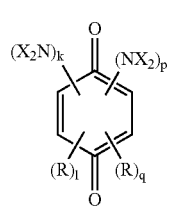
(Formula 40)
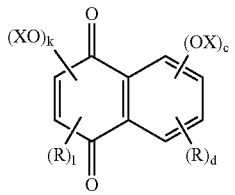
(Formula 41)
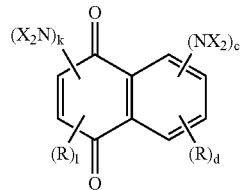
(Formula 42)
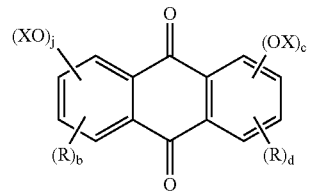
(Formula 43)
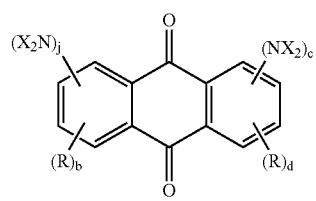
(Formula 44)
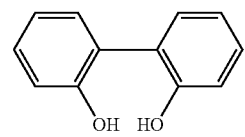
(Formula 45)
-continued
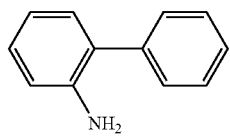
(Formula 46)
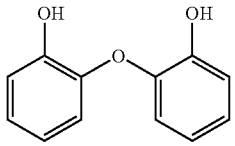
(Formula 47)
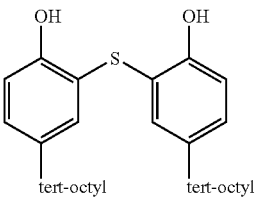
(Formula 48)
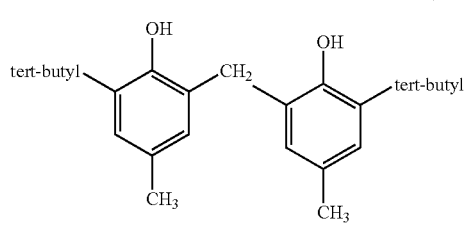
(Formula 49)
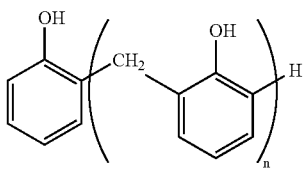
(Formula 50)
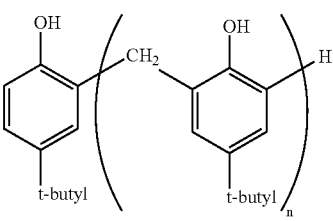
(Formula 51)
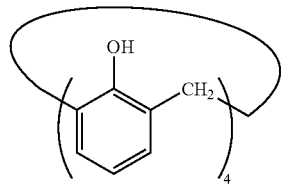
(Formula 52)
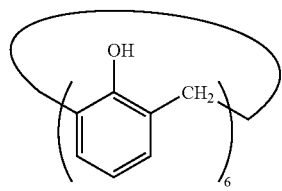
(Formula 53)

-continued
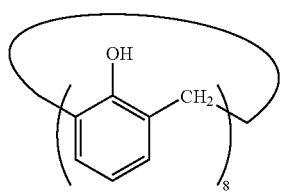
(Formula 54)
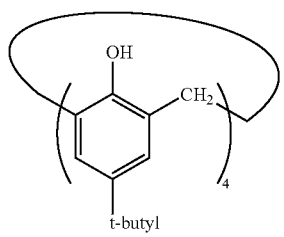
(Formula 55)
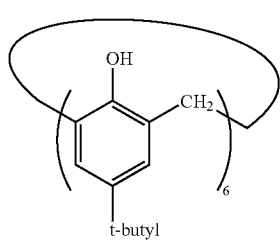
(Formula 56)
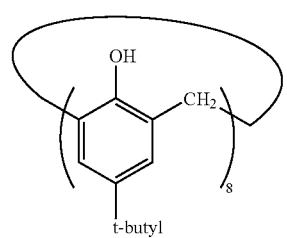
(Formula 57)
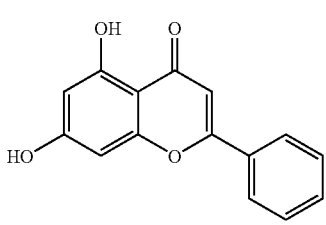
(Formula 58)
(Formula 59)
and derivatives thereof.
-continued
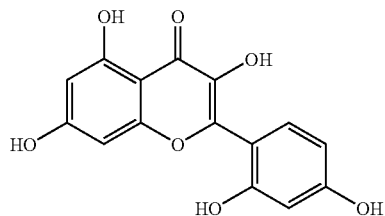
(Formula 61)
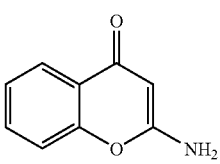
(Formula 62)
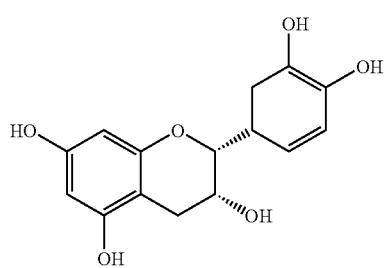
(Formula 63)
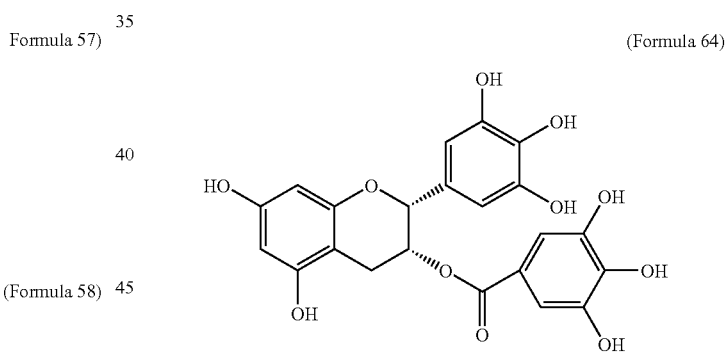
(Formula 64)
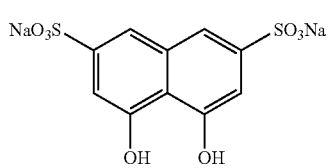
(Formula 65)
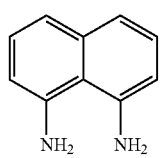
(Formula 66)
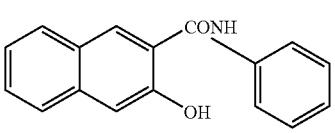
(Formula 67)

-continued
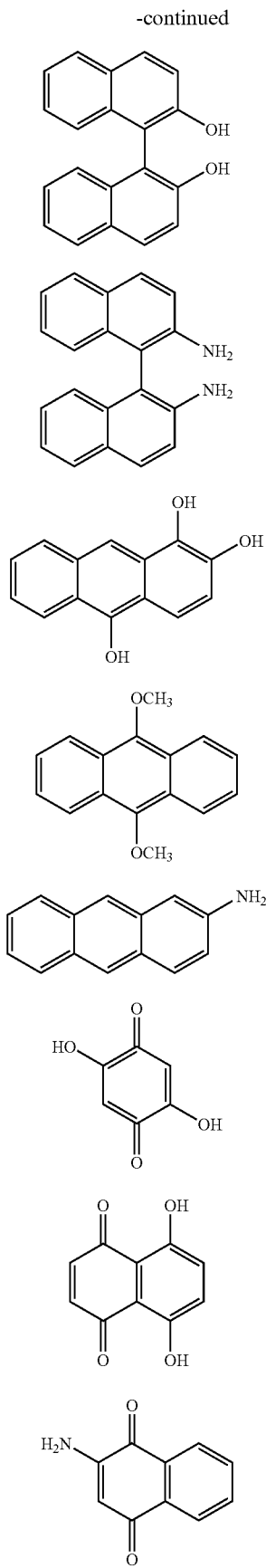
(Formula 68)
(Formula 69)
(Formula 70)
(Formula 71)
(Formula 72)
(Formula 73)
(Formula 74)
(Formula 75)
-continued
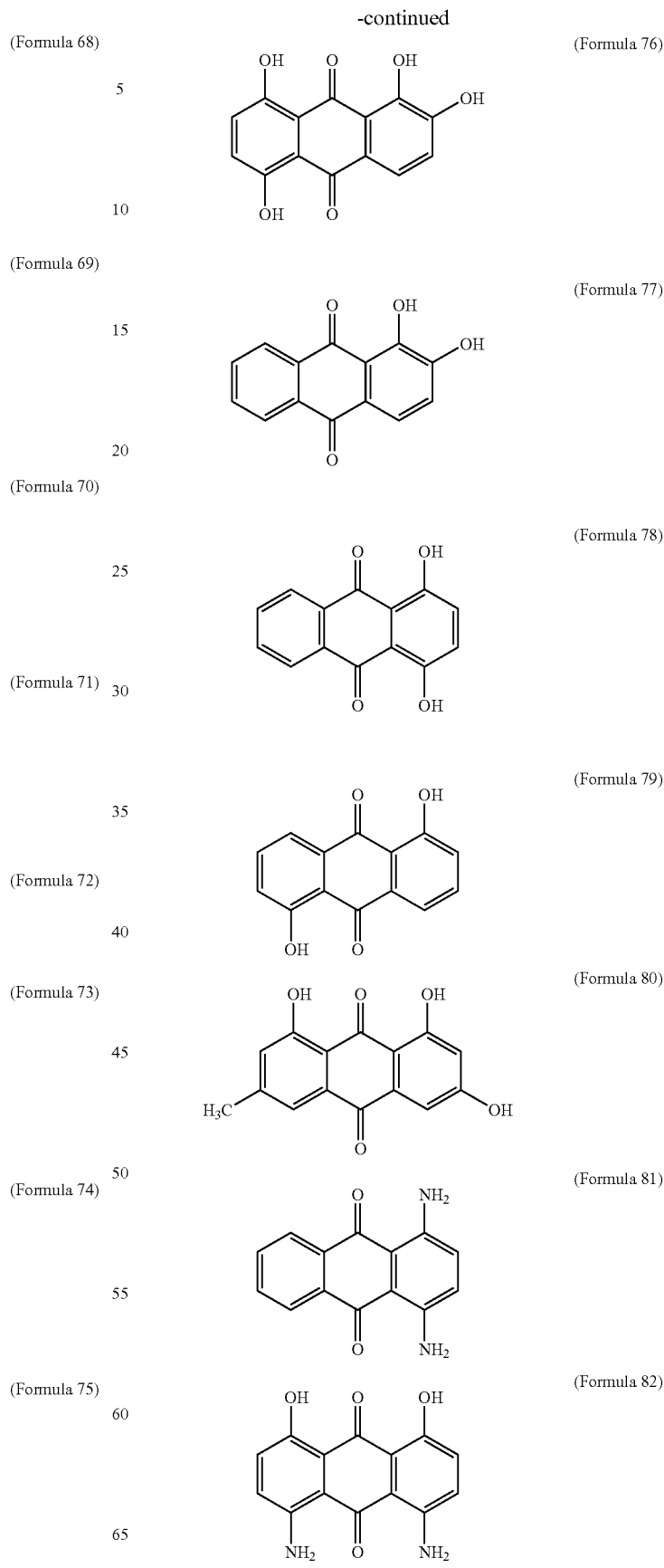
(Formula 76)
(Formula 77)
(Formula 78)
(Formula 79)
(Formula 80)
(Formula 81)
(Formula 82)

-continued

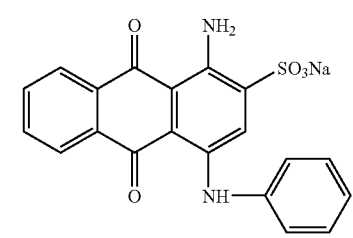
(Formula 83)

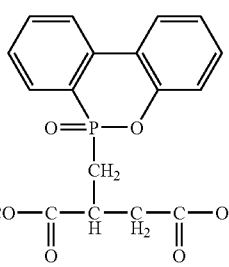
(Formula 84)

In an invention described above, said organic compound component is at least one compound selected from the group of the compounds containing the moieties represented by Formula 1 and/or Formula 2:

Ar—O— (Formula 1)

Ar—N< (Formula 2)

wherein Ar represents an aryl group.

The present invention is also a polyester polymerization catalyst comprising at least one metal-containing component selected from metals and/or metal compounds comprising no antimony or germanium and an organic compound component wherein said organic compound component is at least one compound selected from the group of the compounds containing the moieties represented by Formula 1 and/or Formula 2:

Ar—O— (Formula 1)

Ar—N< (Formula 2)

wherein Ar represents an aryl group.

An organic compound component of the invention may also be a compound having both of the moieties represented by Formula 1 and Formula 2 such as an aminophenol to which both of N and O are bound to an aromatic ring, as well as a derivative thereof.

The present invention is a polyester polymerization catalyst having a substantial catalytic activity and comprising at least 2 components, the first of which has substantially no catalytic activity and the second of which has substantially no catalytic activity. At least the first component is preferably a metal-containing component, while at least the second component is preferably an organic compound component.

The present invention also relates to a method for a polymerization to obtain a polyester wherein to a polyester-forming starting material, a first component and a second component is added simultaneously or at an interval.

BEST MODE FOR CARRYING OUT THE INVENTION

A preferred metal-containing component as a first component of the invention may for example be at least one selected from the group consisting of an alkaline metal, an alkaline earth metal, a 5A Group metal, a 6A Group metal, a 7A Group metal, a 8 Group metal, a 1B Group metal, a 2B Group metal, a 3B Group metal, lead, bismuth, tellurium, silicon, boron, zirconium, hafnium, scandium, yttrium, a lanthanoid metal and a compound thereof. A compound of a metal described above may for example be a salt of such metal with a saturated aliphatic carboxylic acid such as formic acid, acetic acid, propionic acid, butyric acid, oxalic acid and the like, a salt with an unsaturated aliphatic carboxylic acid such as acrylic acid, methacrylic acid and the like, a salt with an aromatic carboxylic acid such as benzoic acid, a salt with a halogen-containing carboxylic acid such as trichloroacetic acid, a salt with a hydroxycarboxylic acid such as lactic acid, citric acid, salicylic acid and the like, a salt with an inorganic acid such as carbonic acid, sulfuric acid, nitric acid, phosphoric acid, phosphonic acid, hydrogen carbonate, hydrogen phosphate, hydrogen sulfide, sulfurous acid, thiosulfuric acid, hydrochloric acid, hydrobromic acid, chloric acid, bromic acid and the like, a salt with an organic sulfonic acid, such as 1-propanesulfonic acid, 1-pentanesulfonic acid, naphthalenesulfonic acid and the like, a salt with an organic sulfuric acid such as laurylsulfuric acid, an alkoxide such as methoxide, ethoxide, n-propoxide, iso-propoxide, n-butoxide, t-butoxide and the like, a chelate compound such as one with acetylacetonate, an oxide, a hydroxide and the like, with a saturated aliphatic carboxylate being preferred and an acetate being more preferred. Among an alkaline metal, an alkaline earth metal, a 5A Group metal, a 6A Group metal, a 7A Group metal, a 8 Group metal, a 1B Group metal, a 2B Group metal, a 3B Group metal, lead, bismuth, tellurium, silicon, boron, zirconium, hafnium, scandium, yttrium, a lanthanoid metal and a compound thereof, those preferred especially are L, Na, K, Rb, Cs, Be, Mg, Ca, Sr, Ba, Al, Ga, Tl, Pb, Bi, Cr, Ni, Mo, Tc, Re, Sc, Y, Zr, Hf, V, Ru, Rh, Pd, Ir, Pt, Cu, Ag, Au, Cd, Hg, La, Ce, Sm, Eu, Gd, Mn, Co, Zn, In, Fe, Nb, Ta, W, Si as well as a compound thereof.

At least one compound having substantially no polyester polymerization activity of the invention is preferably a metal or a compound thereof. At least another compound having substantially no polyester polymerization activity is preferably an organic compound.

A metal having substantially no polyester polymerization catalyst activity of the invention is Na, K, Rb, Cs, Be, Ca, Sr, Si, V, Cr, Ru, Rh, Pd, Te, Cu and the like as well as a compound thereof, with Na, K, Rb, Cs, Be, Si, Cu and a compound thereof being preferred. A compound of such metal is not particularly limited, and may for example be a salt with a saturated aliphatic carboxylic acid such as formic acid, acetic acid, propionic acid, butyric acid, oxalic acid and the like, a salt with an unsaturated aliphatic carboxylic acid such as acrylic acid, methacrylic acid and the like, a salt with an aromatic carboxylic acid such as benzoic acid, a salt with a halogen-containing carboxylic acid such as trichloroacetic acid, a salt with a hydroxycarboxylic acid such as lactic acid, citric acid, salicylic acid and the like, a salt with an inorganic acid such as carbonic acid, sulfuric acid, nitric acid, phosphoric acid, phosphonic acid, hydrogen carbonate, hydrogen phosphate, hydrogen sulfide, sulfurous acid, thiosulfuric acid, hydrochloric acid, hydrobromic acid, chloric acid, bromic acid and the like, a salt with an organic sulfonic acid, such as 1-propanesulfonic acid, 1-pentanesulfonic acid, naphthalenesulfonic acid and the like, a salt with an inorganic sulfuric acid such as laurylsulfuric acid, an alkoxide such as methoxide, ethoxide, n-propoxide, iso-propoxide, n-butoxide, t-butoxide and the like, a chelate compound such as one with acetylacetonate, an oxide, a hydroxide and the like, with a saturated aliphatic carboxylate being preferred and an acetate being more preferred.

An alkaline metal, an alkaline earth metal, a 5A Group metal, a 6A Group metal, a 7A Group metal, a 8 Group metal, a 1B Group metal, a 2B Group metal, a 3B Group metal, lead, bismuth, tellurium, silicon, boron, zirconium, hafnium, scandium, yttrium, a lanthanoid metal and a compound thereof may be used in an amount ranging from $1 \times 10^{-6}$ to 0.1 moles, more preferably from $5 \times 10^{-6}$ to 0.05 moles based on the moles of the entire constituent units of a carboxylic acid component of a resultant polyester such as dicarboxylic acids and polycarboxylic acids.

An organic compound component having substantially no polyester polymerization catalyst activity of the invention is preferably one selected from the group consisting of the compounds having the moieties represented by Formula 1 and/or Formula 2 as described above.

A compound having the structures represented by Formula 1 and/or Formula 2, i.e., Ar—O— and/or an Ar—N< which is used as an additive in a polyester polymerization catalyst of the invention is preferably at least one compound selected from the group consisting of the compounds specifically having the structures represented by Formula 3 and/or Formula 4 shown below.

$$\text{Ar—O—X}^1 \tag{Formula 3}$$

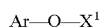

(Formula 4)

wherein each of $X^1$, $X^2$ and $X^3$ independently represents hydrogen, a hydrocarbon group, an acyl group, a sulfonyl-containing group, a phosphoryl-containing group or an ether bond-containing hydrocarbon group, wherein an Ar in said Formulae 3 and/or 4 is an aryl group, selected from the group consisting of the moieties represented by Formulae 5 to 12:

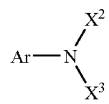

(Formula 5)

(Formula 6)

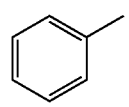

(Formula 7)

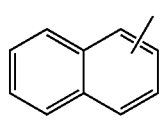

(Formula 8)

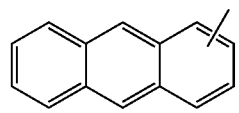

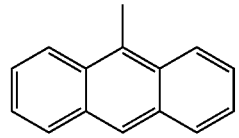

-continued

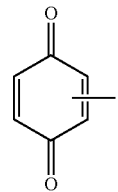

(Formula 9)

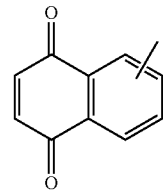

(Formula 10)

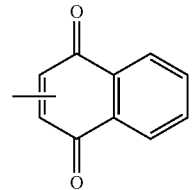

(Formula 11)

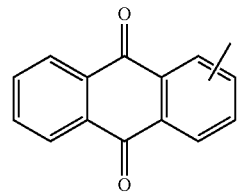

(Formula 12)

Examples of a compound containing the structures of Ar—O—$X^1$ and/or Ar—N(—$X^2$)—$X^3$ wherein Ar is represented by Formula 5 may be a compound selected from the group consisting of a linear phenol compound and a linear aniline compound represented by Formulae 13 and 14 and a derivative thereof, a compound selected from the group consisting of a branched linear phenol compound and a branched linear aniline compound represented by Formulae 15 and 16 and a derivative thereof, and/or a compound selected from the group consisting of a cyclic phenol compound and a cyclic aniline compound represented by Formulae 17 and 18 and a derivative thereof. Among such compounds, a linear phenol compound and a linear aniline compound or a cyclic phenol compound and a cyclic aniline and a derivative thereof are more preferable.

(Formula 13)

(Formula 14)

(Formula 15)

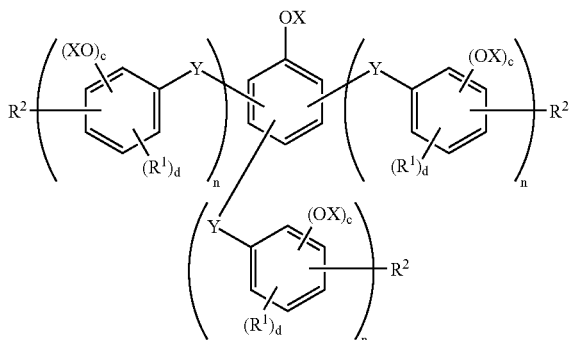

(Formula 16)

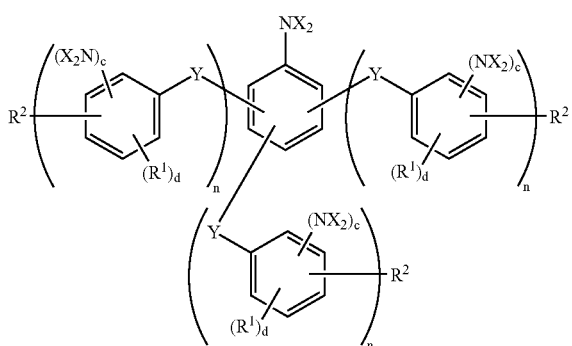

(Formula 17)

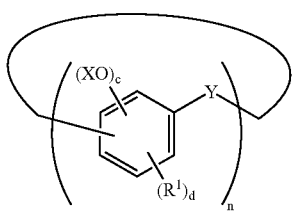

(Formula 18)

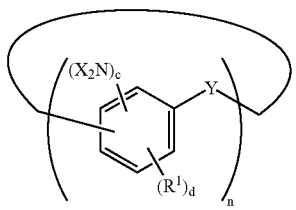

wherein each $R^1$ is same or different and represents a C1-C20 hydrocarbon group, a hydroxyl group- or halogen group-carrying C1-C20 hydrocarbon group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each $R^2$ is same or different and represents hydrogen, a C1-C20 hydrocarbon group, a hydroxyl group- or halogen group-carrying C1-C20 hydrocarbon group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each X is same or different and represents hydrogen, a C1-C20 hydrocarbon group, a hydroxyl group- or halogen group-carrying C1-C20 hydrocarbon group, an acyl group, a sulfonyl-containing group, a phosphoryl-containing group or an ether bond-containing hydrocarbon group, each Y is same or different and represents a direct bond, a C1-C10 alkylene group, -(alkylene)-O—, -(alkylene)-S—, —O—, —S—, —SO$_2$—, —CO— or —COO—, n represents an integer of 1 to 100, each of a and c is an integer of 1 to 3, each of b and d is 0 or an integer of 1 to 3, provided that $1 \leq a+b \leq 5$, $1 \leq c+d \leq 4$, and each d may be same or different, as well as a derivative thereof.

Further, among a linear phenol compound and a linear aniline compound or a cyclic phenol compound and a cyclic aniline and a derivative thereof, such compounds as follows are more preferable; a compound selected from the group consisting of 2,2'-bisphenol represented by Formulae 45 or 2-aminobiphenyl represented by Formula 46, a compound selected from the group consisting of 2,2'-dihydroxydiphenylether represented by Formula 47, 2,2'-thiobis(4-t-octylphenol) represented by Formula 48 or 2,2'-methylenebis(6-t-butyl-p-cresol) represented by Formula 49, a compound selected from the group consisting of a methylene-bridged linear phenol compound represented by Formula 50 (mixture of dimer to 100-mer) or a methylene-bridged linear p-t-butylphenol compound represented by Formula 51 (mixture of dimer to 100-mer), and/or a compound selected from the group consisting of Calix [4] arene represented by Formula 52, Calix [6] arene represented by Formula 53, Calix [8] arene represented by Formula 54, p-t-butyl. Calix [4] arene represented by Formula 55, p-t-butyl Calix [6] arene represented by Formula 56 or p-t-butyl Calix arene represented by Formula 57, as well as a derivative thereof.

(Formula 45)

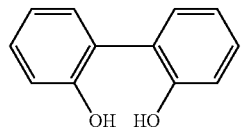

(Formula 46)

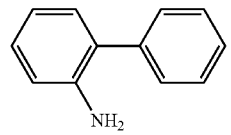

(Formula 47)

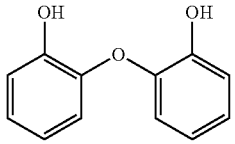

(Formula 48)

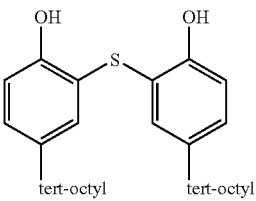

-continued (Formula 49)
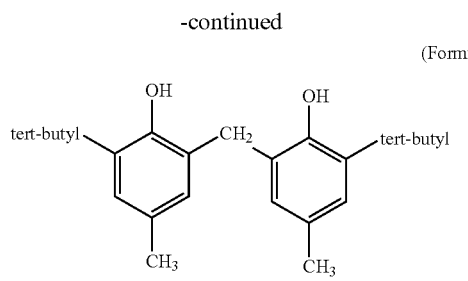

(Formula 50)
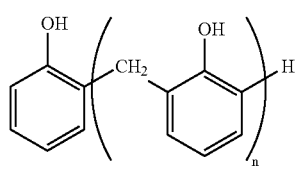

wherein n is an integer of 1 to 99, (Formula 51)
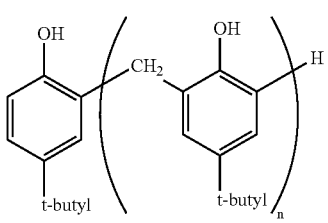

wherein n is an integer of 1 to 99, as well as a derivative thereof.

(Formula 52)
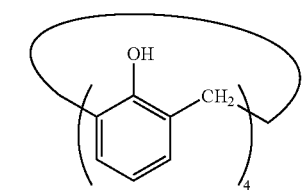

(Formula 53)
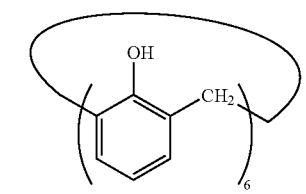

(Formula 54)
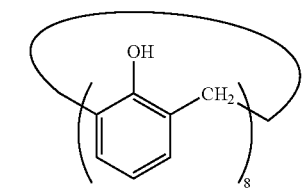

-continued (Formula 55)
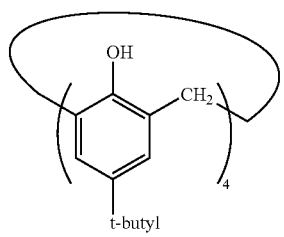

(Formula 56)
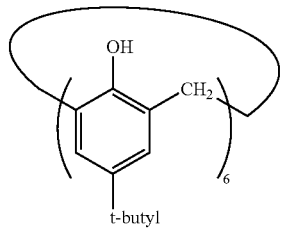

(Formula 57)
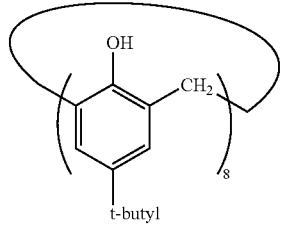

Other examples of a compound containing the structures of Ar—O—$X^1$ and/or Ar—N(—$X^2$)—$X^3$ wherein Ar is represented by Formula 88 may be, as indicated in the following Formulae, a heterocyclic compound such as a coumarine derivative represented by Formula 19 and Formula 20, a chromone derivative represented by Formula 21 and Formula 22, a dihydrocoumarine derivative represented by Formula 23 and Formula 24, a chromanone derivative represented by Formula 25 and Formula 26, an isochromanone derivative represented by Formula 27 and Formula 28, a chroman derivative represented by Formula 29 and Formula 30 and an isochroman derivative represented by Formula 31 and Formula 32, with a coumarine derivative, a chromone derivative and a chroman derivative being preferred. Among such coumarine, chromone and chroman derivatives, those particularly preferred are, as shown below, esculetin represented by Formula 58, 7-amino-4-methylcoumarine represented by Formula 59, chrysin represented by Formula 60, morin represented by Formula 61, 2-aminochromone represented by Formula 62, epicatechin represented by Formula 63 or epigallocatechin gallate represented by Formula 64 and a derivative thereof.

(Formula 19)
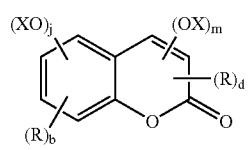

-continued

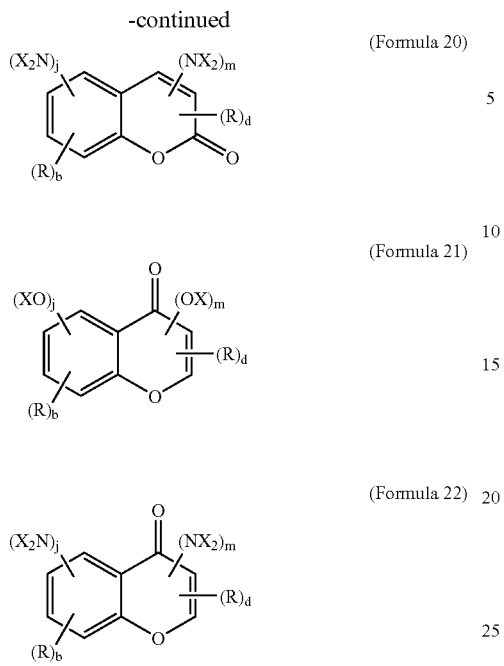

(Formula 20)

(Formula 21)

(Formula 22)

wherein each R is same or different and represents a C1-C20 hydrocarbon group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group such as a sulfonic acid group or a sulfonate group, a phosphoryl-containing group such as a phosphonic acid group or a phosphonate group, a nitro group, a cyano group or a thiocyano group, each X is same or different and represents hydrogen, a C1-C20 hydrocarbon group, a hydroxyl group- or halogen group-carrying C1-C20 hydrocarbon group, an acyl group, a sulfonyl-containing group such as a sulfonic acid group or a sulfonate group, a phosphoryl-containing group such as a phosphonic acid group or a phosphonate group or an ether bond-containing hydrocarbon group, each of j and b is 0 or an integer of to 3, each of m and d is 0 or an integer of 1 to 2, provided that $0 \leq j+b \leq 4$, $0 \leq m+d \leq 2$ and $1 \leq j+m \leq 5$. A hydrocarbon group referred herein means an alkyl group or an aryl group which may contain in its molecular chain a substituent such as a hydroxyl group or a halogen group.

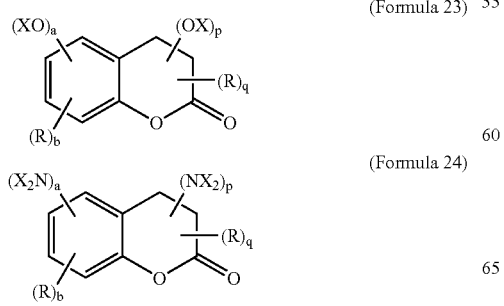

(Formula 23)

(Formula 24)

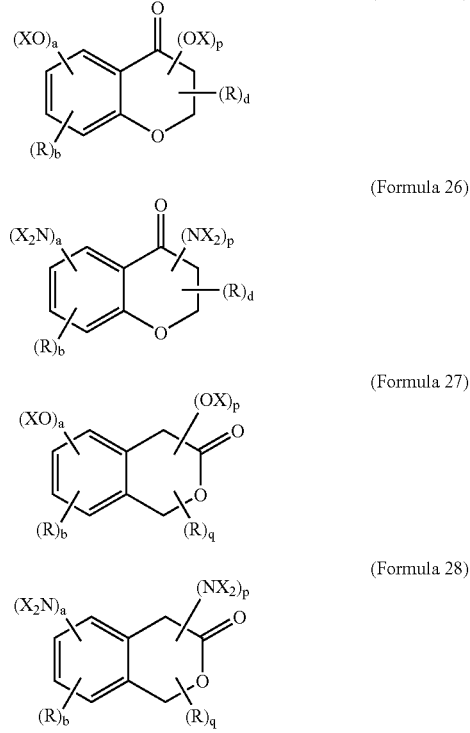

(Formula 25)

(Formula 26)

(Formula 27)

(Formula 28)

wherein each R is same or different and represents a C1-C20 hydrocarbon group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group such as a sulfonic acid group or a sulfonate group, a phosphoryl-containing group such as a phosphonic acid group or a phosphonate group, a nitro group, a cyano group or a thiocyano group, each X is same or different and represents hydrogen, a C1-C20 hydrocarbon group, a hydroxyl group- or halogen group-carrying C1-C20 hydrocarbon group, an acyl group, a sulfonyl-containing group such as a sulfonic acid group or a sulfonate group, a phosphoryl-containing group such as a phosphonic acid group or a phosphonate group or an ether bond-containing hydrocarbon group, a is an integer of 1 to 3, b is 0 or an integer of 1 to 3, each of c and d is 0 or an integer of 1 to 2, provided that $1 \leq a+b \leq 4$ and $0 \leq c+d \leq 2$. A hydrocarbon group referred herein means an alkyl group or an aryl group which may contain in its molecular chain a substituent such as a hydroxyl group or a halogen group.

(Formula 29)

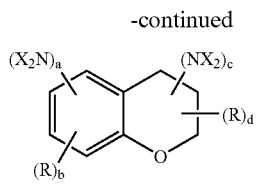
(Formula 30)

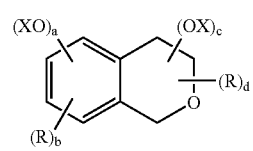
(Formula 31)

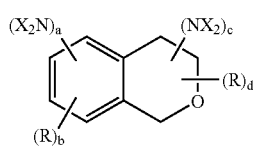
(Formula 32)

wherein each R is same or different and represents a C1-C20 hydrocarbon group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group such as a sulfonic acid group or a sulfonate group, a phosphoryl-containing group such as a phosphonic acid group or a phosphonate group, a nitro group, a cyano group or a thiocyano group, each X is same or different and represents hydrogen, a C1-C20 hydrocarbon group, a hydroxyl group- or halogen group-carrying C1-C20 hydrocarbon group, an acyl group, a sulfonyl-containing group such as a sulfonic acid group or a sulfonate group, a phosphoryl-containing group such as a phosphonic acid group or a phosphonate group or an ether bond-containing hydrocarbon group, a is an integer of 1 to 3, b is 0 or an integer of 1 to 3, each of c and d is 0 or an integer of 1 to 3, provided that 1≦a+b≦4 and 0≦c+d≦3. A hydrocarbon group referred herein means an alkyl group or an aryl group which may contain in its molecular chain a substituent such as a hydroxyl group or a halogen group.

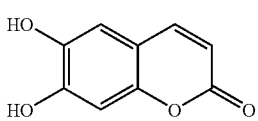
(Formula 58)

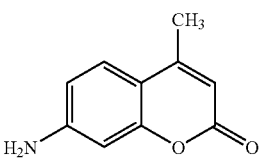
(Formula 59)

as well as a derivative thereof.

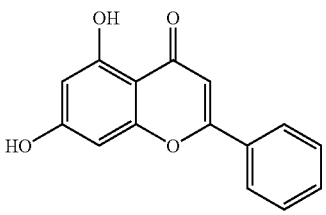
(Formula 60)

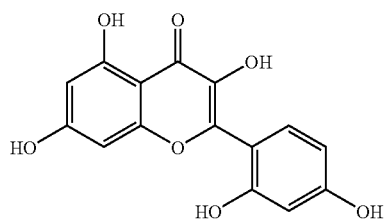
(Formula 61)

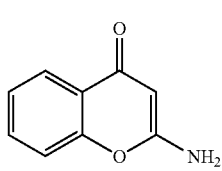
(Formula 62)

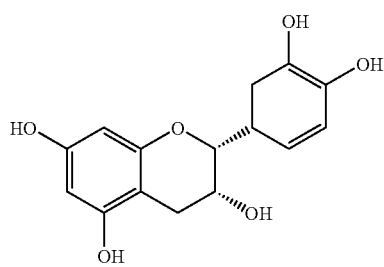
(Formula 63)

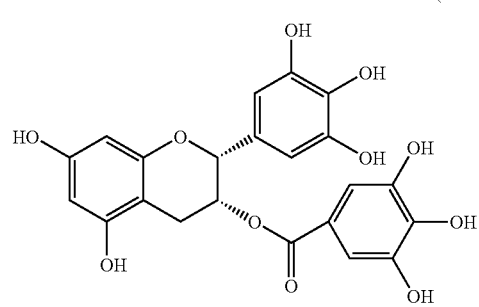
(Formula 64)

A compound containing the structures of Ar—O—$X^1$ and/or Ar—N(—$X^2$)—$X^3$ wherein Ar is represented by Formula 89 may be, as indicated in the following Formulae, a naphthalene derivative represented by Formula 33 and Formula 34 and a bisnaphthyl derivative represented by Formula 35 and Formula 36, with disodium 4,5-dihydroxynaphthalene-2,7-disulfonate represented by Formula 65, 1,8-diaminonaphthalene represented by Formula 66, naphthol AS represented by Formula 67, 1,1'-bi-2-naphthol represented by Formula 68 or 1,1'-binaphthyl-2,2'-damine represented by Formula 69 and a derivative thereof being preferred, and disodium 4,5-dihydroxynaphthalene-2,7-disulfonate or 1,8-diaminonaphthalene or its derivative being particularly preferred.

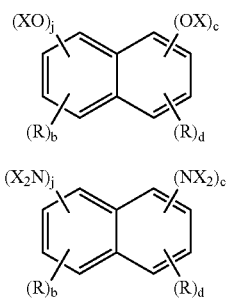

(Formula 33)

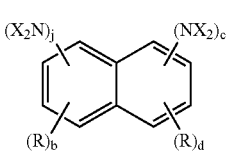

(Formula 34)

wherein each R is same or different and represents a C1-C20 hydrocarbon group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group such as a sulfonic acid group or a sulfonate group, a phosphoryl-containing group such as a phosphonic acid group or a phosphonate group, a nitro group, a cyano group or a thiocyano group, each X is same or different and represents hydrogen, a C1-C20 hydrocarbon group, a hydroxyl group- or halogen group-carrying C1-C20 hydrocarbon group, an acyl group, a sulfonyl-containing group such as a sulfonic acid group or a sulfonate group, a phosphoryl-containing group such as a phosphonic acid group or a phosphonate group or an ether bond-containing hydrocarbon group, j, b, c and d is 0 or an integer of 1 to 3, provided that $0 \leq j+b \leq 4$, $0 \leq c+d \leq 4$ and $1 \leq j+c \leq 6$. A hydrocarbon group referred herein means an alkyl group or an aryl group which may contain in its molecular chain a substituent such as a hydroxyl group or a halogen group.

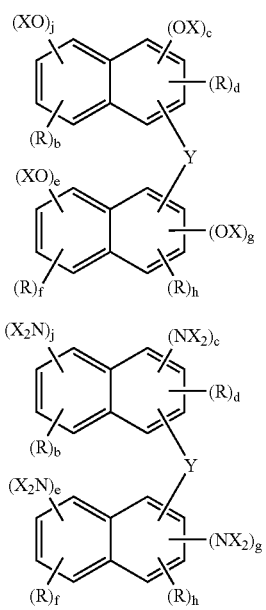

(Formula 35)

(Formula 36)

wherein each R is same or different and represents a C1-C20 hydrocarbon group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group such as a sulfonic acid group or a sulfonate group, a phosphoryl-containing group such as a phosphonic acid group or a phosphonate group, a nitro group, a cyano group or a thiocyano group, each X is same or different and represents hydrogen, a C1-C20 hydrocarbon group, a hydroxyl group- or halogen group-carrying C1-C20 hydrocarbon group, an acyl group, a sulfonyl-containing group such as a sulfonic acid group or a sulfonate group, a phosphoryl-containing group such as a phosphonic acid group or a phosphonate group or an ether bond-containing hydrocarbon group, Y represents a direct bond, a C1-C10 alkylene group, -(alkylene)-O—, -(alkylene)-S—, —O—, —S—, —SO$_2$—, —CO— or —COO—, each of j, b, c, d, e, f, g and h is 0 or an integer of 1 to 3, provided that $0 \leq j+b \leq 4$, $0 \leq c+d \leq 3$, $0 \leq e+f \leq 4$, $0 \leq g+h \leq 3$ and $1 \leq j+c+e+g \leq 12$. A hydrocarbon group referred herein means an alkyl group or an aryl group which may contain in its molecular chain a substituent such as a hydroxyl group or a halogen group.

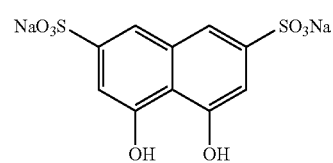

(Formula 65)

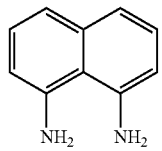

(Formula 66)

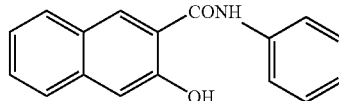

(Formula 67)

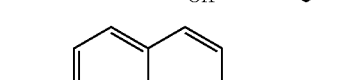

(Formula 68)

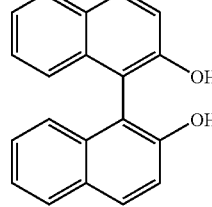

(Formula 69)

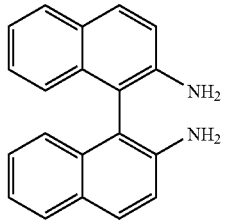

A compound containing the structures of Ar—O—X$^1$ and/or Ar—N(—X$^2$)—X$^3$ wherein Ar is represented by Formula 90 or 91 may be, as indicated in the following Formulae, an anthracene derivative represented by Formula 37 and Formula 38, with anthrarobin represented by Formula 70, 9,10-dimethoxyanthracene represented by Formula 71 or 2-aminoanthracene represented by Formula 72 and a derivative thereof being preferred, and anthrarobin or its derivative being particularly preferred.

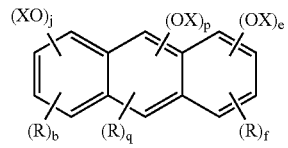
(Formula 37)

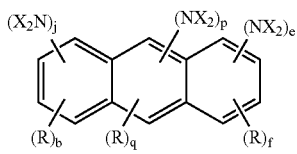
(Formula 38)

wherein each R is same or different and represents a C1-C20 hydrocarbon group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group such as a sulfonic acid group or a sulfonate group, a phosphoryl-containing group such as a phosphonic acid group or a phosphonate group, a nitro group, a cyano group or a thiocyano group, each X is same or different and represents hydrogen, a C1-C20 hydrocarbon group, a hydroxyl group- or halogen group-carrying C1-C20 hydrocarbon group, an acyl group, a sulfonyl-containing group such as a sulfonic acid group or a sulfonate group, a phosphoryl-containing group such as a phosphonic acid group or a phosphonate group or an ether bond-containing hydrocarbon group, each of j, b, e and f is 0 or an integer of 1 to 3, each of p and q is 0 or an integer of 1 to 2, provided that $0 \leq j+b \leq 4$, $0 \leq p+q \leq 2$, $0 \leq e+f \leq 4$ and $1 \leq j+p+e \leq 8$. A hydrocarbon group referred herein means an alkyl group or an aryl group which may contain in its molecular chain a substituent such as a hydroxyl group or a halogen group.

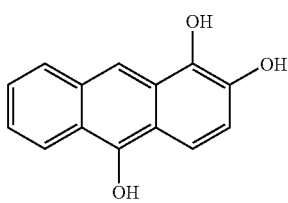
(Formula 70)

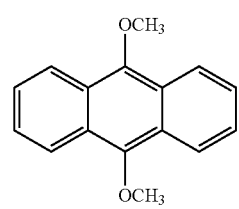
(Formula 71)

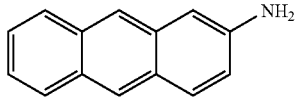
(Formula 72)

A compound containing the structures of Ar—O—$X^1$ and/or Ar—N(—$X^2$)—$X^3$ wherein Ar is represented by Formula 92 may be, as indicated in the following Formulae, a benzoquinone derivative represented by Formula 39 and Formula 40, with 2,5-dihydroxybenzoquinone represented by Formula 73 and a derivative thereof being preferred.

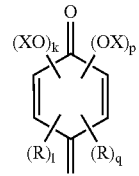
(Formula 39)

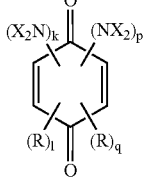
(Formula 40)

wherein each R is same or different and represents a C1-C20 hydrocarbon group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group such as a sulfonic acid group or a sulfonate group, a phosphoryl-containing group such as a phosphonic acid group or a phosphonate group, a nitro group, a cyano group or a thiocyano group, each X is same or different and represents hydrogen, a C1-C20 hydrocarbon group, a hydroxyl group- or halogen group-carrying C1-C20 hydrocarbon group, an acyl group, a sulfonyl-containing group such as a sulfonic acid group or a sulfonate group, a phosphoryl-containing group such as a phosphonic acid group or a phosphonate group or an ether bond-containing hydrocarbon group, each of k, l, p and q is 0 or an integer of 1 to 2, provided that $0 \leq k+l \leq 2$, $0 \leq p+q \leq 2$ and $1 \leq k+p \leq 4$. A hydrocarbon group referred herein means an alkyl group or an aryl group which may contain in its molecular chain a substituent such as a hydroxyl group or a halogen group.

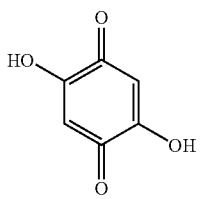
(Formula 73)

A compound containing the structures of Ar—O—$X^1$ and/or Ar—N(—$X^2$)—$X^3$ wherein Ar is represented by Formula 93 or 94 may be, as indicated in the following Formulae, a naphthoquinone derivative represented by Formula 41 and Formula 42, with 5,8-dihydroxy-1,4-naphthoquinone represented by Formula 74 or 2-aminonaphthoquinone represented by Formula 75 and a derivative thereof being preferred.

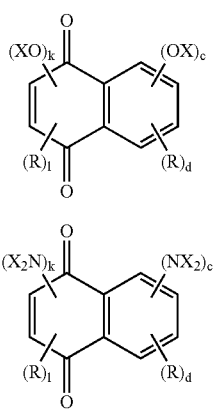

(Formula 41)

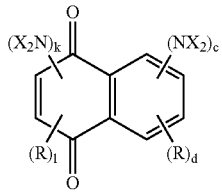

(Formula 42)

wherein each R is same or different and represents a C1-C20 hydrocarbon group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group such as a sulfonic acid group or a sulfonate group, a phosphoryl-containing group such as a phosphonic acid group or a phosphonate group, a nitro group, a cyano group or a thiocyano group, each X is same or different and represents hydrogen, a C1-C20 hydrocarbon group, a hydroxyl group- or halogen group-carrying C1-C20 hydrocarbon group, an acyl group, a sulfonyl-containing group such as a sulfonic acid group or a sulfonate group, a phosphoryl-containing group such as a phosphonic acid group or a phosphonate group or an ether bond-containing hydrocarbon group, each of k and l is 0 or an integer of 1 to 2, each of c and d is 0 or an integer of 1 to 3, provided that $0 \leq k+l \leq 2$, $0 \leq c+d \leq 4$ and $1 \leq k+c \leq 5$. A hydrocarbon group referred herein means an alkyl group or an aryl group which may contain in its molecular chain a substituent such as a hydroxyl group or a halogen group.

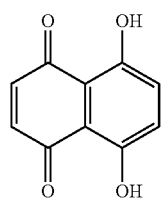

(Formula 74)

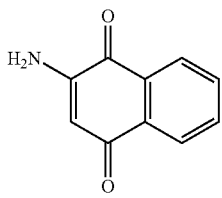

(Formula 75)

A compound containing the structures of Ar—O—X$^1$ and/or Ar—N(—X$^2$)—X$^3$ wherein Ar is represented by Formula 95 may be, as indicated in the following Formulae, an anthraquinone derivative represented by Formula 43 and Formula 44, with quinalizarin represented by Formula 76, alizarin represented by Formula 77, quinizarin represented by Formula 78, anthrarufin represented by Formula 79, emodine represented by Formula 80, 1,4-diaminoanthraquinone represented by Formula 81, 1,8-diamino-4,5-dihydroxyanthraquinone represented by Formula 82 or acid blue 25 represented by Formula 83 and a derivative thereof being preferred, with quinalizarin or 1,4-diaminoanthraquinone and its derivative being preferred particularly.

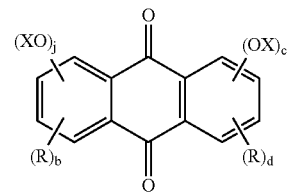

(Formula 43)

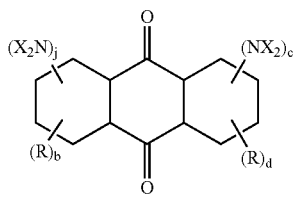

(Formula 44)

wherein each R is same or different and represents a C1-C20 hydrocarbon group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group such as a sulfonic acid group or a sulfonate group, a phosphoryl-containing group such as a phosphonic acid group or a phosphonate group, a nitro group, a cyano group or a thiocyano group, each X is same or different and represents hydrogen, a C1-C20 hydrocarbon group, a hydroxyl group- or halogen group-carrying C1-C20 hydrocarbon group, an acyl group, a sulfonyl-containing group such as a sulfonic acid group or a sulfonate group, a phosphoryl-containing group such as a phosphonic acid group or a phosphonate group or an ether bond-containing hydrocarbon group, each of j, b, c and d is 0 or an integer of 1 to 3, provided that $0 \leq j+b \leq 4$, $0 \leq c+d \leq 4$ and $1 \leq j+c \leq 6$. A hydrocarbon group referred herein means an alkyl group or an aryl group which may contain in its molecular chain a substituent such as a hydroxyl group or a halogen group.

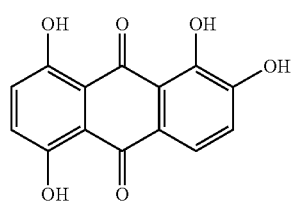

(Formula 76)

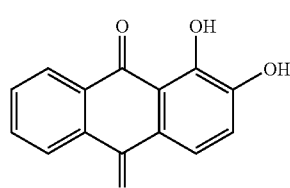

(Formula 77)

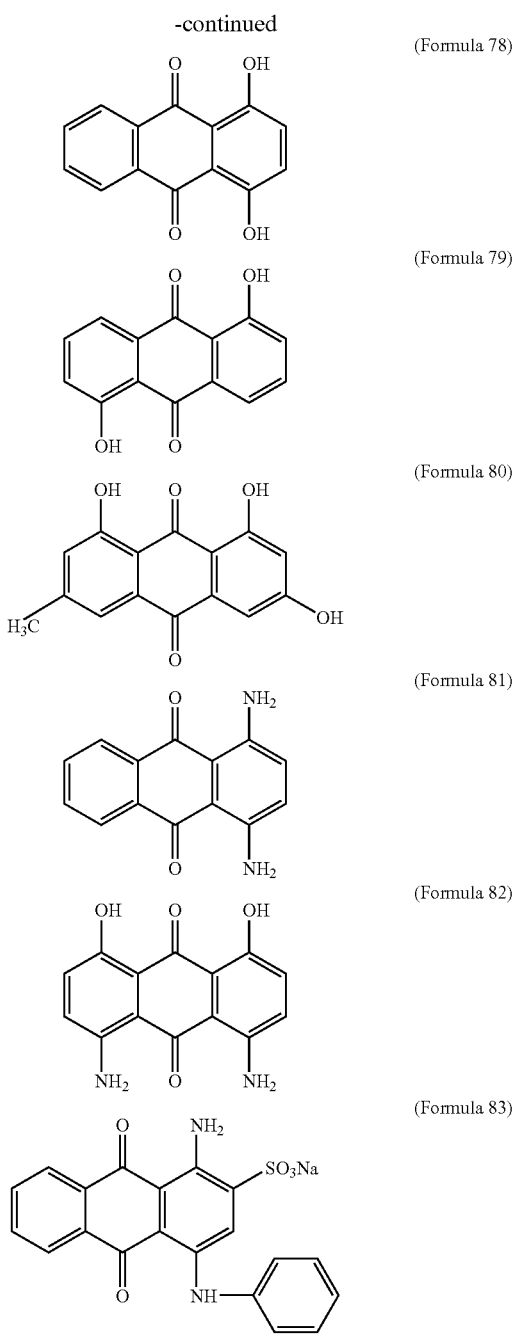

(Formula 78)
(Formula 79)
(Formula 80)
(Formula 81)
(Formula 82)
(Formula 83)

Such additive is used preferably in an amount of 0.01 to 100 moles, more preferably 0.05 to 50 moles based on the moles of a coexisting metal-containing component.

A polyester according to the invention may be produced by a known method. For example, a polymerization to obtain a PET may be performed by an esterification of terephthalic acid and ethylene glycol followed by a polycondensation, or by a transesterification between an alkylester of terephthalate such as dimethyl terephthalate and ethylene glycol followed by a polycondensation. A polymerization device may be of a batch type or a continuous process type.

A catalyst of the invention exerts a catalytic activity not only in a polycondensation but also in an esterification reaction and a transesterification reaction. For example, a polymerization by a transesterification between an alkylester of terephthalate such as dimethyl terephthalate and a glycol such as ethylene glycol is performed usually in the presence of a transesterification catalyst such as a titanium compound, such compound may be replaced or may coexist with a catalyst of the invention. A catalyst of the invention exerts a catalyst activity not only in a melt polymerization but also a solid state polymerization and a solution polymerization, and is capable of producing a polyester in any method.

While a polycondensation catalyst of the invention is added to a reaction system preferably before the initiation of a polycondensation, it may be added also before the initiation of an esterification reaction or a transesterification reaction or at any time during the course of the reaction.

A polycondensation catalyst of the invention may be added as a powder or as neat, or may also be added in a slurry or a solution in a solvent such as ethylene glycol. It may be added also as a pre-formed mixture with a metal-containing component and an organic compound component as an additives, which may also be added separately. A metal-containing component and an organic compound component may be added at the same time to a polymerization system, or may be added at different times.

A polycondensation catalyst of the invention may be used in combination with other polycondensation catalysts such as an antimony compound, a titanium compound, a germanium compound and the like each in an amount by which the properties, the processability and a final product of a polyester described above are not affected adversely.

Nevertheless, an antimony compound is added preferably at 50 ppm or less as antimony atom based on a polyester obtained after a polymerization. More preferably, it is added at 30 ppm or less. An amount of antimony of 50 ppm or more results in a precipitation of a metal antimony, which may lead to a problematic blackening or foreign body in a resultant polyester.

A germanium compound is added preferably at 20 ppm or less as germanium atom based on a polyester obtained after a polymerization. More preferably, it is added at 10 ppm or less. An amount of germanium of 20 ppm or more is not preferable since it poses a disadvantageously excessive cost.

An antimony compound which may preferably be added is antimony trioxide, antimony pentaoxide, antimony acetate, antimony glycoxide and the like, with antimony trioxide being preferred especially. A germanium compound may for example be germanium dioxide, germanium tetrachloride, with germanium dioxide being preferred.

Other polymerization catalysts such as a titanium compound, a tin compound, a cobalt compound and the like may for example be tetra-n-propyl titanate, tetraisopropyl titanate, tetra-n-butyl titanate, tetraisobutyl titanate, tetra-t-butyl titanate, tetracyclohexyl titanate, tetraphenyl titanate, tetrabenzyl titanate and the like, with tetrabutyl titanate being preferred. A tin compound may for example be dibutyltin oxide, methylphenyltin oxide, tetraethyltin, hexaethylditin oxide, triethyltin hydroxide, monobutylhydroxytin oxide, triisobutyltin acetate, diphenyltin dilaurate, monobutyltin trichloride, dibutyltin sulfide, dibutylhydroxytin oxide, methylstannic acid, ethylstannic acid, and the like, with monobutylhydroxytin oxide being employed preferably.

A polyester referred herein means a one consisting of at least one selected from a polycarboxylic acid including a dicarboxylic acid and ester derivatives thereof and at least one selected from a polyhydric alcohol including glycol, or one consisting of a hydroxycarboxylic acid and ester derivatives thereof, or one consisting of a cyclic ester.

Such dicarboxylic acid may for example be a saturated aliphatic dicarboxylic acid such as oxalic acid, malonic acid, succinic acid, glutaric acid, adipic acid, pimelic acid, suberic acid, azelaic acid, sebacic acid, decanedicarboxylic acid, dodecanedicarboxylic acid, tetradecanedicarboxylic acid, hexadecanedicarboxylic acid, 3-cyclobutanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 2,5-norbornanedicarboxylic acid, dimeric acid as well as ester-forming derivatives thereof, an unsaturated aliphatic dicarboxylic acid such as fumaric acid, maleic acid, itaconic acid as well as ester-forming derivatives thereof, and an aromatic dicarboxylic acid such as orthophthalic acid, isophthalic acid, terephthalic acid, 5-(alkaline metal)sulfoisophthalic acid, diphenic acid, 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, 4,4'-biphenyldicarboxylic acid, 4,4'-biphenylsulfonedicarboxylic acid, 4,4'-biphenyletherdicarboxylic acid, 1,2-bis(phenoxy)ethane-p,p'-dicarboxylic acid, pamoic acid, anthracenedicarboxylic acid as well as ester-forming derivatives thereof.

A polycarboxylic acid other than the dicarboxylic acids listed above may for example be ethanetricarboxylic acid, propanetricarboxylic acid, butanetetracarboxylic acid, pyromellitic acid, trimellitic acid, trimesic acid, 3,4,3',4'-biphenyltetracarboxylic acid, as well as ester-forming derivatives thereof.

A glycol may for example be an aliphatic glycol such as ethyelene glycol, 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentanediol, neopentylglycol, 1,6-hexanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, 1,10-decamethylene glycol, 1,12-dodecanediol, polyethylene glycol, polytrimethylene glycol, polytetramethylene glycol and the like and an aromatic glycol such as hydroquinone, 4,4'-dihydroxybisphenol, 1,4-bis(β-hydroxyethoxy)benzene, 1,4-bis(β-hydroxyethoxyphenyl)sulfone, bis(p-hydroxyphenyl)ether, bis(p-hydroxyphenyl)sulfone, bis(p-hydroxyphenyl)methane, 1,2-bis(p-hydroxyphenyl)ethane, bisphenol A, bisphenol C, 2,5-naphthalenediol as well as an ethyleneoxide adduct thereof.

A polyhydric alcohol other than the glycols listed above may for example be trimethylolmethane, trimethylolethane, trimethylolpropane, pentaerythritol, glycerol, hexanetriol and the like.

A hydroxycarboxylic acid may for example be lactic acid, citric acid, malic acid, tartaric acid, hydroxyacetic acid, 3-hydroxybutyric acid, p-hydroxybenzoic acid, p-(2-hydroxyethoxy)benzoic acid, 4-hydroxycyclohexanecarboxylic acid as well as ester-forming derivatives thereof.

A cyclic ester may for example be ε-caprolactone, β-propiolactone, β-methyl-β-propiolactone, δ-valerolactone, glycolide, lactide and the like.

An ester-forming derivative of a polycarboxylic acid or a hydroxycarboxylic acid may for example be an alkylester, an acid chloride and an acid anhydride thereof.

A polyester of the invention may contain as a copolymerization component a known phosphorus-based compound. Such phosphorus-based compound is preferably a bifunctional phosphorus-based compound such as dimethyl phenylphosphonate, diphenyl phenylphosphonate, (2-carboxylethyl)methylphosphinic acid, (2-carboxyethyl) phenylphosphinic acid, methyl (2-methoxycarboxyethyl) phenylphosphinic acid, methyl(4-methoxycarbonylphenyl) phenylphosphinic acid, ethylene glycol ester of [2-(β-hydroxyethoxycarbonyl)ethyl]methylphosphinic acid, (1,2-dicarboxyethyl)dimethylphosphineoxide, 9,10-dihydro-10-oxa-(2,3-carboxypropyl)-10-phosphaphenanthrene-10-oxide and the like. The presence of such phosphorus-based compound as a copolymerization component serves to improve the properties such as flame retardant property of a resultant polyester.

A polyester of the invention is preferably a polyethylene terephthalate, a polybutylene terephthalate (PBT), a polypropylene terephthalate, a poly(1,4-cyclohexanedimethylene terephthalate) (CHDM-modified PET), a polyethylene naphthalate (PEN), a polybutylene naphthalate as well as a copolymer thereof, with a polyethylene terephthalate being especially preferred.

A polyethylene terephthalate referred herein means a polyester whose main repeating unit consists of ethylene terephthalate and which comprises terephthalic acid or its ester-forming derivative in an amount of 70% by mole or more, preferably 80% by mole or more, more preferably 90% by mole or more in total based on the entire acid components. One preferred is a polyester whose glycol component is ethylene glycol and which comprises ethylene glycol in an amount of 70% by mole or more, preferably 80% by mole or more, more preferably 90% by mole or more in total based on the entire glycol components.

A polyethylene naphthalate referred herein means a polyester whose main acid component is naphthalene dicarboxylic acid or an ester-forming derivative thereof and whose main glycol component is ethylene glycol. A polyester whose main acid component is naphthalene dicarboxylic acid or an ester-forming derivative thereof means a polyester which comprises naphthalene dicarboxylic acid or its ester-forming derivative in an amount of 70% by mole or more, preferably 80% by mole or more, more preferably 90% by mole or more in total based on the entire acid components. A polyester whose main glycol component is ethylene glycol means a polyester which comprises ethylene glycol in an amount of 70% by mole or more, preferably 80% by mole or more, more preferably 90% by mole or more based on the entire glycol components.

Naphthalene dicarboxylic acid or an ester-forming derivative employed as a starting material for a polyethylene naphthalate may preferably be 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid or an ester-forming derivative thereof. Among these listed above, 2,6-naphthalenedicarboxylic acid or an ester-forming derivative thereof is preferred particularly.

A PBT means a polyester whose main acid component is terephthalic acid or an ester-forming derivative thereof and whose main glycol component is 1,4-butanediol. A polyester whose main acid component is terephthalic acid or an ester-forming derivative thereof means a polyester which comprises terephthalic acid or its ester-forming derivative in an amount of 70% by mole or more, preferably 80% by mole or more, more preferably 90% by mole or more in total based on the entire acid components. A polyester whose main glycol component is 1,4-butanediol means a polyester which comprises 1,4-butanediol in an amount of 70% by mole or more, preferably 80% by mole or more, more preferably 90% by mole or more based on the entire glycol components.

When a catalyst of the invention is employed as a polymerization catalyst to obtain a PBT, the formation of tetrahydrofuran as a by-product can efficiently be suppressed.

A polypropylene terephthalate referred herein means a polyester whose main acid component is terephthalic acid or an ester-forming derivative thereof and whose main glycol component is 1,3-propanediol. A polyester whose main acid component is terephthalic acid or an ester-forming derivative thereof means a polyester which comprises terephthalic acid or its ester-forming derivative in an amount of 70% by mole or more, preferably 80% by mole or more, more preferably 90% by mole or more in total based on the entire acid components. A polyester whose main glycol component is 1,3-propanediol means a polyester which comprises 1,3-propanediol in an amount of 70% by mole or more, preferably 80% by mole or more, more preferably 90% by mole or more based on the entire glycol components.

A copolyester of cyclohexanedimethanol (CHDM-PET) referred herein means a copolyester whose main acid component is terephthalic acid or an ester-forming derivative thereof and whose main glycol component is ethylene glycol or a cyclohexanedimethanol. A copolyester whose main acid component is terephthalic acid or an ester-forming derivative thereof means a copolyester which comprises terephthalic acid or its ester-forming derivative in an amount 90% by mole or more in total based on the entire acid components. A copolyester whose main glycol component is ethylene glycol or a cyclohexanedimethanol means a copolyester which comprises, in the glycol components of this copolyester, 90 to 5% by mole of ethylene glycol and 10 to 95% by mole of a cyclohexanedimethanol together with 10% by mole or less of a glycol other than ethylene glycol or the cyclohexanedimethanol.

A cyclohecanedimethanol employed herein may preferably be 1,2-cyclohexanedimethanol, 1,3-cyclohexanedimethanol and 1,4-cyclohexanedimethanol. Among those listed above, 1,4-cyclohexanedimethanol is preferred particularly.

In any of those polyethylene terephthalate, polybutylene terephthalate (PBT), polypropylene terephthalate, poly(1,4-cyclohexanedimethylene terephthalate) (CHDM-modified PET), polyethylene naphthalate (PEN) and polybutylene naphthalate described above, an appropriate component including polycarboxylic acids or polyhydric alcohol described above, in addition to its major components such as acid and glycol components, may also be copolymerized if desired in a preferred embodiment.

A polymerization to obtain a polyester using a polymerization catalyst employed to produce a polyester of the invention can be performed by a known method. Thus, for example in the case of a PET, an amount of terephthalic acid and a doubled molar amount of ethylene glycol are placed in a batch-type autoclave fitted with a stirrer and subjected to an esterification reaction under a pressure of 2.5 kg/cm$^2$ at 245° C. with distilling water formed off from the reaction system to produce bis(2-hydroxyethyl)terephthalate. When the % esterification reached 95% when calculating from the amount of water distilled off, the pressure is released. Then a catalyst of the invention is added and the mixture is stirred for 10 minutes or longer at 245° C. under nitrogen under atmospheric pressure. The reaction mixture is then heated to 275° C. over a period of 50 minutes with reducing the pressure in the reaction system gradually to 0.1 Torr, under which a polycondensation is performed further at 275° C. with stirring at a constant rate to obtain a polyethylene terephthalate. The time period required for this polycondensation is referred to as the polymerization time.

An AP in the invention is a time period (min) required for a polymerization to obtain a polyethylene terephthalate whose intrinsic viscosity is 0.5 dl/g using a method described above. Antimony trioxide employed to determine a T may be a commercial product of antimony trioxide, such as Antimony (III) oxide produced by ALDRICH whose purity is 99.999%, which is dissolved at about 10 g/L in ethylene glycol with stirring for about 1 hour at 150° C. to form a solution, which is then added at 0.05% by mole as antimony atom based on the acid components of a resultant polyethylene terephthalate.

A compound which has substantially no catalytic activity for a polyester polymerization referred herein means one giving a limit activity parameter (LP) fulfilling the relationship: LP (min)>2T (min), wherein LP is a time period (min) required for a polymerization to obtain a polyethylene terephthalate whose intrinsic viscosity is 0.3 dl/g using a method described above.

A compound which substantially has a catalytic activity for a polyester polymerization is one fulfilling the relationship: AP (min)<2T (min). The relationship: AP (min)<1.5T (min) is preferable, and the relationship: AP (min)<T (min) is more preferable.

A polyester of the invention may contain a phosphorus-, sulfur- or amine-based stabilizer or a phenolic or aromatic amine-based antioxidant, and by incorporating at least one of such additives the thermal stability of the polyester can further be enhanced. Such phosphorus-based stabilizer may for example be phosphoric acid and a phosphate such as trimethyl phosphate, phosphorous acid, a phosphite such as triphenyl phosphite, tris(2,4-di-t-butylphenyl)phosphite, tetrakis(2,4-di-t-butylphenyl)4,4'-biphenylene diphosphite and the like, a phosphbnous acid ester such as distearylpentaerythritol diphosphite, phosphonic acid including methylphosphonic acid and phenylphosphonic acid, as well as a mono- or di-alkyl phosphonate. A phenol-based antioxidant may for example be tetrakis-[methyl-3-(3',5'-di-t-butyl-4-hydroxyphenyl)propionate]methane and 4,4'-butylidenebis-(3-methyl-6-t-butylphenol).

After a polymerization by a method of the invention to form a polyester, the thermal stability of the polyester can further be enhanced by removing a catalyst from the polyester or by adding a phosphorus-based compound to inactivate the catalyst.

In a polyester of the invention, a blue color-imparting agent such as a cobalt compound, an organic, inorganic or organometalic toner, and a optical brightner may be incorporated, whereby suppressing an undesirable discoloration of the polyester such as yellowing. Other optional polymer or additives such as stabilizer, antioxidant, antistatic, defoaming agent, dyeing modifier, dye, pigment, dulling agent and optical brightner may also be added.

In order to use a polyester of the invention such as a PBT and a polypropylene terephthalate in a molded article such as an automobile part or an electric/electronic part, a reinforcing agent such as a glass fiber and an inorganic filler may preferably be filled to enhance the dimension stability, the strength and the rigidity of the molded article.

A polyester of the invention is melted and kneaded by a known method such as an extrusion or a calendering and then quenched to obtain an non-oriented film, which is then subjected to a sequential biaxial orientation, a simultaneous biaxial orientation, a longitudinal uniaxial orientation, a widthwise uniaxial orientation or a combination thereof to form an oriented film. A biaxial orientation can effectively be accomplished by a sequential biaxial orientation regardless or the order of the directions. While the orientation magnification may vary depending on the uses, it is preferably 2 to 7 times in each of the longitudinal and widthwise directions. A biaxially oriented film obtained by a biaxial orientation is employed in various use, and best suited especially to a magnetic tape.

A film exhibiting an excellent heat shrinkage performance can be obtained when performing the orientation by 2.5 to 7.0 times, preferably 3.0 to 6.0 times in one direction and then by 1.0 times to 2.0 times, preferably 1.1 to 1.8 times in the other direction which is at a right angle with the first direction. In such case, the orientation in the first direction is intended mainly to obtain a high heat shrinkage performance, while the orientation in the direction at a right angle with the first direction is effective in covering the insufficient impact resistance and tearing resistance of the film after oriented in the first direction. A heat shrinkable film thus obtained is applied to a packaging, especially of a food product or a pharmaceutical product, as well as other various products, in order to indicate the content and the supplier of such product, and also used as a capping seal over a packaging label or container to serve as a safety shield for preventing a contamination with a foreign body, a degradation of a packaged product and a damage and a dusting on a displayed article, and further can be used as a packaging material to bundle the articles.

A method for an orientation is not limited particularly, and may for example be a roll orientation, a long gap orientation, a tentering and a tubular orientation. It is a matter of course that a heat setting may be employed as desired in an orientation. The thickness of a film is preferably 1 to 300 µm. A polyester film obtained using a catalyst of the invention contains a reduced amount of the foreign bodies resulted from a polymerization catalyst and undergoes a reduced thermal degradation in a melt processing. Accordingly, a dirt on a die upon an extrusion and a defect or discoloration on the film surface can also be reduced.

A polyester as a starting material for a polyester film of the invention preferably contains a slipping agent for obtaining a slipperiness. Such a slipping agent may for example be silica, alumina, alminosilicate, $BaSO_4$ and $CaSO_4$.

A polyester of the invention is suitable also for a molded article, especially a molded hollow article such as a PET bottle, which is formed preferably with a PEN or a PET, more preferably with a PET.

The intrinsic viscosity of a polyester for a molded hollow article such as a PET bottle is 0.57 to 0.90 dl/g, preferably 0.58 to 0.88 dl/g, more preferably 0.60 to 0.85 dl/g. An intrinsic viscosity of 0.57 dl/g or less results in a poor mechanical property of a resultant molded hollow article. An intrinsic viscosity exceeding 0.90 dl/g results in an elevated resin temperature in a melt process performed using a molding machine, which leads to an excessive thermal degradation, resulting in a problem such as an increase in free low molecular weight compounds by which a flavor-maintaining ability is affected adversely and an yellowing of the molded hollow article.

A PET for a molded hollow article preferably contains as a glycol component diethylene glycol in an amount of 1.5 to 5.0% by mole, preferably 1.6 to 4.5% by mole, more preferably 1.7 to 4.0% by mole based on the glycol components. An amount of diethylene glycol of 1.5% by mole or less may lead to a poor transparency of a resultant molded hollow article. An amount of diethylene glycol of 5.0% by mole or more leads to a reduced glass transition point of a polyester resin, which leads to a reduced heat resistance of a resultant molded hollow article, and an accompanying poor thermal stability allows acetaldehyde to be contained in a markedly increased amount upon molding, by which a flavor-maintaining ability is affected adversely.

A polyester for a molded hollow article such as a PET bottle contains acetaldehyde at 10 ppm or less, preferably 8 ppm or less, more preferably 5 ppm or less. A polyester whose acetaldehyde content is 10 ppm or less leads to a poor taste or flavor of the product contained in a package molded therefrom.

The acetaldehyde content in a starting polyester can be reduced by performing a solid state polymerization.

A polyester for a molded hollow article preferably has a cyclic trimer content of 0.35% by weight or less, more preferably 0.33% by weight or less, further preferably 0.32% by weight or less. While a heat treatment is performed in a heated mold when a heat resistant molded hollow article is produced from a polyester of the invention, a cyclic trimer content of 0.35% by weight or more results in a rapid increase in the oligomers depositing onto the surface of the heated mold, which leads to an extremely poor transparency of the resultant molded hollow article.

A molded hollow article employing a polyester of the invention can be produced by an ordinary melt molding method such as an injection blow method, a direct blow method and an orientation blow method.

In the manufacturing an oriented molded hollow article is produced, a known hot parison or cold parison method can be employed to produce a transparent, highly heat resistant, molded hollow article from a polyester of the invention. When a polyester of the invention is used to produce an oriented molded hollow article, a preliminary molded article is first produced by an injection molding, and then molded by an orientation blow method to obtain a bottle. An injection molding may be performed usually at an injection temperature of about 265 to about 300° C. under an injection pressure of about 30 to about 70 kg/cm² to obtain a preliminary molded article. The opening of this preliminary molded article is heated to effect a crystallization. The preliminary molded article thus obtained is preheated to about 80 to about 120° C. in a cold parison method or cooled to about 80 to about 120° C. in a hot parison method. This preliminary molded article is subjected to an orientation blow molding in a blow mold at about 120 to about 210° C. followed by a heat treatment for about 0.5 to about 30 seconds. The orientation magnification is usually 1.3 to 3.5 times in the longitudinal direction and 2 to 6 times in the circumferential direction.

A polyester of the invention may be employed also in a molded multilayer hollow article.

It is preferable to use a polyester of the invention as a fiber. In a polyester forming a fiber, 80% by mole or more of the repeating units preferably consists of the units of ethylene terephthalate or ethylene naphthalate. A production of a polyester of the invention may employ an ordinary spinning condition, which involves a spinning speed of 700 to 8000 m/min, preferably 2000 to 5000 m/min.

A spinning speed of 700 m/min or less is not practical since it results in a low productivity and a high cost. A spinning speed of 8000 m/min or higher is not preferable since it results in a significant problem involving an accompanying flow occurring upon the spinning which should be controlled technically and a snapping of the thread which can not be avoided unless the spinning machine is improved, although such speed is desirable theoretically for a higher productivity.

A spanned yarn thus drawn out is wound once then subjected to an orientation process, or may be oriented without being wound and used as an oriented yarn. The yarn may be as superfine as 1 dpf or may be thickened up to 100 dpf.

Depending on the uses, the yarn may be pre-twisted or shrinked and the sectional area may be round, triangle, hollow or any other forms. A bicomponent spinning together with other material may also be performed.

In any of the cases described above, an orientation magnification of 1.3 times or less can not give a sufficient strength. An orientation by 3.5 times or more can not be accomplished stably in an ordinary orientation process.

When applied to a staple, the fiber length is preferably 3 to 200 mm, more preferably 10 to 150 mm as well known in the art. The % shrinkage is preferably 5 to 35%, more preferably 8 to 30%, also as well known in the art.

When a polyester of the invention is used as a industrial polyester fiber, it preferably has a strength at break of 6 g/d or more and an elongation at break of 12% or more, with a strength at break of 7 g/d or more being more preferred.

In a preferred embodiment, a compound having a metallosulfonate group is copolymerized as a constituent of a polyester for a fiber.

A polyethylene terephthalate fiber has an insufficient dyeability and can be dyed only by a dispersion dye, it poses a difficulty in being colored deeply or vividly. In an attempt to improve the dyeability, a metallosulfonate group-containing isophthalic acid compound is copolymerized into the backbone of a polyethylene terephthalate frequently to achieve a satisfactory dyeing with a cationic dye. Nevertheless, a conventional metallosulfonate group-containing polyester tends to allow an insoluble foreign body attributable to a metallosulfonate group-containing isophthalic acid compound present as a monomer to be present in the polymer, and poses a substantial increase in the back pressure of a nozzle upon a melt spinning, which may lead to a problematic reduction in the spinning performance.

According the aspects of the invention discussed above, the formation of an insoluble foreign body specific to a metallosulfonate group-containing modified polyester fiber can mostly be controlled, and a polyester fiber with which the increase in the back pressure of a nozzle upon a melt spinning is reduced and which can be spanned and dyed satisfactorily and applicable to a wide range of the dyes can be obtained.

A metallosulfonate group-containing employed as a copolymerisable monomer is not particularly limited, and may for example be 5-sodium sulfoisophthalic acid, 2-sodium sulfoterephthalic acid, 5-lithium sulfoisophthalic acid, 2-lithium sulfoterephthalic acid, 5-potassium sulfoisophthalic acid, 2-potassium sulfoterephthalic acid as well as a lower alkylester derivative thereof. In the present invention, 5-sodium sulfoisophthalic acid or an ester-forming derivative thereof is preferred.

The amount of a metallosulfonate group-containing compound to be copolymerized is 0.3 to 10.0% by mole, more preferably 0.80 to 5.0% by mole based on the acid components constituting a polyester. A smaller amount of the copolymerization results in a poor dyeing with a cationic dye, while a larger amount results in a poor spinning performance and a unexpected increase of melt viscosity of the polyester which leads to a poor fiber strength. A metallosulfonate group-containing compound copolymerized in an amount of 2.0% by mole ore more serves to impart a resultant modified polyester fiber with an ability of being dyed under atmospheric pressure. An appropriate easy-dyeable monomer may be selected to reduce the amount of a metallosulfonate group-containing compound. Such easy-dyeable monomer is not particularly limited, and may for example be a long chain glycol compound such as polyethylene glycol and polytetramethylene glycol and an aliphatic dicarboxylic acid such as adipic acid, sebacic acid and azelaic acid. Otherwise, any compound capable of acting as a plasticizer on a polyester can serve as a easy-dyeabile monomer. Such easy-dyeabile monomer is employed in an amount of 0.5 to 7.0% by weight based on a resultant modified polyester.

A metallosulfonate group-containing polyester fiber of the invention can be subjected to an caustic treatment similarly to a known metallosulfonate group-containing polyester fiber.

The present invention is applicable also to a bicomponent fiber in a core-sheath structure or a back-front structure. In such case, a fiber in which a modified polyester can be incorporated as one of the core-sheath components or the back-front components can be obtained.

A polyester fiber of the invention preferably contains a phosphorus compound. A phosphorus compound serves to make the fiber flame retardant.

A method for making a polyester fiber flame retardant may for example be a method in which a flame retardant agent is copolymerized or blended upon producing a polymer, a method in which a flame retardant agent is kneaded in during a manufacturing process, and a method in which the surface of a fiber is finished with a coating of a flame retardant agent. Among these methods, a method in which the surface of a fiber is finished with a coating of a flame retardant agent results in a rough texture or may leads to a reduced efficiency due to a fall off of the flame retardant agent by washing or rubbing. A method in which a flame retardant agent is kneaded in may result in a problematic bleed-out of the flame retardant agent during the manufacturing process of a molded article. On the contrary, a method in which a flame retardant is copolymerized or blended upon producing a polymer can overcome the troubles described above, and thus is most valuable industrially.

However, an flame retardant polyester fiber obtained by a copolymerization with a phosphorus compound as a flame retardant exhibits a disadvantageously poor spinning performance. Such disadvantageous performance is attributable to an antimony compound such as antimony trioxide which is a catalyst employed in a polycondensation, and a coexistence of a phosphorus compound causes an increase in the reducing effect, resulting in the promotion of the precipitation of metal antimony, which may lead to a poor spinning performance.

According to the aspects of the invention described above, a flame retardant polyester which is not expensive and exhibits satisfactory thermal stability and spinning performance can be obtained.

A phosphorus compound employed as a copolymerizable monomer in a flame retardant polyester fiber of the invention is not particularly limited, and may be a phosphate and its derivative, a phosphonic acid and its derivative, a phosphine and its derivative, which may be employed alone or in combination with each other. A phosphate and its derivative may for example be trimethyl phosphate, triethyl phosphate and the like. A phosphonic acid and its derivative may for example be phenylphosphonic acid, dimethylphosphonic acid, diethylphosphonic acid and the like, while a phosphinic acid and its derivative may for example be (2-carboxyethyl)methylphosphinic acid, (2-carboxyethyl)ethylphosphinic acid, (2-methoxycarbonylethyl)methylphosphonic acid, methyl (2-β-hydroxyethoxycarbonylethyl)methylphospnate, (2-carboxyethyl)phenylphosphinic acid, 9,10-dihydro-9-oxa-10-phosphaphenanthrene-10-oxide maleic acid adduct or itaconic acid adduct. It is not necessary that all of a phosphorus compound is copolymerized with a polyester. The amount of a phosphorus compound, as phosphorus atom, to be added should be 0.2 to 3.0% by weight based on the entire weight of a fiber. The phosphorus atom content is preferably 0.3 to 2.0% by weight, more preferably 0.30 to 1.0% by weight. A smaller amount of a phosphorus compound results in an insufficient flame retardant characteristic, while a larger amount results in a poor spinning performance.

In another preferred embodiment, a polyester fiber containing a metallosulfonate group together with a phosphorus compound is provided. Also in such case, a phosphorus compound is present preferably in an amount, as phosphorus atom, of 0.2 to 3.0% by weight based on the entire weight of a fiber and also in an amount of 0.3 to 10% by mole based on the entire dicarboxylic acid components constituting a polyester.

EXAMPLES

The present invention is further described in the following Examples which are not intended to restrict the invention.

In each of Examples and Comparatives, the physical parameters, IV and TD, of a polyester were determined as described below.

Intrinsic viscosity (IV): IV was measured at 30° C. using a 6/4 solvent mixture (weight ratio) of p-Chlorophenol/1,1,2,2-tetrachloroethane.

Thermal stability degree (TD): 1 g of a PET whose IV was 0.6 dl/g was placed in a glass tube and dried under vacuum at 130° C. for 12 hours, melted under nitrogen atmosphere at 300° C. for 2 hour, and then examined for a % reduction in IV, which was regarded as a TD.

The organic compound components employed in the invention are designated by the symbols as shown below.

(A): Quinalizarin (B): Alizarin (C): Emodine (D): 1,4-Diaminoanthraquinone (E): 1,8-Diamino-4,5-dihydroxyanthraquinone (F): 5,8-Dihydroxy-1,4-naphthoquinone (G): 2,5-Dihydroxybenzoquinone (H): Anthrarobin (I): Disodium 4,5-dihydroxynaphthalene-2,7-disulfonate (J): Esucletin (K): Morin (L): Epigallocatechin gallate (M): Methylene-bridged linear phenolic compound (mixture of monomer to 100-mer)

(N): Methylene-bridged linear p-butylphenolic compound (mixture of monomer to 100-mer)

(O): Calix [8] arene (P): p-t-Butyl Calix [8] arene (Q): 2,2'-Bisphenol (R): 2,2'-Dihydroxydiphenylether (S): 2,2'-Thiobis(4-t-octylphenol)

(T): 1,1'-bi-2-naphthol (U): Acid Blue 25

(V): 2-Aminonaphthoquinone (W): 1,1'-Binaphtnyl-2,2'-diamine (X): Epicatechin (Y): 2-Aminobiphenyl (Z): 1,8-Diaminonaphthalene (AA): 2-Aminochromone (BB): 7-Amino-4-methylcoumarine (CC): Anthrarufin

Example 1

Example 1-1

8900 Parts by weight of bis(2-hydroxyethyl)terephthalate was mixed with 0.23 parts by volume of a 5 g/L solution of lithium acetate in ethylene glycol, and then quinalizarin (A) was added at 0.1% by mole based on the acid components in the polyester and stirred under atmospheric pressure at 245° C. for 10 minutes. The temperature was elevated over a period of 50 minutes to 275° C. with reducing the pressure of the reaction system gradually to 0.1 Torr, under which pressure a polycondensation was performed at the same temperature for 180 minutes. The parameter (IV) of the resultant polymer is shown in Table 1-1.

Examples 1-2 to 1-18

The polymerization was performed similarly to Example 1-1 except for using other organic compound components instead of quinalizarin to obtain polyesters. The physical parameters of the polymers obtained are shown in Table 1-1. The organic compounds employed were (A) quinalizarin, (B) alizarin, (C) emodine (D) 1,4-diaminoanthraquinone, (E) 1,8-diamino-4,5-dihydroxyanthraquinone, (F) 5,8-dihydroxy-1,4-naphthoquinone, (G) 2,5-dihydroxybenzoquinone (H) anthrarobin, (I) disodium 4,5-dihydroxynaphthalene-2,7-disulfonate, (J) esucletin (K) morin, (L) epigallocatechin gallate (M) methylene-bridged linear phenolic compound (mixture of monomer to 100-mer), (N) methylene-bridged linear p-butylphenolic compound (mixture of monomer to 100-mer), (O) Calix [8] arene, (P) p-t-butyl Calix [8] arene, (Q) 2,2'-bisphenol and (R) 2,2'-dihydroxydiphenylether, which are indicated by the symbols in the table.

Comparative 1-1

The polymerization was performed similarly to Example 1-1 except for using no quinalizarin to obtain a polyester. The physical parameter (IV) of the polymer obtained are shown in Table 1-1.

Comparative 1-2

The polymerization was performed similarly to Example 1-1 except for using no solution of lithium acetate in ethylene glycol to obtain a polyester. The physical parameter of the polymer obtained are shown in Table 1-1.

Example 1-19

8900 Parts by weight of bis(2-hydroxyethyl)terephthalate was mixed with 0.29 parts by volume of a 5 g/L solution of sodium acetate in ethylene glycol, and then quinalizarin (A) was added at 0.1% by mole based on the acid components in the polyester and stirred under atmospheric pressure at 245° C. for 10 minutes. The temperature was elevated over a period of 50 minutes to 275° C. with reducing the pressure of the reaction system gradually to 0.1 Torr, under which pressure a polycondensation was performed at the same temperature for 180 minutes. The parameter of the resultant polymer is shown in Table 1-2.

Examples 1-20 to 1-36

The polymerization was performed similarly to Example 1-19 except for using other organic compounds component instead of quinalizarin to obtain polyesters. The physical parameters of the polymers obtained are shown in Table 1-2.

Comparative 1-3

The polymerization was performed similarly to Example 1-19 except for using no quinalizarin to obtain a polyester. The physical parameter of the polymer obtained are shown in Table 1-2.

Example 1-37

8900 Parts by weight of bis(2-hydroxyethyl)terephthalate was mixed with 0.34 parts by volume of a 5 g/L solution of potassium acetate in ethylene glycol, and then quinalizarin (A) was added at 0.1% by mole based on the acid components in the polyester and stirred under atmospheric pressure at 245° C. for 10 minutes. The temperature was elevated over a period of 50 minutes to 275° C. with reducing the pressure of the reaction system gradually to 0.1 Torr, under which pressure a polycondensation was performed at the same temperature for 180 minutes. The parameter of the resultant polymer is shown in Table 1-3.

Examples 1-38 to 1-54

The polymerization was performed similarly to Example 1-37 except for using other organic compounds component instead of quinalizarin to obtain polyesters. The physical parameters of the polymers obtained are shown in Table 1-3.

Comparative 1-4

The polymerization was performed similarly to Example 1-37 except for using no quinalizarin to obtain a polyester. The physical parameter of the polymer obtained are shown in Table 1-3.

Example 1-55

8900 Parts by weight of bis(2-hydroxyethyl)terephthalate was mixed with 0.36 parts by volume of a 10 g/L solution of beryllium acetate in ethylene glycol, and then quinalizarin (A) was added at 0.1% by mole based on the acid components in the polyester and stirred under atmospheric pressure at 245° C. for 10 minutes. The temperature was elevated over a period of 50 minutes to 275° C. with reducing the pressure of the reaction system gradually to 0.1 Torr, under which pressure a polycondensation was performed at the same temperature for 180 minutes. The parameter (IV) of the resultant polymer is shown in Table 1-4.

Examples 1-56 to 1-72

The polymerization was performed similarly to Example 1-55 except for using other organic compounds component instead of quinalizarin to obtain polyesters. The physical parameters of the polymers obtained are shown in Table 1-4. The organic compound components employed were similar to those employed in Examples 1-2 to 1-18.

Comparative 1-5

The polymerization was performed similarly to Example 1-55 except for using no quinalizarin to obtain a polyester. The physical parameter of the polymer obtained are shown in Table 1-4.

Example 1-73

8900 Parts by weight of bis(2-hydroxyethyl)terephthalate was mixed with 0.19 parts by volume of a 10 g/L solution of magnesium acetate in ethylene glycol, and then quinalizarin (A) was added at 0.1% by mole based on the acid components in the polyester and stirred under atmospheric pressure at 245° C. for 10 minutes. The temperature was elevated over a period of 50 minutes to 275° C. with reducing the pressure of the reaction system gradually to 0.1 Torr, under which pressure a polycondensation was performed at the same temperature for 180 minutes. The parameter of the resultant polymer is shown in Table 1-5.

Examples 1-74 to 1-90

The polymerization was performed similarly to Example 1-73 except for using other organic compounds component instead of quinalizarin to obtain polyesters. The physical parameters of the polymers obtained are shown in Table 1-5.

Comparative 1-6

The polymerization was performed similarly to Example 1-73 except for using no quinalizarin to obtain a polyester. The physical parameter of the polymer obtained are shown in Table 1-5.

Example 1-91

8900 Parts by weight of bis(2-hydroxyethyl)terephthalate was mixed with 0.23 parts by volume of a 5 g/L solution of lithium acetate in ethylene glycol (corresponding to 0.05% by mole as Li atom of lithium acetate), and then quinalizarin (A) was added at 0.1% by mole based on the acid components in the polyester and stirred under nitrogen flow under atmospheric pressure at 245° C. for 10 minutes. The temperature was elevated over a period of 50 minutes to 275° C. with reducing the pressure of the reaction system gradually to 0.1 Torr, and then a polycondensation was performed at 275° C. under 0.1 Torr. The polymerization time period required to raise the IV of the PET to 0.5 dl/g is shown in Table 1-6 (1). A PET whose IV was 0.6 dl/g was also produced by the polymerization method described above and examined for the thermal stability degree (TD). The IV and the TD after a fusion test are shown in Table 1-6 (1).

Examples 1-92 to 1-118 and Comparative 1-7 to 1-9

The procedure similar to that in Example 1-91 was employed except for using other catalysts. The composition of each catalyst used, the polymerization time period required to raise the IV of a PET to 0.5 dl/g and the TD value are shown in Table 1-6(1), (2) and 1-8. The amount is based on the acid components in a PET. The amount of a metal catalyst is the amount as metal atom.

Comparative 1-10, Comparative 1-24

An attempt was made to obtain a PET by the polymerization procedure similar to that in Example 1-91 except for using no quinalizarin. The polymerization was discontinued unsuccessfully since the IV after the polycondensation for 180 minutes did not reach 0.5 dl/g. The same results were obtained even when the amount of lithium acetate added was increased to 0.3% by mole.

Comparative 1-15, Comparative 1-25

An attempt was made to obtain a PET by the polymerization procedure similar to that in Example 1-91 except for using no solution of lithium acetate in ethylene glycol. The polymerization was discontinued unsuccessfully since the IV after the polycondensation for 180 minutes did not reach 0.5 dl/g. The same results were obtained even when the amount of quinalizarin added was increased to 0.2% by mole.

Example 1-119 to 1-134

The procedure similar to that in Example 1-91 was employed except for using other catalysts. The composition of each catalyst used, the polymerization time period required to raise the IV of a PET to 0.5 dl/g and the TD value are shown in Table 1-7(1) and (2). The amount is based on the acid components in a PET. The amount of a metal catalyst is the amount as metal atom.

Comparative 1-12

An attempt was made to obtain a polyethylene terephthalate by the polymerization procedure similar to that in Example 100 except for using no quinalizarin. The polymerization time period required to raise the IV of the polyethylene terephthalate to 0.3 dl/g is shown in Table 1-8.

Comparative 1-13

An attempt was made to obtain a polyethylene terephthalate by the polymerization procedure similar to that in Example 100 except for using no sodium acetate in ethylene glycol. The polymerization time period required to raise the IV of the polyethylene terephthalate to 0.3 dl/g is shown in Table 1-8.

Comparatives 1-14 to 1-23

An attempt was made to obtain each polyethylene terephthalate by the polymerization procedure similar to that in Example 1-91 except for using different type and amount of the catalyst. The composition of each catalyst employed and the polymerization time period required to raise the IV of each polyethylene terephthalate to 0.3 dl/g is shown in Table 1-8. The amount is based on the acid components in a PET. The amount of a metal catalyst is the amount as metal atom.

Comparative 1-26

The procedure similar to that in Example 1-91 was employed except for using antimony trioxide as a catalyst. The amount of antimony trioxide added was 0.05% by mole as antimony atom based on the acid components in the PET. The polymerization time period required to raise the IV of the PET to 0.5 dl/g and the IV and the TD after a fusion test are shown in Table 8.

Example 2

Example 2-1

8900 Parts by weight of bis(2-hydroxyethyl)terephthalate was mixed with 0.71 parts by volume of a 5 g/L solution of aluminum acetate in ethylene glycol, and then 2,2'-thiobis(4-t-octylphenol) (S) was added at 0.1% by mole based on the acid components in the polyester and stirred under atmospheric pressure at 245° C. for 10 minutes. The temperature was elevated over a period of 50 minutes to 275° C. with reducing the pressure of the reaction system gradually to 0.1 Torr, under which pressure a polycondensation was performed at the same temperature for 180 minutes. The parameter of the resultant polymer is shown in Table 2-1.

Examples 2-2 to 2-19

The polymerization was performed similarly to Example 2-1 except for using other organic compound components instead of 2,2'-thiobis(4-t-octylphenol) (S) to obtain polyesters. The physical parameters of the polymers obtained are shown in Table 2-1.

Comparative 2-1

The polymerization was performed similarly to Example 2-1 except for using no 2,2'-thiobis(4-t-octylphenol) (S) to obtain a polyester. The physical parameter of the polymer obtained are shown in Table 2-1.

Comparative 2-2

The polymerization was performed similarly to Example 2-1 except for using no solution of aluminum acetate in ethylene glycol to obtain a polyester. The physical parameter of the polymer obtained are shown in Table 2-1.

Example 2-20

8900 Parts by weight of bis(2-hydroxyethyl)terephthalate was mixed with 1.28 parts by volume of a 5 g/L solution of gallium acetylacetonate in ethylene glycol, and then 2,2'-thiobis(4-t-octylphenol) (S) was added at 0.1% by mole based on the acid components in the polyester and stirred under atmospheric pressure at 245° C. for 10 minutes. The temperature was elevated over a period of 50 minutes to 275° C. with reducing the pressure of the reaction system gradually to 0.1 Torr, under which pressure a polycondensation was performed at the same temperature for 180 minutes. The parameter of the resultant polymer is shown in Table 2-2.

Examples 2-21 to 2-38

The polymerization was performed similarly to Example 2-20 except for using other organic compound components instead of 2,2'-thiobis(4-t-octylphenol) (S) to obtain polyesters. The physical parameters of the polymers obtained are shown in Table 2-2.

Comparative 2-3

The polymerization was performed similarly to Example 2-20 except for using no 2,2'-thiobis(4-t-octylphenol) (S) to obtain a polyester. The physical parameter of the polymer obtained are shown in Table 2-2.

Example 2-39

8900 Parts by weight of bis(2-hydroxyethyl)terephthalate was mixed with 1.35 parts by volume of a 5 g/L solution of bismuth acetate in ethylene glycol, and then 2,2'-thiobis(4-t-octylphenol) (S) was added at 0.1% by mole based on the acid components in the polyester and stirred under atmospheric pressure at 245° C. for 10 minutes. The temperature was elevated over a period of 50 minutes to 275° C. with reducing the pressure of the reaction system gradually to 0.1 Torr, under which pressure a polycondensation was performed at the same temperature for 180 minutes. The parameter of the resultant polymer is shown in Table 2-3.

Examples 2-40 to 2-57

The polymerization was performed similarly to Example 2-39 except for using other organic compound components instead of 2,2'-thiobis(4-t-octylphenol) (S) to obtain polyesters. The physical parameters of the polymers obtained are shown in Table 2-3.

The organic compounds employed were 2,2'-bisphenol (Q), methylene-bridged linear phenolic compound (mixture of monomer to 100-mer) (M), methylene-bridged linear p-butylphenolic compound (mixture of monomer to 100-mer) (N), Calix [8] arene (O), p-t-butyl Calix [8] arene (P), esucletin (J), morin (K), epigallocatechin gallate (L), disodium 4,5-dihydroxynaphthalene-2,7-disulfonate (I), anthrarobin (H), 2,5-dihydroxybenzoquinone (G), 5,8-dihydroxy-1,4-naphthoquinone (F), quinalizarin (A), alizarin (B), emodine (C), 1,4-diaminoanthraquinone (D) and 1,8-diamino-4,5-dihydroxyanthraquinone (E).

Comparative 2-4

The polymerization was performed similarly to Example 2-39 except for using no 2,2'-thiobis(4-t-octylphenol) to obtain a polyester. The physical parameter of the polymer obtained are shown in Table 2-3.

Example 3

Example 3-1

8900 Parts by weight of bis(2-hydroxyethyl)terephthalate was mixed with 0.60 parts by volume of a 5 g/L solution of chromium acetate in ethylene glycol, and then quinalizarin (A) was added at 0.1% by mole based on the acid components in the polyester and stirred under atmospheric pressure at 245° C. for 10 minutes. The temperature was elevated over a period of 50 minutes to 275° C. with reducing the pressure of the reaction system gradually to 0.1 Torr, under which pressure a polycondensation was performed at the same temperature for 180 minutes. The parameter of the resultant polymer is shown in Table 3-1.

Examples 3-2 to 3-19

The polymerization was performed similarly to Example 3-1 except for using other organic compound components instead of quinalizarin to obtain polyesters. The physical parameters of the polymers obtained are shown in Table 3-1.

The organic compounds employed were alizarin (B), emodine (C), 1,4-diaminoanthraquinone (D) and 1,8-diamino-4,5-dihydroxyanthraquinone (E), Acid Blue 25 (U), 2-aminonaphthoquinone (V), anthrarobin (H), 1,1'-binaphtnyl-2,2'-diamine (W), disodium 4,5-dihydroxynaphthalene-2,7-disulfonate (I), esucletin (J), morin (K), epicatechin (X), methylene-bridged linear phenolic compound (mixture of monomer to 100-mer) (M), methylene-bridged linear p-butylphenolic compound (mixture of monomer to 100-mer) (N), Calix [8] arene (O), p-t-butyl Calix [8] arene (P), 2-aminobiphenyl (Y) and 2,2'-thiobis(4-t-octylphenol) (S).

Comparative 3-1

The polymerization was performed similarly to Example 3-1 except for using no quinalizarin to obtain a polyester. The physical parameter of the polymer obtained are shown in Table 3-1.

Comparative 3-2

The polymerization was performed similarly to Example 3-1 except for using no solution of chromium acetate in ethylene glycol to obtain a polyester. The physical parameter of the polymer obtained are shown in Table 1-1.

Example 3-20

8900 Parts by weight of bis(2-hydroxyethyl)terephthalate was mixed with 0.62 parts by volume of a 5 g/L solution of nickel acetate in ethylene glycol, and then quinalizarin (A) was added at 0.1% by mole based on the acid components in the polyester and stirred under atmospheric pressure at 245° C. for 10 minutes. The temperature was elevated over a period of 50 minutes to 275° C. with reducing the pressure of the reaction system gradually to 0.1 Torr, under which pressure a polycondensation was performed at the same temperature for 180 minutes. The parameter of the resultant polymer is shown in Table 3-2.

Examples 3-21 to 3-38

The polymerization was performed similarly to Example 3-20 except for using other organic compounds component instead of quinalizarin to obtain polyesters. The physical parameters of the polymers obtained are shown in Table 3-2. The organic compound components employed were similar to those in Examples 3-2 to 3-19.

Comparative 3-3

The polymerization was performed similarly to Example 3-20 except for using no quinalizarin to obtain a polyester. The physical parameter of the polymer obtained are shown in Table 3-2.

Example 4

Example 4-1

8900 Parts by weight of bis(2-hydroxyethyl)terephthalate was mixed with 0.68 parts by volume of a 5 g/L solution of yttrium chloride in ethylene glycol, and then 2,2'-thiobis(4-t-octylphenol) (S) was added at 0.1% by mole based on the acid components in the polyester and stirred under atmospheric pressure at 245° C. for 10 minutes. The temperature was elevated over a period of 50 minutes to 275° C. with reducing the pressure of the reaction system gradually to 0.1 Torr, under which pressure a polycondensation was performed at the same temperature for 180 minutes. The parameter of the resultant polymer is shown in Table 4-1.

Examples 4-2 to 4-19

The polymerization was performed similarly to Example 4-1 except for using other organic compound components instead of 2,2'-thiobis(4-t-octylphenol) (S) to obtain polyesters. The physical parameters of the polymers obtained are shown in Table 4-1.

The organic compounds employed were 2,2'-bisphenol (Q), methylene-bridged linear phenolic compound (mixture of monomer to 100-mer) (M), methylene-bridged linear p-butylphenolic compound (mixture of monomer to 100-mer) (N), Calix [8] arene (O), p-t-butyl Calix [8] arene (P), esucletin (J), morin (K), epicatechin (X), disodium 4,5-dihydroxynaphthalene-2,7-disulfonate (I), 1,1'-bi-2-naphthol (T), anthrarobin (H), 5,8-dihydroxy-1,4-naphthoquinone (F), quinalizarin (A), alizarin (B), emodine (C), 1,4-diaminoanthraquinone (D), 1,8-diamino-4,5-dihydroxyanthraquinone (E) and Acid Blue 25 (U).

Comparative 4-1

The polymerization was performed similarly to Example 4-1 except for using no 2,2'-thiobis(4-t-octylphenol) to obtain a polyester. The physical parameter of the polymer obtained are shown in Table 4-1.

Comparative 4-2

The polymerization was performed similarly to Example 4-1 except for using no solution of yttrium chloride in ethylene glycol to obtain a polyester. The physical parameter of the polymer obtained are shown in Table 4-1.

Examples 4-20 to 4-38

8900 Parts by weight of bis(2-hydroxyethyl)terephthalate was mixed with 0.13 parts by volume of a 50 g/L solution of n-butoxyzirconium in n-butanol, and then 2,2'-thiobis(4-t-octylphenol) (S) was added at 0.1% by mole based on the acid components in the polyester and stirred under atmospheric pressure at 245° C. for 10 minutes. The temperature was elevated over a period of 50 minutes to 275° C. with reducing the pressure of the reaction system gradually to 0.1 Torr, under which pressure a polycondensation was performed at the same temperature for 180 minutes. The parameter of the resultant polymer is shown in Table 4-2.

Examples 4-21 to 4-38

The polymerization was performed similarly to Example 4-20 except for using other organic compound components instead of 2,2'-thiobis(4-t-octylphenol) to obtain polyesters. The physical parameters of the polymers obtained are shown in Table 4-2. The organic compound components employed were similar to those in Examples 4-2 to 4-19.

Comparative 4-3

The polymerization was performed similarly to Example 4-20 except for using no 2,2'-thiobis(4-t-octylphenol) to obtain a polyester. The physical parameter of the polymer obtained are shown in Table 4-2.

Example 4-39

8900 Parts by weight of bis(2-hydroxyethyl)terephthalate was mixed with 1.12 parts by volume of a 5 g/L solution of hafnium chloride in ethylene glycol, and then 2,2'-thiobis(4-t-octylphenol) (S) was added at 0.1% by mole based on the acid components in the polyester and stirred under atmospheric pressure at 245° C. for 10 minutes. The temperature was elevated over a period of 50 minutes to 275° C. with reducing the pressure of the reaction system gradually to 0.1 Torr, under which pressure a polycondensation was performed at the same temperature for 180 minutes. The parameter of the resultant polymer is shown in Table 4-3.

Examples 4-40 to 4-57

The polymerization was performed similarly to Example 4-39 except for using other organic compound components instead of 2,2'-thiobis(4-t-octylphenol) to obtain polyesters. The physical parameters of the polymers obtained are shown in Table 4-3. The organic compound components employed were similar to those in Examples 4-2 to 4-19.

Comparative 4-4

The polymerization was performed similarly to Example 4-39 except for using no 2,2'-thiobis(4-t-octylphenol) to obtain a polyester. The physical parameter of the polymer obtained are shown in Table 4-3.

Example 5

Example 5-1

8900 Parts by weight of bis(2-hydroxyethyl)terephthalate was mixed with 1.39 parts by volume of a 5 g/L solution of ruthenium acetylacetonate in ethylene glycol, and then quinalizarin (A) was added at 0.1% by mole based on the acid components in the polyester and stirred under atmospheric pressure at 245° C. for 10 minutes. The temperature was elevated over a period of 50 minutes to 275° C. with reducing the pressure of the reaction system gradually to 0.1 Torr, under which pressure a polycondensation was performed at the same temperature for 180 minutes. The parameter of the resultant polymer is shown in Table 5-1.

Examples 5-2 to 5-18

The polymerization was performed similarly to Example 5-1 except for using other organic compound components instead of quinalizarin (A) to obtain polyesters. The physical parameters of the polymers obtained are shown in Table 5-1. The organic compounds employed were alizarin (B), emodine (C), 1,4-diaminoanthraquinone (D) and 1,8-diamino-4,5-dihydroxyanthraquinone (E), 2-aminonaphthoquinone (V), anthrarobin (H), 1,1'-bi-2-naphthol (T), disodium 4,5-dihydroxynaphthalene-2,7-disulfonate (I), esucletin (J), morin (K), epigallocatechin gallate (L), methylene-bridged linear phenolic compound (mixture of monomer to 100-mer) (M), methylene-bridged linear p-butylphenolic compound (mixture of monomer to 100-mer) (N), Calix [8] arene (O), p-t-butyl Calix [8] arene (P), 2-aminobiphenyl (Y) and 2,2'-thiobis(4-t-octylphenol) (S), and otherwise the polymerization was performed similarly to Example 5-1 to obtain polyesters. The parameter of each resultant polymer is shown in Table 5-1.

Comparative 5-1

The polymerization was performed similarly to Example 5-1 except for using no quinalizarin to obtain a polyester. The physical parameter of the polymer obtained are shown in Table 5-1.

Comparative 5-2

The polymerization was performed similarly to Example 5-1 except for using no solution of ruthenium acetylacetonate in ethylene glycol to obtain a polyester. The physical parameter of the polymer obtained are shown in Table 5-1.

Example 5-19

8900 Parts by weight of bis(2-hydroxyethyl)terephthalate was mixed with 0.79 parts by volume of a 5 g/L solution of palladium acetate in ethylene glycol, and then quinalizarin (A) was added at 0.1% by mole based on the acid components in the polyester and stirred under atmospheric pressure at 245° C. for 10 minutes. The temperature was elevated over a period of 50 minutes to 275° C. with reducing the pressure of the reaction system gradually to 0.1 Torr, under which pressure a polycondensation was performed at the same temperature for 180 minutes. The parameter of the resultant polymer is shown in Table 5-2.

Examples 5-20 to 5-36

The polymerization was performed similarly to Example 5-20 except for using other organic compounds component instead of quinalizarin (A) to obtain polyesters. The physical parameters of the polymers obtained are shown in Table 5-2. The organic compound components employed were similar to those in Examples 5-2 to 5-18.

Comparative 5-3

The polymerization was performed similarly to Example 5-19 except for using no quinalizarin to obtain a polyester. The physical parameter of the polymer obtained are shown in Table 5-2.

Example 6

Examples 6-1

8900 Parts by weight of bis(2-hydroxyethyl)terephthalate was mixed with 0.64 parts by volume of a 5 g/L solution of copper acetate in ethylene glycol, and then 2,2'-thiobis(4-t-octylphenol) (S) was added at 0.1% by mole based on the acid components in the polyester and stirred under atmospheric pressure at 245° C. for 10 minutes. The temperature was elevated over a period of 50 minutes to 275° C. with reducing the pressure of the reaction system gradually to 0.1 Torr, under which pressure a polycondensation was performed at the same temperature for 180 minutes. The parameter of the resultant polymer is shown in Table 6-1.

Examples 6-2 to 6-19

The polymerization was performed similarly to Example 4-1 except for using other organic compound components instead of 2,2'-thiobis(4-t-octylphenol) (S) to obtain polyesters. The physical parameters of the polymers obtained are shown in Table 6-1. The organic compounds employed were 2-aminobiphenyl (Y), methylene-bridged linear phenolic compound (mixture of monomer to 100-mer) (M), methylene-bridged linear p-butylphenolic compound (mixture of monomer to 100-mer) (N), Calix [8] arene (O), p-t-butyl Calix [8] arene (P), esucletin (J), morin (K), epigallocatechin gallate (L), disodium 4,5-dihydroxynaphthalene-2,7-disulfonate (I), 1,1'-bi-2-naphthol (T), anthrarobin (H), 2,5-dihydrobenzoquinone (G), 5,8-dihydroxy-1,4-naphthoquinone (F), quinalizarin (A), alizarin (B), emodine (C), 1,4-diaminoanthraquinone (D) and 1,8-diamino-4,5-dihydroxyanthraquinone (E). The physical parameters of the polymers obtained are shown in Table 6-1.

Comparative 6-1

The polymerization was performed similarly to Example 6-1 except for using no 2,2'-thiobis(4-t-octylphenol) to obtain a polyester. The physical parameter of the polymer obtained are shown in Table 6-1.

Comparative 6-2

The polymerization was performed similarly to Example 6-1 except for using no solution of copper acetate in ethylene glycol to obtain a polyester. The physical parameter of the polymer obtained are shown in Table 6-1.

Example 6-20

8900 Parts by weight of bis(2-hydroxyethyl)terephthalate was mixed with 0.58 parts by volume of a 5 g/L solution of silver acetate in ethylene glycol, and then 2,2'-thiobis(4-t-octylphenol) (S) was added at 0.1% by mole based on the acid components in the polyester and stirred under atmospheric pressure at 245° C. for 10 minutes. The temperature was elevated over a period of 50 minutes to 275° C. with reducing the pressure of the reaction system gradually to 0.1 Torr, under which pressure a polycondensation was performed at the same temperature for 180 minutes. The parameter of the resultant polymer is shown in Table 6-2.

Examples 6-21 to 6-38

The polymerization was performed similarly to Example 6-20 except for using other organic compound components instead of 2,2'-thiobis(4-t-octylphenol) to obtain polyesters. The physical parameters of the polymers obtained are shown in Table 6-2. The organic compound components employed were similar to those in Examples 6-2 to 6-19.

Comparative 6-3

The polymerization was performed similarly to Example 6-20 except for using no 2,2'-thiobis(4-t-octylphenol) (S) to obtain a polyester. The physical parameter of the polymer obtained are shown in Table 6-2.

Example 7

Example 7-1

8900 Parts by weight of bis(2-hydroxyethyl)terephthalate was mixed with 5.5 parts by weight of lanthanum acetate, and then quinalizarin (A) was added at 0.1% by mole based on the acid components in the polyester and stirred under atmospheric pressure at 245° C. for 10 minutes. The temperature was elevated over a period of 50 minutes to 275° C. with reducing the pressure of the reaction system gradually to 0.1 Torr, under which pressure a polycondensation was performed at the same temperature for 180 minutes. The parameter of the resultant polymer is shown in Table 7-1.

Examples 7-2 to 7-18

The polymerization was performed similarly to Example 7-1 except for using other organic compound components instead of quinalizarin to obtain polyesters. The physical parameters of the polymers obtained are shown in Table 7-1. The organic compounds employed were alizarin (B), emodine (C), 1,4-diaminoanthraquinone (D) and 1,8-diamino-4,5-dihydroxyanthraquinone (E), Acid Blue (U), 5,8-dihydroxy-1,4-naphthoquinone (F), anthrarobin (H), disodium 4,5-dihydroxynaphthalene-2,7-disulfonate (I), esucletin (J), morin (K), epigallocatechin gallate (L), methylene-bridged linear phenolic compound (mixture of monomer to 100-mer) (M), methylene-bridged linear p-butylphenolic compound (mixture of monomer to 100-mer) (N), Calix [8] arene (O), p-t-butyl Calix [8] arene (P) and 2,2'-thiobis (4-t-octylphenol) (S).

Comparative 7-1

The polymerization was performed similarly to Example 7-1 except for using no quinalizarin to obtain a polyester. The physical parameter of the polymer obtained are shown in Table 7-1.

Comparative 7-2

The polymerization was performed similarly to Example 7-1 except for using no solution of ruthenium acetylacetonate in ethylene glycol to obtain a polyester. The physical parameter of the polymer obtained are shown in Table 7-1.

Example 7-19

8900 Parts by weight of bis(2-hydroxyethyl)terephthalate was mixed with 5.6 parts by weight of cerium acetate, and then quinalizarin (A) was added at 0.1% by mole based on the acid components in the polyester and stirred under atmospheric pressure at 245° C. for 10 minutes. The temperature was elevated over a period of 50 minutes to 275° C. with reducing the pressure of the reaction system gradually to 0.1 Torr, under which pressure a polycondensation was performed at the same temperature for 180 minutes. The parameter of the resultant polymer is shown in Table 7-2.

Examples 7-20 to 7-36

The polymerization was performed similarly to Example 7-19 except for using other organic compounds component instead of quinalizarin to obtain polyesters. The physical parameters of the polymers obtained are shown in Table 7-2. The organic compound components employed were similar to those in Examples 7-2 to 7-18.

Comparative 7-3

The polymerization was performed similarly to Example 7-19 except for using no quinalizarin to obtain a polyester. The physical parameter of the polymer obtained are shown in Table 7-2.

Example 7-37

8900 Parts by weight of bis(2-hydroxyethyl)terephthalate was mixed with 5.7 parts by weight of samarium acetate, and then quinalizarin (A) was added at 0.1% by mole based on the acid components in the polyester and stirred under atmospheric pressure at 245° C. for 10 minutes. The temperature was elevated over a period of 50 minutes to 275° C. with reducing the pressure of the reaction system gradually to 0.1 Torr, under which pressure a polycondensation was performed at the same temperature for 180 minutes. The parameter of the resultant polymer is shown in Table 7-3.

Examples 7-38 to 7-54

The polymerization was performed similarly to Example 7-37 except for using other organic compounds component instead of quinalizarin to obtain polyesters. The physical parameters of the polymers obtained are shown in Table 7-3. The organic compound components employed were similar to those in Examples 7-2 to 7-18.

Comparative 7-4

The polymerization was performed similarly to Example 7-37 except for using no quinalizarin to obtain a polyester. The physical parameter of the polymer obtained are shown in Table 7-3.

Example 7-55

8900 Parts by weight of bis(2-hydroxyethyl)terephthalate was mixed with 5.8 parts by weight of europium acetate, and then quinalizarin (A) was added at 0.1% by mole based on the acid components in the polyester and stirred under atmospheric pressure at 245° C. for 10 minutes. The temperature was elevated over a period of 50 minutes to 275° C. with reducing the pressure of the reaction system gradually to 0.1 Torr, under which pressure a polycondensation was performed at the same temperature for 180 minutes. The parameter of the resultant polymer is shown in Table 7-4.

Examples 7-56 to 7-72

The polymerization was performed similarly to Example 7-55 except for using other organic compounds component instead of quinalizarin to obtain polyesters. The physical parameters of the polymers obtained are shown in Table 7-4. The organic compound components employed were similar to those in Examples 7-2 to 7-18.

Comparative 7-5

The polymerization was performed similarly to Example 55 except for using no quinalizarin to obtain a polyester. The physical parameter of the polymer obtained are shown in Table 7-4.

Example 7-73

8900 Parts by weight of bis(2-hydroxyethyl)terephthalate was mixed with 5.9 parts by weight of gadolinium acetate, and then quinalizarin (A) was added at 0.1% by mole based on the acid components in the polyester and stirred under atmospheric pressure at 245° C. for 10 minutes. The temperature was elevated over a period of 50 minutes to 275° C. with reducing the pressure of the reaction system gradually to 0.1 Torr, under which pressure a polycondensation was performed at the same temperature for 180 minutes. The parameter of the resultant polymer is shown in Table 7-5.

Examples 7-74 to 7-90

The polymerization was performed similarly to Example 7-73 except for using other organic compounds component instead of quinalizarin to obtain polyesters. The physical parameters of the polymers obtained are shown in Table 7-5.

The organic compound components employed were similar to those in Examples 7-2 to 7-18.

Comparative 7-6

The polymerization was performed similarly to Example 7-73 except for using no quinalizarin to obtain a polyester. The physical parameter of the polymer obtained are shown in Table 7-5.

Example 8

Example 8-1

8900 Parts by weight of bis(2-hydroxyethyl)terephthalate was mixed with 0.15 parts by volume of a 5 g/L solution of zinc (II) acetate dihydrate in ethylene glycol, and then quinalizarin (A) was added at 0.1% by mole based on the acid components in the polyester and stirred under atmospheric pressure at 245° C. for 10 minutes. The temperature was elevated over a period of 50 minutes to 275° C. with reducing the pressure of the reaction system gradually to 0.1 Torr (mmHg), and then a polycondensation was performed at 275° C. under 0.1 Torr for 180 minutes to obtain a polyester.

Examples 8-2 to 8-18

The polymerization was performed similarly to Example 8-1 except for using other organic compound components instead of quinalizarin to obtain polyesters. The organic compounds employed were alizarin (B), 1,4-diaminoanthraquinone (D), 1,8-diamino-4,5-dihydroxyanthraquinone (E), Acid Blue (U), 5,8-dihydroxy-1,4-naphthoquinone (F), anthrarobin (H), disodium 4,5-dihydroxynaphthalene-2,7-disulfonate (I), 1,8-diaminonaphthalene (Z), 1,1'-bi-2-naphthol (T), 1,1'-binaphthyl-2,2'-diamine (W), epigallocatechin gallate (L), morin (K), 2-aminochromone (AA), esucletin (J), 7-amino-4-methylcoumarine (BB), p-t-butyl Calix [8] arene (P) and Calix [8] arene (O).

Comparative 8-1

The polymerization was performed similarly to Example 8-1 except for using no quinalizarin (A) to obtain a polyester.

Comparative 8-2

The polymerization was performed similarly to Example 8-1 except for using no 5 g/L solution of zinc (II) acetate dihydrate in ethylene glycol to obtain a polyester.

The results of the determination of the intrinsic viscosity of each polyester obtained in Examples 8-1 to 8-18 and Comparatives 8-1 and 8-2 are summarized in Table 8-1.

Example 8-19

8900 Parts by weight of bis(2-hydroxyethyl)terephthalate was mixed with 0.18 parts by volume of a 10 g/L solution of manganese (II) acetate tetrahydrate in ethylene glycol, and then quinalizarin (A) was added at 0.1% by mole based on the acid components in the polyester and stirred under atmospheric pressure at 245° C. for 10 minutes. The temperature was elevated over a period of 50 minutes to 275° C. with reducing the pressure of the reaction system gradually to 0.1 Torr (mmHg), and then a polycondensation was performed at 275° C. under 0.1 Torr for 180 minutes to obtain a polyester.

Examples 8-10 to 8-36

The polymerization was performed similarly to Example 8-19 except for using other organic compound components instead of quinalizarin to obtain polyesters. The organic compound components employed were similar to those in Examples 8-2 to 8-18.

Comparative 8-3

The polymerization was performed similarly to Example 8-19 except for using no quinalizarin (A) to obtain a polyester.

The results of the determination of the intrinsic viscosity of each polyester obtained in Examples 8-19 to 8-36 and Comparative 8-3 are summarized in Table 8-2.

Example 8-37

8900 Parts by weight of bis(2-hydroxyethyl)terephthalate was mixed with 0.08 parts by volume of a 20 g/L solution of cobalt (II) acetate tetrahydrate in ethylene glycol, and then quinalizarin (A) was added at 0.1% by mole based on the acid components in the polyester and stirred under atmospheric pressure at 245° C. for 10 minutes. The temperature was elevated over a period of 50 minutes to 275° C. with reducing the pressure of the reaction system gradually to 0.1 Torr (mmHg), and then a polycondensation was performed at 275° C. under 0.1 Torr for 180 minutes to obtain a polyester.

Examples 8-38 to 8-54

The polymerization was performed similarly to Example 8-19 except for using other organic compound components instead of quinalizarin to obtain polyesters. The organic compound components employed were similar to those in Examples 8-2 to 8-18.

Comparative 8-4

The polymerization was performed similarly to Example 8-37 except for using no quinalizarin (A) to obtain a polyester.

The results of the determination of the intrinsic viscosity of each polyester obtained in Examples 8-37 to 8-54 and Comparative 8-4 are summarized in Table 8-2.

Example 9

Example 9-1

8900 Parts by weight of bis(2-hydroxyethyl)terephthalate was mixed with 0.46 parts by volume of a 5 g/L solution of indium acetate in ethylene glycol, and then 1,1'-binaphthyl-2,2'-diamine (W) was added at 0.1% by mole based on the acid components in the polyester and stirred under atmospheric pressure at 245° C. for 10 minutes. The temperature was elevated over a period of 50 minutes to 275° C. with reducing the pressure of the reaction system gradually to 0.1 Torr (mmHg), and then a polycondensation was performed at 275° C. under 0.1 Torr for 180 minutes to obtain a polyester.

Examples 9-2 to 9-18

The polymerization was performed similarly to Example 9-1 except for replacing 1,1'-binaphthyl-2,2'-diamine with 1,1'-bis-2-naphthol (T), 7-amino-4-methylcoumarine (BB), morin (K), 2-aminochromone (AA), epigallocatechin gallate (L), epicatechin (X), Calix [8] arene (O), p-t-butyl Calix [8] arene (P), alizarin (B), anthrarufin (CC), emodine (C), 1,4-diaminoanthraquinone (D), 1,8-diamino-4,5-dihydroxyanthraquinone (E), 5,8-dihydroxy-1,4-naphthoquinone (F), anthrarobin (H), disodium 4,5-dihydronaphthalene-2,7-disulfonate (I) or 1,8-diaminonaphthalene (Z).

Comparative 9-1

The polymerization was performed similarly to Example 9-1 except for using no 1,1'-binaphthyl-2,2'-diamine (W) to obtain a polyester.

Comparative 9-2

The polymerization was performed similarly to Example 9-1 except for using no solution of indium acetate in ethylene glycol to obtain a polyester.

The results of the determination of the intrinsic viscosity of each polyester obtained in Examples 9-1 to 9-18 and Comparatives 9-1 and 9-2 are summarized in Table 9-1.

Example 10

Example 10-1

8900 Parts by weight of bis(2-hydroxyethyl)terephthalate was mixed with 1.4 parts by weight of sodium acetate as a catalyst component and quinalizarin at 0.05% by mole based on the acid components in the polyester and stirred under atmospheric pressure at 245° C. for 10 minutes. The temperature was elevated over a period of 50 minutes to 275° C. with reducing the pressure of the reaction system gradually to 0.1 Torr, under which pressure a polycondensation was performed at the same temperature for 3 hours. The parameter of the resultant polymer is shown in Table 10.

Examples 10-2 to 10-8 and Comparative 10-1 to 10-11

The polymerization was performed similarly to Example 10-1 except for using a different catalyst to obtain each polyester. The parameters of the resultant polymers are shown in Table 10-1 and Table 10-2.

Comparative 10-12

The polymerization was performed similarly to Example 10-1 except for using no catalyst to obtain a polyester. The parameter of the resultant polymer is shown in Table 10-2.

Comparative 10-13

Reference Example

8900 Parts by weight of bis(2-hydroxyethyl)terephthalate was mixed with a 5 g/L solution of antimony trioxide in ethylene glycol at 0.05% by mole, as antimony atom, based on the acid components in the polyester and stirred under atmospheric pressure at 245° C. for 10 minutes. The temperature was elevated over a period of 50 minutes to 275° C. with reducing the pressure of the reaction system gradually to 0.1 Torr, under which pressure a polycondensation was performed at the same temperature for 3 hours. The parameter of the resultant polymer is shown in Table 10-2.

Example 11

Example 11-1

100 Parts by weight of dimethyl terephthalate and 70 parts by weight of 1,4-butanediol were mixed with 0.1 parts by weight of manganese acetate tetrahydrate as a transesterification catalyst and the mixture was stirred initially at 150° C. and then the temperature was raised to 210° C. with distilling a by-product methanol off. After 180 minutes, 0.07 parts by weight of trimethylphosphoric acid was added to terminate the ester exchange reaction. Subsequently, the polycondensation catalyst whose composition was similar to that employed in Example 1-92 was added and the mixture was stirred under nitrogen flow under atmospheric pressure at 220° C. for 10 minutes, and then the temperature was elevated over a period of 40 minutes from 220° C. to 250° C. with reducing the pressure of the reaction system gradually to 0.1 Torr, and then a polycondensation was performed at 250° C. under 0.1 Torr for 40 minutes. The parameter of the resultant polybutylene terephthalate is shown in Table 11.

Examples 11-2 to 11-26 and Comparative 11-1

The procedure similar to that in Example 11-1 was employed except for using other polycondensation catalysts to obtain polybutylene terephthalate. The composition of each catalyst used, the time period required for a polymerization to obtain each polybutylene terephthalate, and the physical parameter of a resultant polybutylene terephthalate are shown in Table 11.

Example 11-27

100 Parts by weight of terephthalic acid and 95 parts by weight of 1,4-butanediol were charged into a reaction vessel, to which the polycondensation catalyst employed in 11-1 was added and the mixture was stirred under atmospheric pressure at 210° C. with distilling a by-product tetrahydrofuran off whereby effecting an esterification reaction for 150 minutes. Then the temperature was elevated over a period of 40 minutes from 210° C. to 250° C. with reducing the pressure of the reaction system gradually to 0.1 Torr, and then a polycondensation was performed at 250° C. under 0.1 Torr for 50 minutes. The reduced viscosity of the resultant polybutylene terephthalate was 0.93 dl/g.

Comparative 11-2

The polymerization was performed similarly to Example 11-1 except for using no alizarin to obtain a polybutylene terephthalate. The polycondensation time period and the physical parameter of a resultant polybutylene terephthalate are shown in Table 11.

Comparative 11-3

The polymerization was performed similarly to Example 11-1 except for using no solution of lithium acetate in ethylene glycol to obtain a polybutylene terephthalate. The polycondensation time period and the physical parameter of a resultant polybutylene terephthalate are shown in Table 11.

Example 12

Example 12-1

100 Parts by weight of dimethyl 2,6-naphthalenedicarboxylate and 56 parts by weight of ethylene glycol were mixed with 0.03 parts by weight of manganese acetate tetrahydrate as a transesterification catalyst and the mixture was stirred initially at 150° C. and then the temperature was raised to 220° C. with distilling a by-product methanol off. After 120 minutes, 0.021 parts by weight of trimethylphosphoric acid was added to terminate the ester exchange reaction. Subsequently, the polycondensation catalyst whose composition was similar to that employed in Example 1-92 was added and the mixture was stirred under nitrogen flow under atmospheric pressure at 220° C. for 10 minutes, and then the temperature was elevated over a period of 50 minutes from 235° C. to 285° C. with reducing the pressure of the reaction system gradually to 0.1 Torr, and then a polycondensation was performed at 285° C. under 0.1 Torr for 40 minutes. The parameter of the resultant polyethylene naphthalate is shown in Table 12.

Examples 12-2 to 26 and Comparative 12-1

The procedure similar to that in Example 1 was employed except for using other polycondensation catalysts. The composition of each catalyst used, the polymerization time period required for a polymerization to obtain each polyethylene naphthalate, and the physical parameter of a resultant polyethylene naphthalate are shown in Table 12.

Example 12-27

100 Parts by weight of 2,6-naphthalene dicarboxylic acid and 63 parts by weight of ethylene glycol were charged into a reaction vessel and the mixture was stirred under a pressure of 2.5 kgcm-2 at 250° C. with distilling a by-product water off. After 240 minutes when the by-production of water was substantially terminated, the pressure was released. Subsequently, the polycondensation catalyst similar to that employed in Example 12-1 was added and the mixture was stirred under nitrogen flow under atmospheric pressure at 235° C. for 10 minutes and then the temperature was raised over 50 minutes from 235° C. to 285° C. with reducing the pressure of the reaction system gradually to 0.1 Torr, and then a polycondensation was performed at 285° C. under 0.1 Torr for 37 minutes. The IV of the resultant polyethylene naphthalate was 0.63 dl/g.

Comparative 12-2

An attempt was made to obtain a polyethylene terephthalate by the polymerization procedure similar to that in Example 12-1 except for using no alizarin. The polymerization was discontinued unsuccessfully since the IV after the polycondensation for 180 minutes did not reach 0.5 dl/g. Also by the polymerization procedure similar to that in Example 12-1, a polyethylene naphthalate was obtained. The polymerization time period and the physical parameter of the resultant polyethylene naphthalate are shown in Table 12.

Comparative 12-3

The procedure similar to that in Example 12-1 was employed except for using no solution of lithium acetate in ethylene glycol to obtain a polyethylene naphthalate. The polymerization time period and the physical parameter of the resultant polyethylene naphthalate are shown in Table 12.

Example 13

Example 13-1

100 Parts by weight of dimethyl terephthalate and 78 parts by weight of 1,3-propanediol were mixed with 0.038 parts by weight of manganese acetate tetrahydrate as a transesterification catalyst and the mixture was stirred initially at 180° C. and then the temperature was raised to 230° C. with distilling a by-product methanol off. After 150 minutes, 0.027 parts by weight of trimethylphosphoric acid was added to terminate the ester exchange reaction. Subsequently, the polycondensation catalyst whose composition was similar to that employed in Example 1-92 was added and the mixture was stirred under nitrogen flow under atmospheric pressure at 230° C. for 10 minutes, and then the temperature was elevated over a period of 45 minutes from 230° C. to 260° C. with reducing the pressure of the reaction system gradually to 0.1 Torr, and then a polycondensation was performed at 260° C. under 0.1 Torr for 80 minutes. The parameter of the resultant polypropylene terephthalate is shown in Table 13.

Examples 13-2 to 26 and Comparative 13-1

The procedure similar to that in Example 13-1 was employed except for using other polycondensation catalysts. The composition of each catalyst used, the polymerization time period required for a polymerization to obtain each polypropylene terephthalate, and the physical parameter of each resultant polypropylene terephthalate are shown in Table 13.

Example 13-27

100 Parts by weight of terephthalic acid and 92 parts by weight of 1,3-propanediol were charged into a reaction vessel and the mixture was stirred under a pressure of 2.0 kg/cm² at 230° C. with distilling a by-product water off. After 210 minutes when the by-production of water was substantially terminated, the pressure was released. Subsequently, the polycondensation catalyst similar to that employed in Example 1 was added and the mixture was stirred under nitrogen flow under atmospheric pressure at 230° C. for 10 minutes and then the temperature was raised over 45 minutes from 230° C. to 260° C. with reducing the pressure of the reaction system gradually to 0.1 Torr, and then a polycondensation was performed at 260° C. under 0.1 Torr for 75 minutes. The IV of the resultant polypropylene naphthalate was 0.83 dl/g.

Comparative 13-2

An attempt was made to obtain a polyethylene terephthalate by the polymerization procedure similar to that in Example 13-1 except for using no alizarin. The polymerization was discontinued unsuccessfully since the IV after the polycondensation for 180 minutes did not reach 0.5 dl/g. Also by the polymerization procedure similar to that in Example 13-1, a polypropylene terephthalate was obtained. The polymerization time period and the physical parameter of the resultant polypropylene terephthalate are shown in Table 13.

Comparative 13-3

The procedure similar to that in Example 13-1 was employed except for using no solution of lithium acetate in ethylene glycol to obtain a polypropylene terephthalate. The polymerization time period and the physical parameter of the resultant polypropylene terephthalate are shown in Table 13.

Example 14

Example 14-1

100 Parts by weight of dimethyl terephthalate, 54 parts by weight of ethylene glycol and 23 parts by weight of 1,4-cyclohexanedimethanol were mixed with 0.038 parts by weight of manganese acetate tetrahydrate as a transesterification catalyst and the mixture was stirred initially at 190° C. and then the temperature was raised to 220° C. with distilling a by-product methanol off. After 120 minutes, 0.026 parts by weight of trimethylphosphoric acid was added to terminate the ester exchange reaction. Subsequently, the polycondensation catalyst whose composition was similar to that employed in Example 1-92 was added and the mixture was stirred under nitrogen flow under atmospheric pressure at 240° C. for 15 minutes, and then the temperature was elevated over a period of 75 minutes from 240° C. to 275° C. with reducing the pressure of the reaction system gradually to 0.1 Torr, and then a polycondensation was performed at 275° C. under 0.1 Torr for 70 minutes. The parameter of the resultant copolyester is shown in Table 14.

Examples 14-2 to 14-26 and Comparative 14-1

The procedure similar to that in Example 14-1 was employed except for using other polycondensation catalysts. The composition of each catalyst used, the polymerization time period required for a polymerization to obtain a copolyester of cyclohexanedimethanol, and the physical parameter of each resultant copolyester are shown in Table 14.

Example 14-27

100 Parts by weight of terephthalic acid, 52 parts by weight of ethylene glycol and 32 parts by weight of 1,4-cyclohexanedimethanol were charged into a reaction vessel and the mixture was stirred under a pressure of 2.5 kg/cm$^2$ at 240° C. with distilling a by-product water off. After 105 minutes when the by-production of water was substantially terminated, the pressure was released. Subsequently, the polycondensation catalyst similar to that employed in Example 14-1 was added and the mixture was stirred under nitrogen flow under atmospheric pressure at 240° C. for 15 minutes and then the temperature was raised over 75 minutes from 240° C. to 275° C. with reducing the pressure of the reaction system gradually to 0.1 Torr, and then a polycondensation was performed at 275° C. under 0.1 Torr for 65 minutes. The reduced viscosity of the resultant copolyester was 0.77 dl/g.

Comparative 14-2

An attempt was made to obtain a copolyester of cyclohexanedimethanol by the polymerization procedure similar to that in Example 14-1 except for using no alizarin. The polymerization time period and the physical parameter of the resultant copolyester are shown in Table 14.

Comparative 14-3

The procedure similar to that in Example 14-1 was employed except for using no solution of lithium acetate in ethylene glycol to obtain a copolyester of cyclohexanedimethanol. The polymerization time period and the physical parameter of the resultant copolyester are shown in Table 14.

Example 15

Example of Use as Film

The following method is employed as a method for evaluating a foreign body formed in a film, whereby assessing an inventive film.

Foreign body level in film: A film was sandwiched between glass slips and melted and then observed as a dark field image by an optical microscope with the magnification by 200 times to count the bright points per 10 cm$^2$. A foreign body count less than 40 causes no particular problem, while a count of 60 or more poses a problem in a practical use.

Example 15-1

Using the catalyst employed in Example 1-92 and by the method in Example 1, a PET polymerization was conducted and at the time when the IV of the polymer reached 0.63 the polymer was cast as a chip by a standard method. This polymer was dried, melted in a uniaxial extruder, from the die of which the polymer was extruded onto a cooled casting drum, where an unoriented film was obtained. This unoriented film was then oriented by 3.3 times in the longitudinal direction at 90° C. and then by 3.6 times in the widthwise direction at 110° C., and then subjected to a heat treatment at 190° C., whereby obtaining a polyester film. This film exhibited almost no foreign bodies or defects on the film surface. The results of the determination of the foreign body level in this polymer film are shown in Table 15.

Examples 15-2 to 15-26 and Comparative 15-1 to 15-3

Similarly to Example 15-1 except for using different catalysts, a polymerization was performed to obtain each PET. The foreign body level of each resultant PET film was determined and is shown in Table 15 together with the composition of a catalyst employed. Comparative 15-1 exhibited a retarded polymerization, and thus was not practical. Comparatives 15-2 and 15-3 gave no satisfactory polymers, and thus the foreign body level was not determined.

Comparative 15-4

Similarly to Example 15-1 except for using antimony trioxide as a catalyst, a polymerization was performed to obtain a PET. The amount of antimony trioxide added was 0.05% by mole, as antimony atom, based on the acid components in the PET (corresponding to the catalyst of Comparative 1-26). The foreign body level of the resultant PET film was determined and is shown in Table 15 together with the composition of a catalyst employed. The sample of Comparative 15-4 exhibited a practical rate of the polymerization, but the foreign body level in the polymer was especially high.

Example 16

Molded Hollow Article

The method for determining major parameters of a molded hollow article is described below.

(Diethylene Glycol Content (Hereinafter Referred to as "DEG Content")

A polyester was decomposed by methanol, and subjected to a gas chromatography to quantify DEG, which was represented as a rate (% by mole) based on the entire glycol components.

(Acetoaldehyde Content (Hereinafter Referred to as "AA Content")

A resin pellet sample/distilled water (1 g/2 ml) was placed in an nitrogen-purged glass ampoule and the top opening was fused to seal, and then extracted at 160° C. for 2 hours, cooled and then subjected to a highly sensitive gas chromatography to determine the acetaldehyde level in an extract, which was represented as ppm.

(Cyclic Trimer Content of Polyester)

A resin pellet sample was dissolved in a mixture of hexafluoroisopropanol/chloroform and then diluted with chloroform. Methanol was then added to precipitate a polymer, which was then filtered. The filtrate was evaporated into dryness, taken up with dimethylformamide, and then subjected to a LPLC to quantify the cyclic trimer in the polyester.

(Haze (Cloudiness) (%))

A piece cut out from a trunk of a molded article described below was subjected to a haze meter (NIPPON DEN-SHOKU).

(Molded Article Preparation)

A dried polyester was subjected to an injection molding machine Model M-100 (MEIKI SEISAKUSHO) whose the cylinder temperature of 290° C. and molded in a step-shaped plane mold cooled at 0° C. to obtain a step-shaped molded article. This step-shaped molded article was provided with the molded plates each about 3 cm×5 cm with 2, 3, 4, 5, 6, 7, 8, 9, 10 or 11 mm in thickness in a step-like alignment, and weighed about 146 g. The molded plate whose thickness was 5 mm was cut out to examine for the haze (cloudiness) (%).

Example 16-1

Using the catalyst employed in Example 1-92 as a polyester polymerization catalyst and by the method in Example 1 for a PET polymerization, the polymerization was conducted and at the time when the IV of the PET resin reached 0.60 the polymer was cast as a chip by a standard method, and then a solid state polymerization was performed under nitrogen atmosphere at about 205° C. The IV of the PET obtained was 0.75, the DEG content was 2.6% by mole, the AA content was 3.3 ppm, and the cyclic trimer content was 0.30% by weight. A 5 mm-thick molded plate obtained from the PET by the method described above exhibited the haze as satisfactory as 4.7%.

Examples 16-2 to 16-26 and Comparatives 16-1 to 16-3

The procedure similar to that in Example 16-1 was employed except for using other catalysts. The composition of each catalyst used and the haze of each molded plate after the solid state polymerization are shown in Table 16. Comparatives 16-1 to 16-3 exhibited problematically longer polymerization time periods. Any of the resultant PETs exhibited a DEG content ranging from 1.7 to 3.5% by mole, a AA contents of 5 ppm or less, and a cyclic trimer contents of 0.31% by weight or less.

Comparative 16-4

Similarly to Example 16-1 except for using antimony trioxide as a catalyst, a polymerization was performed. The amount of antimony trioxide added was 0.05% by mole, as antimony atom, based on the acid components in the PET (corresponding to the catalyst of Comparative 1-26). The haze of the molded plate after the solid state polymerization is shown in Table 16. While the resultant polymer exhibited an excellent thermal stability, it had an especially poor transparency. The DEG content, the AA content and the cyclic trimer content of the resultant PET were 2.5% by mole, 5 ppm and 0.31% by weight, respectively.

Example 17

Example of Use as Industrial Material

The following method was employed as a method for evaluating a foreign body level contained in a polyester to be employed in a fiber for an industrial material.

Foreign body level: A polyester was molded as a biaxially oriented film whose thickness was 0.1 mm and the foreign body level was observed visually and represented as a number per 1 g.

Example 17-1

Bis(2-hydroxyethyl)terephthalate was mixed with a 5 g/L solution of lithium acetate in ethylene glycol as a catalyst at 0.3% by mole as lithium atom based on the acid component and also with alizarin at 0.2% by mole based on the acid components, and stirred under atmospheric pressure at 245° C. for 10 minutes. This catalyst composition was similar to that in Example 1-02. Subsequently, the temperature was elevated over a period of 50 minutes to 275° C. with reducing the pressure of the reaction system gradually to 0.1 Torr, and then a polycondensation was performed at 275° C. under 0.1 Torr. At the time when the IV of the polymer reached 0.63 the polymer was cast as a chip by a standard method, and then a solid state polymerization was performed under at 230° C. under vacuum of 0.01 Torr to obtain a polyester chip whose IV was 1.0. When this was subjected to a spinning at 310° C., almost no dirt on a die was noted and the spinning performance was satisfactory. The foreign body level was 0 count/g.

Examples 17-2 to 17-26 and Comparative 17-1

The procedure similar to that in Example 1 was employed except for using other catalysts. At the time when the IV of each polymer reached 0.63 the polymer was cast as a chip by a standard method, and then a solid state polymerization was performed under at 230° C. under vacuum of 0.01 Torr to obtain a polyester chip whose IV was 1.0. When this was subjected to a spinning at 310° C., almost no dirt on a die was noted and the spinning performance was satisfactory. The number of the foreign bodies identified are shown in Table 17. Comparative 17-1 exhibited a problematically prolonged polymerization time period.

Comparatives 17-2 and 17-3

The procedure similar to that in Example 17-1 was employed except for using other catalysts. The results are shown in Table 5, and the IV did not reach 0.5 even after a polymerization for 180 minutes.

Comparative 17-4

Similarly to Example 17-1 except for using antimony trioxide as a catalyst, a polymerization was performed. The amount of antimony trioxide added was 0.05% by mole, as antimony atom, based on the acid components in the PET (corresponding to the catalyst of Comparative 1-26). At the time when the IV of the polymer reached 0.63 the polymer was cast as a chip by a standard method, and then a solid state polymerization was performed under at 230° C. under vacuum of 0.01 Torr to obtain a polyester chip whose IV was 1.0. When this was subjected to a spinning at 310° C., a significant dirt on a die was noted and the spinning performance was poor. The resin was blackened, and a significant number of the foreign bodies were noted.

Example 18

Example of Use as Fiber

Example 18-1

A stainless steel autoclave received 1700 parts of terephthalic acid and 1160 parts of ethylene glycol, to which then 4.0 parts of triethylamine was added, and an esterification was effected at 230° C. under the gauge pressure of 2.5 kg/cm$^2$ for 2 hours with removing water generated. Subsequently, a 5 g/L solution of lithium acetate in ethylene glycol as a polycondensation catalyst in an amount as lithium atom of 0.3% by mole based on the acid components and alizarin at 0.2% by mole based on the acid components were added and the temperature of the reaction system was raised over 1 hour to 275° C. with reducing the pressure of the reaction system gradually to 0.1 Torr. Under this condition, a polycondensation was performed. The composition of the catalyst employed was similar to that in Example 1-92.

When the polymer was cast as a chip by a standard method and subjected to a spinning at 290° C. by a standard method, almost no dirt on the die was noted and the spinning performance was satisfactory. The time period required for the polymerization and the IV of the resultant polyester are shown in Table 18.

Examples 18-2 to 18-26 and Comparative 18-1

The procedure similar to that in Example 18-1 was employed in a polymerization to obtain each polyethylene terephthalate. The time period required for each polycondensation and the IV of each resultant polyester are shown in Table 18. The composition of each catalyst employed is also shown. Each polyester exhibited a satisfactory spinning performance.

Comparative 18-2

An attempt was made to obtain a polyethylene terephthalate by the polymerization procedure similar to that in Example 18-1 except for using no alizarin. The polymerization was discontinued unsuccessfully since the IV after the polycondensation for 180 minutes did not reach 0.5 dl/g. Also by the polymerization procedure similar to that in Example 1, an attempt was made to perform a polymerization to obtain a polyethylene terephthalate, but was not successful as indicated in Table 18.

Comparative 18-3

An attempt was made to obtain a polyethylene terephthalate by the polymerization procedure similar to that in Example 18-1 except for using no solution of lithium acetate in ethylene glycol. The polymerization was discontinued unsuccessfully since the IV after the polycondensation for 180 minutes did not reach 0.5 dl/g. Also by the polymerization procedure similar to that in Example 18-1, an attempt was made to perform a polymerization to obtain a polyethylene terephthalate, but was not successful as indicated in Table 18.

Comparative 18-4

Similarly to Example 1 except for using antimony trioxide as a polycondensation catalyst, a polymerization was performed to obtain a polyethylene terephthalate. The amount of antimony trioxide added was 0.05% by mole, as antimony atom, based on the acid components in the polyester (corresponding to the catalyst of Comparative 1-26). The polycondensation time period and the IV are shown in Table 18. The amount of a metal catalyst is the amount as metal atom. The spinning performance was poor and a snapping of the thread was observed.

Example 19

Example of Metallosulfonate-Containing Fiber

The dying performance of a fiber was evaluated by determining a % dye absorption described below.

(% Dye absorption)

Instrument: MINI color dyeing machine

Dye: Nichiron Black KB 200% (Cationic dye: NIS-SEIKASEI)

Concentration: 4.0% owf

Auxiliary agent: 10% Acetic acid (2 mL/L), 10% Sodium acetate (2 mL/L)

Temperature: 130° C.

Time: 45 Minutes

Bath ratio: 1:50

The dying under the condition described above was examined for its % dye absorption. A % dye absorption was obtained by a measurement using a spectrophotometer (UV3210: NIPPON BUNKO) followed by a determination of the difference between the absorptions before and after the dying in the dye bath followed by a calculation in accordance with the equation shown below.

$$\% \text{ Dye absorption} = ((DB-DA) \times 100)/DB$$

wherein DA means an absorption at the maximum absorption wavelength after the dying in a dye bath, and DB means an absorption at the maximum absorption wavelength before the dying in a dye bath.

Example 19-1

1000 Parts by weight of terephthalic acid, 787 parts by weight of ethylene glycol, 19 parts by weight of a 22% by weight suspension of titanium oxide in ethylene glycol and 3 parts by weight of triethylamine were charged into a stainless steel autoclave, which was then purged with nitrogen and pressurized under the gauge pressure of 2.5 kg/cm$^2$ to effect an esterification at 245° C. with removing water generated continuously via a condenser. 100 Minutes after initiating the reaction, the pressure was released and an oligomer whose % esterification was 95%. This oligomer was transferred to a polycondensation reaction vessel, to which 21.6 parts by weight of 5-sodium sulfoisophthalic acid bishydroxyethylester, 12.5 parts by weight of a polyethylene glycol whose molecular weight was 1000, 0.6 parts by weight of Irganox 1330 (Ciba-geigy) as an antioxidant and a polycondensation catalyst having the composition similar to that employed in Example 1-92 were added and the temperature was elevated over a period of 60 minutes to 275° C. with reducing the pressure of the reaction system gradually to 0.3 Torr, under which pressure a polycondensation was performed at the same temperature. The polymer was cast as a chip by a standard method and then subjected to a spinning at 290° C., which revealed almost no dirt on the die and a satisfactory spinning performance. The time period required for the polymerization and the IV of the polyester are shown in Table 2. The % dye absorption of the resultant 50-denier, 24-filament, oriented yarn was as satisfactory as 97%.

Examples 19-2 to 19-26 and Comparative 19-1

The procedure similar to that in Example 19-1 except for using other polycondensation catalysts was employed in a polymerization to obtain each metallosulfonate group-containing modified polyester. The polymerization time periods and the IVs are shown in Table 19. The amount of each catalyst added is the amount as a metal atom. Each polymer exhibited a satisfactory spinning performance. Each polymer also exhibited a % dye absorption as satisfactory as 95% or higher.

Example 19-27

The procedure similar to that for obtaining a modified polyester in Example 19-1 was employed except for adding 90% by weight of 5-sodium sulfoisophthalic acid bishydroxyethylester. Although the IV of the resultant polyester was as low as 0.40 dl/g, the % dye absorption at 100° C. was as high as 90%, indicating an ability of being stained under atmospheric pressure. The spinning performance was also satisfactory.

Comparative 19-2

An attempt was made to obtain a polyethylene terephthalate by the polymerization procedure similar to that in Example 1 except for using no alizarin. The polymerization was discontinued unsuccessfully since the IV after the polycondensation for 180 minutes did not reach 0.5 dl/g. Also by the polymerization procedure similar to that in Example 1, an attempt was made to perform a polymerization to obtain a metallosulfonate group-containing modified polyester, but was not successful as indicated in Table 19.

Comparative 19-3

An attempt was made to obtain a polyethylene terephthalate by the polymerization procedure similar to that in Example 1 except for using no solution of lithium acetate in ethylene glycol. The polymerization was discontinued unsuccessfully since the IV after the polycondensation for 180 minutes did not reach 0.5 dl/g. Also by the polymerization procedure similar to that in Example 19-1, an attempt was made to perform a polymerization to obtain a metallosulfonate group-containing modified polyester, but was not successful as indicated in Table 19.

Comparative 19-4

Similarly to Example 19-1 except for using antimony trioxide as a polycondensation catalyst, a polymerization was performed to obtain a metallosulfonate group-containing modified polyester. The amount of antimony trioxide added was 0.05% by mole, as antimony atom, based on the acid components in the polyester (corresponding to the catalyst of Comparative 1-26). The polycondensation time period and the IV are shown in Table 19. The amount of a metal catalyst is the amount as metal atom. Although the dyeability was satisfactory as reflected by the 96% dye absorption, the spinning performance was poor and an increase in the back pressure and a snapping of the thread were observed.

Example 20

Example of Flame Retardant Fiber

The flame retardant property of a flame retardant polyester fiber was evaluated by the method described below.

Flame retardant property: An evaluation was made in accordance with JIS L-1091 D. Thus, a 50-denier, 24-filament, knitted sample obtained after a spinning followed by an orientation was subjected to a repetitive contact with a flame. The sample was regarded to be acceptable when the number of the contacts with the flame was 3 or more.

Example 20-1

A stainless steel autoclave received 401 parts of terephthalic acid, 45 parts of the phosphorus compound represented by Formula (84) show below and 300 parts of ethylene glycol, to which then 1.7 parts of triethylamine was added, and an esterification was effected at 230° C. under the gauge pressure of 2.5 kg/cm² for 2 hours with removing water generated. Subsequently, a 5 g/L solution of lithium acetate in ethylene glycol as a polycondensation catalyst in an amount as lithium atom of 0.3% by mole based on the acid components and alizarin at 0.2% by mole based on the acid components were added and the temperature of the reaction system was raised over 1 hour to 275° C. with reducing the pressure of the reaction system gradually to 0.1 Torr. Under this condition, a polycondensation was performed. When the polymer was cast as a chip by a standard method and subjected to a spinning at 290° C. by a standard method, almost no dirt on the die was noted and the spinning performance was satisfactory. The time period required for the polymerization and the IV of the resultant polyester are shown in Table 20. The flame retardant property was acceptable since the number of the contacts with the flame was 5.

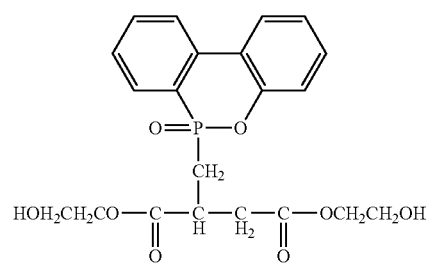

(Formula 84)

Examples 20-2 to 20-26 and Comparative 20-1

The procedure similar to that in Example 20-1 except for using other polycondensation catalysts was employed in a polymerization to obtain each phosphorus compound-copolymerized polyester. The polymerization time periods and the IVs are shown in Table 20. Each polymer exhibited a satisfactory spinning performance.

The flame retardant property of each polymer was acceptable since the number of the contacts with the flame was 5.

Comparative 20-2

An attempt was made to obtain a polyethylene terephthalate by the polymerization procedure similar to that in Example 20-1 except for using no alizarin. The polymerization was discontinued unsuccessfully since the IV after the polycondensation for 180 minutes did not reach 0.5 dl/g. Also by the polymerization procedure similar to that in Example 20-1, an attempt was made to perform a polymerization to obtain a phosphorus compound-copolymerized polyester, but was not successful as indicated in Table 20.

Comparative 20-3

An attempt was made to obtain a polyethylene terephthalate by the polymerization procedure similar to that in Example 20-1 except for using no solution of lithium acetate in ethylene glycol. The polymerization was discontinued unsuccessfully since the IV after the polycondensation for 180 minutes did not reach 0.5 dl/g. Also by the polymerization procedure similar to that in Example 20-1, an attempt was made to perform a polymerization to obtain a phosphorus compound-copolymerized polyester, but was not successful as indicated in Table 20.

Comparative 20-4

Similarly to Example 20-1 except for using antimony trioxide as a polycondensation catalyst, a polymerization was performed to obtain a phosphorus compound-copolymerized polyester. The amount of antimony trioxide added was 0.05% by mole, as antimony atom, based on the acid components in the polyester (corresponding to the catalyst of Comparative 1-26). The polycondensation time period and the IV are shown in Table 20. Although the flame retardant efficiency was acceptable since the number of the contacts with the flame was 5, the spinning performance was poor and a snapping of the thread was observed frequently.

INDUSTRIAL APPLICABILITY

The present invention relates to a highly thermostable polyester produced using a polymerization catalyst other than an antimony compound or a germanium compound, to a polyester polymerization catalyst for producing said polyester, and to a method for producing a polyester using said polyester polymerization catalyst. Such polyester may for example be a polyethylene terephthalate, a polybutylene terephthalate, a polypropylene terephthalate, a cyclohexanedimethanol-modified polyethylene terephthalate and a polyethylene naphthalate. Such polyester can be used in a polyester fiber having excellent thermal stability and spinning performance which is suitable for a clothing, an interior article and a material such as a padding stuff or an unwoven fabric, and in a polyester fiber suitable for an industrial material, for example in a polyester fiber for an industrial material suitable for reinforcing a rubber such as a tire cord or a V belt.

The polyester can also be employed in a highly transparent molded hollow article such as a bottle as well as a film and a sheet. The polyester can also be employed widely in automobile parts and electric or electronic parts, other molded articles of various uses as well as an paints and adhesives.

TABLE 1-1

|  | Metal compound | Additive | IV (dl/g) |
| --- | --- | --- | --- |
| Example 1-1 | Lithium acetate | (A) | 0.58 |
| Example 1-2 |  | (B) | 0.61 |
| Example 1-3 |  | (C) | 0.62 |
| Example 1-4 |  | (D) | 0.56 |
| Example 1-5 |  | (E) | 0.60 |
| Example 1-6 |  | (F) | 0.58 |
| Example 1-7 |  | (G) | 0.57 |
| Example 1-8 |  | (H) | 0.62 |
| Example 1-9 |  | (I) | 0.61 |
| Example 1-10 |  | (J) | 0.57 |
| Example 1-11 |  | (K) | 0.65 |
| Example 1-12 |  | (L) | 0.57 |
| Example 1-13 |  | (M) | 0.62 |
| Example 1-14 |  | (N) | 0.58 |
| Example 1-15 |  | (O) | 0.63 |
| Example 1-16 |  | (P) | 0.60 |
| Example 1-17 |  | (Q) | 0.57 |
| Example 1-18 |  | (R) | 0.57 |
| Comparative example 1-1 |  | — | 0.31 |
| Comparative example 1-2 | — | (A) | 0.25 |

TABLE 1-2

|  | Metal compound | Additive | IV (dl/g) |
| --- | --- | --- | --- |
| Example 1-19 | Sodium acetate | (A) | 0.60 |
| Example 1-20 |  | (B) | 0.58 |
| Example 1-21 |  | (C) | 0.55 |
| Example 1-22 |  | (D) | 0.61 |
| Example 1-23 |  | (E) | 0.61 |
| Example 1-24 |  | (F) | 0.58 |
| Example 1-25 |  | (G) | 0.57 |
| Example 1-26 |  | (H) | 0.61 |
| Example 1-27 |  | (I) | 0.59 |
| Example 1-28 |  | (J) | 0.56 |
| Example 1-29 |  | (K) | 0.63 |
| Example 1-30 |  | (L) | 0.55 |
| Example 1-31 |  | (M) | 0.60 |
| Example 1-32 |  | (N) | 0.61 |
| Example 1-33 |  | (O) | 0.60 |
| Example 1-34 |  | (P) | 0.58 |
| Example 1-35 |  | (Q) | 0.54 |
| Example 1-36 |  | (R) | 0.55 |
| Comparative example 1-3 |  | — | 0.27 |

TABLE 1-3

|  | Metal compound | Additive | IV (dl/g) |
| --- | --- | --- | --- |
| Example 1-37 | Potassium acetate | (A) | 0.56 |
| Example 1-38 |  | (B) | 0.60 |
| Example 1-39 |  | (C) | 0.57 |
| Example 1-40 |  | (D) | 0.59 |
| Example 1-41 |  | (E) | 0.60 |
| Example 1-42 |  | (F) | 0.55 |
| Example 1-43 |  | (G) | 0.56 |
| Example 1-44 |  | (H) | 0.58 |
| Example 1-45 |  | (I) | 0.59 |
| Example 1-46 |  | (J) | 0.58 |
| Example 1-47 |  | (K) | 0.61 |
| Example 1-48 |  | (L) | 0.59 |
| Example 1-49 |  | (M) | 0.61 |

TABLE 1-3-continued

|  | Metal compound | Additive | IV (dl/g) |
| --- | --- | --- | --- |
| Example 1-50 |  | (N) | 0.60 |
| Example 1-51 |  | (O) | 0.59 |
| Example 1-52 |  | (P) | 0.57 |
| Example 1-53 |  | (Q) | 0.57 |
| Example 1-54 |  | (R) | 0.58 |
| Comparative example 1-4 |  | — | 0.27 |

TABLE 1-4

|  | Metal compound | Additive | IV (dl/g) |
| --- | --- | --- | --- |
| Example 1-55 | Beryllium acetate | (A) | 0.61 |
| Example 1-56 |  | (B) | 0.59 |
| Example 1-57 |  | (C) | 0.56 |
| Example 1-58 |  | (D) | 0.60 |
| Example 1-59 |  | (E) | 0.63 |
| Example 1-60 |  | (F) | 0.61 |
| Example 1-61 |  | (G) | 0.58 |
| Example 1-62 |  | (H) | 0.60 |
| Example 1-63 |  | (I) | 0.61 |
| Example 1-64 |  | (J) | 0.57 |
| Example 1-65 |  | (K) | 0.61 |
| Example 1-66 |  | (L) | 0.58 |
| Example 1-67 |  | (M) | 0.60 |
| Example 1-68 |  | (N) | 0.61 |
| Example 1-69 |  | (O) | 0.61 |
| Example 1-70 |  | (P) | 0.58 |
| Example 1-71 |  | (Q) | 0.59 |

TABLE 1-4-continued

|  | Metal compound | Additive | IV (dl/g) |
| --- | --- | --- | --- |
| Example 1-72 |  | (R) | 0.60 |
| Comparative example 1-5 |  | — | 0.26 |

TABLE 1-5

|  | Metal compound | Additive | IV (dl/g) |
| --- | --- | --- | --- |
| Example 1-73 | Magnesium acetate | (A) | 0.68 |
| Example 1-74 |  | (B) | 0.67 |
| Example 1-75 |  | (C) | 0.63 |
| Example 1-76 |  | (D) | 0.66 |
| Example 1-77 |  | (E) | 0.68 |
| Example 1-78 |  | (F) | 0.65 |
| Example 1-79 |  | (G) | 0.61 |
| Example 1-80 |  | (H) | 0.69 |
| Example 1-81 |  | (I) | 0.66 |
| Example 1-82 |  | (J) | 0.65 |
| Example 1-83 |  | (K) | 0.71 |
| Example 1-84 |  | (L) | 0.64 |
| Example 1-85 |  | (M) | 0.69 |
| Example 1-86 |  | (N) | 0.67 |
| Example 1-87 |  | (O) | 0.65 |
| Example 1-88 |  | (P) | 0.66 |
| Example 1-89 |  | (Q) | 0.65 |
| Example 1-90 |  | (R) | 0.63 |
| Comparative example 1-6 |  | — | 0.38 |

TABLE 1-6

|  | Catalyst composition | PET polymerization catalyst amount (mol %) | Polymerization time (min) | IV after fusing test (dl/g) | TD (%) |
| --- | --- | --- | --- | --- | --- |
| Example 1-91 | Lithium acetate | 0.05 | 62 | 0.49 | 18 |
|  | Quinalizarin | 0.1 |  |  |  |
| Example 1-92 | Lithium acetate | 0.3 | 55 | 0.46 | 23 |
|  | Alizarin | 0.2 |  |  |  |
| Example 1-93 | Sodium acetate | 0.1 | 65 | 0.46 | 23 |
|  | 1,8-Diamino-4,5-dihydroxyanthraquinone | 0.1 |  |  |  |
| Example 1-94 | Potassium acetate | 0.05 | 59 | 0.50 | 17 |
|  | Morin | 0.2 |  |  |  |
| Example 1-95 | Sodium acetate | 0.5 | 54 | 0.46 | 23 |
|  | Emodin | 0.5 |  |  |  |
| Example 1-96 | Potassium acetylacetonate | 0.07 | 75 | 0.48 | 20 |
|  | 1,4-Diamino-anthraquinone | 0.01 |  |  |  |
| Example 1-97 | Beryllium acetate | 0.08 | 72 | 0.49 | 18 |
|  | Epigallocatechin gallate | 0.15 |  |  |  |
| Example 1-98 | Magnesium acetate | 0.05 | 51 | 0.48 | 20 |
|  | p-t-Butyl Calix [8] arene | 0.05 |  |  |  |
| Example 1-99 | Sodium acetate | 0.05 | 53 | 0.48 | 20 |
|  | Calix [8] arene | 0.08 |  |  |  |
| Example 1-100 | Sodium acetate | 0.1 | 63 | 0.46 | 23 |
|  | Quinalizatin | 0.2 |  |  |  |
| Example 1-101 | Potassium acetate | 0.05 | 67 | 0.47 | 22 |
|  | Alizarin | 0.1 |  |  |  |
| Example 1-102 | Sodium acetate | 0.1 | 66 | 0.46 | 23 |
|  | Anthrarobin | 0.2 |  |  |  |
| Example 1-103 | Potassium acetate | 0.1 | 65 | 0.46 | 23 |
|  | Quinalizarin | 0.1 |  |  |  |
| Example 1-104 | Sodium sulfate | 0.008 | 106 | 0.51 | 15 |
|  | Quinalizarin | 0.05 |  |  |  |
| Example 1-105 | Lithium acetylacetonate | 0.01 | 98 | 0.50 | 17 |
|  | Quinalizarin | 0.08 |  |  |  |

TABLE 1-6-continued

|  | Catalyst composition | PET polymerization catalyst amount (mol %) | Polymerization time (min) | IV after fusing test (dl/g) | TD (%) |
|---|---|---|---|---|---|
| Example 1-106 | Strontium acetate | 0.2 | 61 | 0.47 | 22 |
|  | Emodin | 0.1 |  |  |  |
| Example 1-107 | Barium acetate | 0.1 | 63 | 0.47 | 22 |
|  | 1,4-Diamino-anthraquinone | 0.5 |  |  |  |
| Example 1-108 | Rubidium acetate | 0.05 | 69 | 0.49 | 18 |
|  | 1,8-Diamino-4,5-dihydroxyanthraquinone | 0.2 |  |  |  |
| Example 1-109 | Sodium acetate | 0.1 | 83 | 0.47 | 22 |
|  | 5,8-Dihydroxy-1,4-naphthoquinone | 0.1 |  |  |  |
| Example 1-110 | Magnesium acetate | 0.05 | 115 | 0.46 | 23 |
|  | 2,5-Dihydroxybenzoquinone | 0.1 |  |  |  |
| Example 1-111 | Lithium acetate | 0.05 | 50 | 0.50 | 17 |
|  | Calix [8] arene | 0.1 |  |  |  |
| Example 1-112 | Sodium methoxide | 0.1 | 64 | 0.47 | 22 |
|  | Anthrarobin | 0.08 |  |  |  |
| Example 1-113 | Lithium acetate | 0.2 | 78 | 0.46 | 23 |
|  | Disodium 4,5-dihydroxynaphthalene-2,7-disulfonate | 0.2 |  |  |  |
| Example 1-114 | Potassium acetate | 0.05 | 93 | 0.48 | 20 |
|  | Esculetin | 0.1 |  |  |  |
| Example 1-115 | Potassium chloride | 0.1 | 57 | 0.47 | 22 |
|  | Morin | 0.25 |  |  |  |
| Example 1-116 | Cesium acetate | 0.1 | 77 | 0.47 | 22 |
|  | Epigallocatechin gallate | 0.1 |  |  |  |
| Example 1-117 | Magnesium acetate | 0.05 | 109 | 0.46 | 23 |
|  | 2,2'-Bisphenol | 0.2 |  |  |  |
| Example 1-118 | Magnesium acetate | 0.03 | 112 | 0.47 | 22 |
|  | 2,2'-Dihydroxy-diphenylether | 0.5 |  |  |  |

TABLE 1-7

|  | Catalyst composition | PET polymerization catalyst amount (mol %) | Polymerization time (min) | IV after fusing test (dl/g) | TD (%) |
|---|---|---|---|---|---|
| Example 1-119 | Magnesium acetate | 0.03 | 85 | 0.48 | 20 |
|  | 1,8-Diamino-4,5-dihydroxyanthraquinone | 0.1 |  |  |  |
| Example 1-120 | Cobalt acetate | 0.01 | 80 | 0.46 | 23 |
|  | Quinalizarin | 0.05 |  |  |  |
| Example 1-121 | Zinc acetate | 0.008 | 85 | 0.47 | 22 |
|  | 1,4-Diaminoanthraquinone | 0.01 |  |  |  |
| Example 1-122 | Manganese acetate | 0.02 | 50 | 0.50 | 17 |
|  | Calix [8] arene | 0.08 |  |  |  |
| Example 1-123 | Iron (III) acetylacetonate | 0.02 | 77 | 0.47 | 22 |
|  | 5,8-Dihydroxy-1,4-naphthoquinone | 0.05 |  |  |  |
| Example 1-124 | Nickel acetate | 0.1 | 85 | 0.47 | 22 |
|  | Anthrarobin | 0.1 |  |  |  |
| Example 1-125 | Ruthenium acetylacetonate | 0.05 | 86 | 0.47 | 22 |
|  | Esculetin | 0.2 |  |  |  |
| Example 1-126 | Rhodium acetylacetonate | 0.05 | 87 | 0.47 | 22 |
|  | Quinalizarin | 0.1 |  |  |  |
| Example 1-127 | Bismuth acetate | 0.2 | 74 | 0.46 | 23 |
|  | Disodium 4,5-dihydroxynaphthalene-2,7-disulfonate | 0.1 |  |  |  |
| Example 1-128 | Palladium acetate | 0.5 | 62 | 0.46 | 23 |
|  | Emodin | 0.5 |  |  |  |
| Example 1-129 | Silver acetate | 0.1 | 79 | 0.46 | 23 |
|  | Anthrarobin | 0.3 |  |  |  |
| Example 1-130 | Tetrabutoxyzirconium | 0.05 | 50 | 0.49 | 18 |
|  | p-t-Butyl Calix[8] arene | 0.1 |  |  |  |

TABLE 1-7-continued

|  | Catalyst composition | PET polymerization catalyst amount (mol %) | Polymerization time (min) | IV after fusing test (dl/g) | TD (%) |
|---|---|---|---|---|---|
| Example 1-131 | Hafnium chloride | 0.07 | 61 | 0.46 | 23 |
|  | Quinalizarin | 0.15 |  |  |  |
| Example 1-132 | Indium acetate | 0.05 | 115 | 0.47 | 22 |
|  | 2,2-Dihydroxydiphenylether | 0.4 |  |  |  |
| Example 1-133 | Lanthanium acetate | 0.05 | 94 | 0.47 | 22 |
|  | Quinalizarin | 0.05 |  |  |  |
| Example 1-134 | Tetraethoxysilane | 0.1 | 65 | 0.46 | 23 |
|  | Morin | 0.2 |  |  |  |

TABLE 1-8

|  | Catalyst composition | PET polymerization catalyst amount (mol %) | Polymerization time (min) | IV after fusing test (dl/g) | TD (%) |
|---|---|---|---|---|---|
| Comparative example 1-7 | Tetrabutoxytitanate | 0.003 | 54 | 0.42 | 30 |
| Comparative example 1-8 | Lithium acetate | 0.005 | 166 | 0.52 | 13 |
|  | Quinalizarin | 0.01 |  |  |  |
| Comparative example 1-9 | Magnesium acetate | 0.5 | 59 | 0.38 | 37 |
|  | 2,2'-Bisphenol | 0.5 |  |  |  |
| Comparative example 1-10 | Lithium acetate | 0.05 | >180 | — | — |
| Comparative example 1-11 | Quinalizarin | 0.1 | >180 | — | — |
| Comparative example 1-12 | Sodium aceate | 0.1 | 144 | — | — |
| Comparative example 1-13 | Quinalizarin | 0.2 | 162 | — | — |
| Comparative example 1-14 | Potassium acetate | 0.05 | 168 | — | — |
| Comparative example 1-15 | Rubidium acetate | 0.05 | 175 | — | — |
| Comparative example 1-16 | Cesium acetate | 0.1 | 180 | — | — |
| Comparative example 1-17 | Beryllium acetate | 0.08 | 152 | — | — |
| Comparative example 1-18 | Tetraethoxysilane | 0.1 | 163 | — | — |
| Comparative example 1-19 | Calcium acetate | 0.05 | 147 | — | — |
| Comparative example 1-20 | Strontium acetate | 0.2 | 191 | — | — |
| Comparative example 1-21 | Ruthenium acetylacetonate | 0.05 | 159 | — | — |
| Comparative example 1-22 | Rhodium acetylacetonate | 0.05 | 170 | — | — |
| Comparative example 1-23 | Palladium acetate | 0.5 | 158 | — | — |
| Comparative example 1-24 | Lithium acetate | 0.3 | >180 | — | — |
| Comparative example 1-25 | Alizarin | 0.2 | >180 | — | — |
| Comparative example 1-26 | Antimony trioxide | 0.05 | 66 | 0.46 | 23 |

(Note 1)
Time required for IV = 0.5 in Comparative examples 1-7 to 1-11 and 1-24 to 1-26.
(Note 2)
Time required for IV = 0.3 in Comparative examples 1-12 to 1-23.

TABLE 2-1

|  | Metal compound | Additive | IV (dl/g) |
|---|---|---|---|
| Example 2-1 | Aluminium acetate | (S) | 0.60 |
| Example 2-2 |  | (Q) | 0.55 |
| Example 2-3 |  | (M) | 0.58 |
| Example 2-4 |  | (N) | 0.59 |
| Example 2-5 |  | (O) | 0.61 |
| Example 2-6 |  | (P) | 0.58 |
| Example 2-7 |  | (J) | 0.56 |
| Example 2-8 |  | (K) | 0.63 |
| Example 2-9 |  | (L) | 0.60 |
| Example 2-10 |  | (I) | 0.61 |
| Example 2-11 |  | (T) | 0.57 |
| Example 2-12 |  | (H) | 0.60 |
| Example 2-13 |  | (G) | 0.55 |
| Example 2-14 |  | (F) | 0.56 |
| Example 2-15 |  | (A) | 0.61 |
| Example 2-16 |  | (B) | 0.62 |
| Example 2-17 |  | (C) | 0.59 |
| Example 2-18 |  | (D) | 0.62 |
| Example 2-19 |  | (E) | 0.58 |
| Comparative example 2-1 |  | — | 0.36 |
| Comparative example 2-2 |  | (S) | 0.25 |

TABLE 2-2

|  | Metal compound | Additive | IV (dl/g) |
|---|---|---|---|
| Example 2-20 | Gallium acetylacetonate | (S) | 0.62 |
| Example 2-21 |  | (Q) | 0.60 |
| Example 2-22 |  | (M) | 0.60 |
| Example 2-23 |  | (N) | 0.62 |
| Example 2-24 |  | (O) | 0.60 |
| Example 2-25 |  | (P) | 0.61 |
| Example 2-26 |  | (J) | 0.62 |
| Example 2-27 |  | (K) | 0.65 |
| Example 2-28 |  | (L) | 0.60 |
| Example 2-29 |  | (I) | 0.60 |
| Example 2-30 |  | (T) | 0.61 |
| Example 2-31 |  | (H) | 0.63 |
| Example 2-32 |  | (G) | 0.59 |
| Example 2-33 |  | (F) | 0.62 |
| Example 2-34 |  | (A) | 0.60 |
| Example 2-35 |  | (B) | 0.65 |
| Example 2-36 |  | (C) | 0.61 |
| Example 2-37 |  | (D) | 0.64 |
| Example 2-38 |  | (E) | 0.63 |
| Comparative example 2-3 |  | — | 0.38 |

TABLE 2-3

|  | Metal compound | Additive | IV (dl/g) |
|---|---|---|---|
| Example 2-39 | Bismuth acetate | (S) | 0.59 |
| Example 2-40 |  | (Q) | 0.56 |
| Example 2-41 |  | (M) | 0.61 |
| Example 2-42 |  | (N) | 0.62 |
| Example 2-43 |  | (O) | 0.61 |
| Example 2-44 |  | (P) | 0.58 |
| Example 2-45 |  | (J) | 0.57 |
| Example 2-46 |  | (K) | 0.61 |
| Example 2-47 |  | (L) | 0.58 |
| Example 2-48 |  | (I) | 0.60 |
| Example 2-49 |  | (T) | 0.59 |
| Example 2-50 |  | (H) | 0.63 |
| Example 2-51 |  | (G) | 0.56 |
| Example 2-52 |  | (F) | 0.57 |
| Example 2-53 |  | (A) | 0.61 |
| Example 2-54 |  | (B) | 0.63 |
| Example 2-55 |  | (C) | 0.63 |
| Example 2-56 |  | (D) | 0.60 |

TABLE 2-3-continued

|  | Metal compound | Additive | IV (dl/g) |
|---|---|---|---|
| Example 2-57 |  | (E) | 0.62 |
| Comparative example 2-4 |  | — | 0.35 |

TABLE 3-1

|  | Metal compound | Additive | IV (dl/g) |
|---|---|---|---|
| Example 3-1 | Chromium acetate | (A) | 0.62 |
| Example 3-2 |  | (B) | 0.64 |
| Example 3-3 |  | (C) | 0.62 |
| Example 3-4 |  | (D) | 0.65 |
| Example 3-5 |  | (E) | 0.66 |
| Example 3-6 |  | (U) | 0.64 |
| Example 3-7 |  | (V) | 0.59 |
| Example 3-8 |  | (H) | 0.64 |
| Example 3-9 |  | (W) | 0.55 |
| Example 3-10 |  | (I) | 0.60 |
| Example 3-11 |  | (J) | 0.58 |
| Example 3-12 |  | (K) | 0.61 |
| Example 3-13 |  | (X) | 0.57 |
| Example 3-14 |  | (M) | 0.60 |
| Example 3-15 |  | (N) | 0.61 |
| Example 3-16 |  | (O) | 0.58 |
| Example 3-17 |  | (P) | 0.63 |
| Example 3-18 |  | (Y) | 0.55 |
| Example 3-19 |  | (S) | 0.58 |
| Comparative example 3-1 |  | — | 0.25 |
| Comparative example 3-2 |  | (A) | 0.25 |

TABLE 3-2

|  | Metal compound | Additive | IV (dl/g) |
|---|---|---|---|
| Example 3-20 | Nickel acetate | (A) | 0.60 |
| Example 3-21 |  | (B) | 0.63 |
| Example 3-22 |  | (C) | 0.59 |
| Example 3-23 |  | (D) | 0.64 |
| Example 3-24 |  | (E) | 0.63 |
| Example 3-25 |  | (U) | 0.64 |
| Example 3-26 |  | (V) | 0.58 |
| Example 3-27 |  | (H) | 0.60 |
| Example 3-28 |  | (W) | 0.62 |
| Example 3-29 |  | (I) | 0.58 |
| Example 3-30 |  | (J) | 0.57 |
| Example 3-31 |  | (K) | 0.60 |
| Example 3-32 |  | (X) | 0.55 |
| Example 3-33 |  | (M) | 0.59 |
| Example 3-34 |  | (N) | 0.62 |
| Example 3-35 |  | (O) | 0.56 |
| Example 3-36 |  | (P) | 0.61 |
| Example 3-37 |  | (Y) | 0.55 |
| Example 3-38 |  | (S) | 0.60 |
| Comparative example 3-3 |  | — | 0.33 |

TABLE 4-1

|  | Metal compound | Additive | IV (dl/g) |
|---|---|---|---|
| Example 4-1 | Yttrium chloride | (S) | 0.55 |
| Example 4-2 |  | (Q) | 0.56 |
| Example 4-3 |  | (M) | 0.59 |
| Example 4-4 |  | (N) | 0.56 |
| Example 4-5 |  | (O) | 0.58 |
| Example 4-6 |  | (P) | 0.58 |
| Example 4-7 |  | (J) | .057 |
| Example 4-8 |  | (K) | 0.62 |
| Example 4-9 |  | (X) | 0.54 |
| Example 4-10 |  | (I) | 0.57 |
| Example 4-11 |  | (T) | 0.59 |

TABLE 4-1-continued

| | Metal compound | Additive | IV (dl/g) |
|---|---|---|---|
| Example 4-12 | | (H) | 0.59 |
| Example 4-13 | | (F) | 0.55 |
| Example 4-14 | | (A) | 0.58 |
| Example 4-15 | | (B) | 0.61 |
| Example 4-16 | | (C) | 0.62 |
| Example 4-17 | | (D) | 0.57 |
| Example 4-18 | | (E) | 0.59 |
| Example 4-19 | | (U) | 0.56 |
| Comparative example 4-1 | | — | 0.26 |
| Comparative example 4-2 | — | (S) | 0.25 |

TABLE 4-2

| | Metal compound | Additive | IV (dl/g) |
|---|---|---|---|
| Example 4-20 | Butoxyzirconium | (S) | 0.57 |
| Example 4-21 | | (Q) | 0.54 |
| Example 4-22 | | (M) | 0.58 |
| Example 4-23 | | (N) | 0.62 |
| Example 4-24 | | (O) | 0.59 |
| Example 4-25 | | (P) | 0.60 |
| Example 4-26 | | (J) | 0.56 |
| Example 4-27 | | (K) | 0.63 |
| Example 4-28 | | (X) | 0.60 |
| Example 4-29 | | (I) | 0.57 |
| Example 4-30 | | (T) | 0.55 |
| Example 4-31 | | (H) | 0.64 |
| Example 4-32 | | (F) | 0.61 |
| Example 4-33 | | (A) | 0.60 |
| Example 4-34 | | (B) | 0.63 |
| Example 4-35 | | (C) | 0.58 |
| Example 4-36 | | (D) | 0.62 |
| Example 4-37 | | (E) | 0.64 |
| Example 4-38 | | (U) | 0.64 |
| Comparative example 4-3 | | — | 0.32 |

TABLE 4-3

| | Metal compound | Additive | IV (dl/g) |
|---|---|---|---|
| Example 4-39 | Hafnium chloride | (S) | 0.54 |
| Example 4-40 | | (Q) | 0.55 |
| Example 4-41 | | (M) | 0.57 |
| Example 4-42 | | (N) | 0.60 |
| Example 4-43 | | (O) | 0.56 |
| Example 4-44 | | (P) | 0.61 |
| Example 4-45 | | (J) | 0.55 |
| Example 4-46 | | (K) | 0.61 |
| Example 4-47 | | (X) | 0.58 |
| Example 4-48 | | (I) | 0.57 |
| Example 4-49 | | (T) | 0.54 |
| Example 4-50 | | (H) | 0.61 |
| Example 4-51 | | (F) | 0.56 |
| Example 4-52 | | (A) | 0.60 |
| Example 4-53 | | (B) | 0.59 |
| Example 4-54 | | (C) | 0.55 |
| Example 4-55 | | (D) | 0.56 |
| Example 4-56 | | (E) | 0.59 |
| Example 4-57 | | (U) | 0.60 |
| Comparative example 4-4 | | — | 0.26 |

TABLE 5-1

| | Metal compound | Additive | IV (dl/g) |
|---|---|---|---|
| Example 5-1 | Ruthenium | (A) | 0.56 |
| Example 5-2 | acetylacetonate | (B) | 0.60 |
| Example 5-3 | | (C) | 0.57 |
| Example 5-4 | | (D) | 0.58 |
| Example 5-5 | | (E) | 0.60 |

TABLE 5-1-continued

| | Metal compound | Additive | IV (dl/g) |
|---|---|---|---|
| Example 5-6 | | (V) | 0.58 |
| Example 5-7 | | (H) | 0.55 |
| Example 5-8 | | (T) | 0.54 |
| Example 5-9 | | (I) | 0.57 |
| Example 5-10 | | (J) | 0.55 |
| Example 5-11 | | (K) | 0.60 |
| Example 5-12 | | (L) | 0.56 |
| Example 5-13 | | (M) | 0.59 |
| Example 5-14 | | (N) | 0.59 |
| Example 5-15 | | (O) | 0.57 |
| Example 5-16 | | (P) | 0.60 |
| Example 5-17 | | (Y) | 0.56 |
| Example 5-18 | | (S) | 0.54 |
| Comparative example 5-1 | | — | 0.24 |
| Comparative example 5-2 | — | (A) | 0.25 |

TABLE 5-2

| | Metal compound | Additive | IV (dl/g) |
|---|---|---|---|
| Example 5-19 | Palladium | (A) | 0.56 |
| Example 5-20 | acetate | (B) | 0.59 |
| Example 5-21 | | (C) | 0.55 |
| Example 5-22 | | (D) | 0.57 |
| Example 5-23 | | (E) | 0.57 |
| Example 5-24 | | (V) | 0.53 |
| Example 5-25 | | (H) | 0.56 |
| Example 5-26 | | (T) | 0.55 |
| Example 5-27 | | (I) | 0.58 |
| Example 5-28 | | (J) | 0.56 |
| Example 5-29 | | (K) | 0.54 |
| Example 5-30 | | (L) | 0.56 |
| Example 5-31 | | (M) | 0.55 |
| Example 5-32 | | (N) | 0.58 |
| Example 5-33 | | (O) | 0.56 |
| Example 5-34 | | (P) | 0.59 |
| Example 5-35 | | (Y) | 0.55 |
| Example 5-36 | | (S) | 0.57 |
| Comparative example 5-3 | | — | 0.25 |

TABLE 6-1

| | Metal compound | Additive | IV (dl/g) |
|---|---|---|---|
| Example 6-1 | Copper acetate | (S) | 0.61 |
| Example 6-2 | | (Y) | 0.58 |
| Example 6-3 | | (M) | 0.60 |
| Example 6-4 | | (N) | 0.62 |
| Example 6-5 | | (O) | 0.61 |
| Example 6-6 | | (P) | 0.65 |
| Example 6-7 | | (J) | 0.57 |
| Example 6-8 | | (K) | 0.63 |
| Example 6-9 | | (L) | 0.59 |
| Example 6-10 | | (I) | 0.60 |
| Example 6-11 | | (T) | 0.56 |
| Example 6-12 | | (H) | 0.58 |
| Example 6-13 | | (G) | 0.56 |
| Example 6-14 | | (F) | 0.59 |
| Example 6-15 | | (A) | 0.62 |
| Example 6-16 | | (B) | 0.65 |
| Example 6-17 | | (C) | 0.62 |
| Example 6-18 | | (D) | 0.66 |
| Example 6-19 | | (E) | 0.61 |
| Comparative example 6-1 | | — | 0.25 |
| Comparative example 6-2 | — | (S) | 0.25 |

TABLE 6-2

| | Metal compound | Additive | IV (dl/g) |
|---|---|---|---|
| Example 6-20 | Silver acetate | (S) | 0.59 |
| Example 6-21 | | (Y) | 0.56 |
| Example 6-22 | | (M) | 0.58 |
| Example 6-23 | | (N) | 0.60 |
| Example 6-24 | | (O) | 0.61 |
| Example 6-25 | | (P) | 0.58 |
| Example 6-26 | | (J) | 0.57 |
| Example 6-27 | | (K) | 0.62 |
| Example 6-28 | | (L) | 0.57 |
| Example 6-29 | | (I) | 0.60 |
| Example 6-30 | | (T) | 0.55 |
| Example 6-31 | | (H) | 0.63 |
| Example 6-32 | | (G) | 0.56 |
| Example 6-33 | | (F) | 0.58 |
| Example 6-34 | | (A) | 0.61 |
| Example 6-35 | | (B) | 0.64 |
| Example 6-36 | | (C) | 0.59 |
| Example 6-37 | | (D) | 0.63 |
| Example 6-38 | | (E) | 0.62 |
| Comparative example 6-3 | | — | 0.27 |

TABLE 7-1

| | Metal compound | Additive | IV (dl/g) |
|---|---|---|---|
| Example 7-1 | Lanthanium acetate | (A) | 0.55 |
| Example 7-2 | | (B) | 0.57 |
| Example 7-3 | | (C) | .0.54 |
| Example 7-4 | | (D) | 0.59 |
| Example 7-5 | | (E) | 0.61 |
| Example 7-6 | | (U) | 0.58 |
| Example 7-7 | | (F) | 0.52 |
| Example 7-8 | | (H) | 0.58 |
| Example 7-9 | | (I) | 0.55 |
| Example 7-10 | | (T) | 0.52 |
| Example 7-11 | | (J) | 0.54 |
| Example 7-12 | | (K) | 0.58 |
| Example 7-13 | | (L) | 0.52 |
| Example 7-14 | | (M) | 0.56 |
| Example 7-15 | | (N) | 0.55 |
| Example 7-16 | | (O) | 0.54 |
| Example 7-17 | | (P) | 0.57 |
| Example 7-18 | | (S) | 0.53 |
| Comparative example 7-1 | | — | 0.30 |
| Comparative example 7-2 | | (A) | 0.25 |

TABLE 7-2

| | Metal compound | Additive | IV (dl/g) |
|---|---|---|---|
| Example 7-19 | Cerium acetate | (A) | 0.61 |
| Example 7-20 | | (B) | 0.57 |
| Example 7-21 | | (C) | 0.58 |
| Example 7-22 | | (D) | 0.61 |
| Example 7-23 | | (E) | 0.56 |
| Example 7-24 | | (U) | 0.59 |
| Example 7-25 | | (F) | 0.54 |
| Example 7-26 | | (H) | 0.61 |
| Example 7-27 | | (I) | 0.59 |
| Example 7-28 | | (T) | 0.53 |
| Example 7-29 | | (J) | 0.58 |
| Example 7-30 | | (K) | 0.56 |
| Example 7-31 | | (L) | 0.54 |
| Example 7-32 | | (M) | 0.59 |
| Example 7-33 | | (N) | 0.58 |
| Example 7-34 | | (O) | 0.54 |
| Example 7-35 | | (P) | 0.56 |
| Example 7-36 | | (S) | 0.52 |
| Comparative example 7-3 | | — | 0.33 |

TABLE 7-3

| | Metal compound | Additive | IV (dl/g) |
|---|---|---|---|
| Example 7-37 | Samarium acetate | (A) | 0.64 |
| Example 7-38 | | (B) | 0.61 |
| Example 7-39 | | (C) | 0.60 |
| Example 7-40 | | (D) | 0.63 |
| Example 7-41 | | (E) | 0.65 |
| Example 7-42 | | (U) | 0.66 |
| Example 7-43 | | (F) | 0.57 |
| Example 7-44 | | (H) | 0.64 |
| Example 7-45 | | (I) | 0.56 |
| Example 7-46 | | (T) | 0.55 |
| Example 7-47 | | (J) | 0.60 |
| Example 7-48 | | (K) | 0.63 |
| Example 7-49 | | (L) | 0.61 |
| Example 7-50 | | (M) | 0.58 |
| Example 7-51 | | (N) | 0.60 |
| Example 7-52 | | (O) | 0.62 |
| Example 7-53 | | (P) | 0.61 |
| Example 7-54 | | (S) | 0.56 |
| Comparative example 7-4 | | — | 0.31 |

TABLE 7-4

| | Metal compound | Additive | IV (dl/g) |
|---|---|---|---|
| Example 7-55 | Europium acetate | (A) | 0.62 |
| Example 7-56 | | (B) | 0.59 |
| Example 7-57 | | (C) | 0.58 |
| Example 7-58 | | (D) | 0.57 |
| Example 7-59 | | (E) | 0.61 |
| Example 7-60 | | (U) | 0.58 |
| Example 7-61 | | (F) | 0.55 |
| Example 7-62 | | (H) | 0.57 |
| Example 7-63 | | (I) | 0.61 |
| Example 7-64 | | (T) | 0.58 |
| Example 7-65 | | (J) | 0.54 |
| Example 7-66 | | (K) | 0.60 |
| Example 7-67 | | (L) | 0.56 |
| Example 7-68 | | (M) | 0.54 |
| Example 7-69 | | (N) | 0.54 |
| Example 7-70 | | (O) | 0.57 |
| Example 7-71 | | (P) | 0.60 |
| Example 7-72 | | (S) | 0.55 |
| Comparative example 7-5 | | — | 0.30 |

TABLE 7-5

| | Metal compound | Additive | IV (dl/g) |
|---|---|---|---|
| Example 7-73 | Gadolinium acetate | (A) | 0.54 |
| Example 7-74 | | (B) | 0.55 |
| Example 7-75 | | (C) | 0.58 |
| Example 7-76 | | (D) | 0.59 |
| Example 7-77 | | (E) | 0.54 |
| Example 7-78 | | (U) | 0.57 |
| Example 7-79 | | (F) | 0.56 |
| Example 7-80 | | (H) | 0.60 |
| Example 7-81 | | (I) | 0.56 |
| Example 7-82 | | (T) | 0.52 |
| Example 7-83 | | (J) | 0.55 |
| Example 7-84 | | (K) | 0.54 |
| Example 7-85 | | (L) | 0.54 |
| Example 7-86 | | (M) | 0.52 |
| Example 7-87 | | (N) | 0.58 |
| Example 7-88 | | (O) | 0.57 |
| Example 7-89 | | (P) | 0.55 |
| Example 7-9.0 | | (S) | 0.57 |
| Comparative example 7-6 | | — | 0.27 |

TABLE 8-1

|  | Metal compound | Additive | IV (dl/g) |
|---|---|---|---|
| Example 8-1 | Zinc acetate | (A) | 0.59 |
| Example 8-2 |  | (B) | 0.62 |
| Example 8-3 |  | (D) | 0.59 |
| Example 8-4 |  | (E) | 0.63 |
| Example 8-5 |  | (U) | 0.57 |
| Example 8-6 |  | (F) | 0.61 |
| Example 8-7 |  | (H) | 0.57 |
| Example 8-8 |  | (I) | 0.55 |
| Example 8-9 |  | (Z) | 0.58 |
| Example 8-10 |  | (T) | 0.57 |
| Example 8-11 |  | (W) | 0.56 |
| Example 8-12 |  | (L) | 0.58 |
| Example 8-13 |  | (K) | 0.62 |
| Example 8-14 |  | (AA) | 0.62 |
| Example 8-15 |  | (J) | 0.60 |
| Example 8-16 |  | (BB) | 0.63 |
| Example 8-17 |  | (P) | 0.68 |
| Example 8-18 |  | (O) | 0.67 |
| Comparative example 8-1 |  | — | 0.45 |
| Comparative example 8-2 | — | (A) | 0.25 |

TABLE 8-2

|  | Metal compound | Additive | IV (dl/g) |
|---|---|---|---|
| Example 8-19 | Manganese acetate | (A) | 0.59 |
| Example 8-20 |  | (B) | 0.54 |
| Example 8-21 |  | (D) | 0.56 |
| Example 8-22 |  | (E) | 0.55 |
| Example 8-23 |  | (U) | 0.60 |
| Example 8-24 |  | (F) | 0.55 |
| Example 8-25 |  | (H) | 0.51 |
| Example 8-26 |  | (I) | 0.58 |
| Example 8-27 |  | (Z) | 0.58 |
| Example 8-28 |  | (T) | 0.55 |
| Example 8-29 |  | (W) | 0.53 |
| Example 8-30 |  | (L) | 0.56 |
| Example 8-31 |  | (K) | 0.54 |
| Example 8-32 |  | (AA) | 0.56 |
| Example 8-33 |  | (J) | 0.55 |
| Example 8-34 |  | (BB) | 0.57 |
| Example 8-35 |  | (P) | 0.65 |
| Example 8-36 |  | (O) | 0.64 |
| Comparative example 8-3 |  | — | 0.42 |

TABLE 8-3

|  | Metal compound | Additive | IV (dl/g) |
|---|---|---|---|
| Example 8-37 | Cobalt acetate | (A) | 0.60 |
| Example 8-38 |  | (B) | 0.57 |
| Example 8-39 |  | (D) | 0.52 |
| Example 8-40 |  | (E) | 0.50 |
| Example 8-41 |  | (U) | 0.51 |
| Example 8-42 |  | (F) | 0.55 |
| Example 8-43 |  | (H) | 0.50 |
| Example 8-44 |  | (I) | 0.55 |
| Example 8-45 |  | (Z) | 0.56 |
| Example 8-46 |  | (T) | 0.57 |
| Example 8-47 |  | (W) | 0.61 |
| Example 8-48 |  | (L) | 0.61 |
| Example 8-49 |  | (K) | 0.58 |
| Example 8-50 |  | (AA) | 0.57 |
| Example 8-51 |  | (J) | 0.55 |
| Example 8-52 |  | (BB) | 0.53 |
| Example 8-53 |  | (P) | 0.68 |
| Example 8-54 |  | (O) | 0.66 |
| Comparative example 8-4 |  | — | 0.44 |

TABLE 9

|  | Metal compound | Additive | IV (dl/g) |
|---|---|---|---|
| Example 9-1 | Indium acetate | (W) | 0.57 |
| Example 9-2 |  | (T) | 0.56 |
| Example 9-3 |  | (BB) | 0.57 |
| Example 9-4 |  | (K) | 0.57 |
| Example 9-5 |  | (AA) | 0.59 |
| Example 9-6 |  | (L) | 0.53 |
| Example 9-7 |  | (X) | 0.51 |
| Example 9-8 |  | (O) | 0.63 |
| Example 9-9 |  | (P) | 0.65 |
| Example 9-10 |  | (B) | 0.55 |
| Example 9-11 |  | (CC) | 0.51 |
| Example 9-12 |  | (C) | 0.59 |
| Example 9-13 |  | (D) | 0.55 |
| Example 9-14 |  | (E) | 0.57 |
| Example 9-15 |  | (F) | 0.51 |
| Example 9-16 |  | (H) | 0.58 |
| Example 9-17 |  | (I) | 0.59 |
| Example 9-18 |  | (Z) | 0.53 |
| Comparative example 9-1 |  | — | 0.39 |
| Comparative example 9-2 | — | (W) | 0.25 |

TABLE 10-1

|  | Catalyst composiiton | PET polymerization catalyst amount (mol %) | IV (dl/g) |
|---|---|---|---|
| Example 10-1 | Sodium acetate | 0.05 | 0.51 |
|  | Quinalizarin | 0.05 |  |
| Example 10-2 | Potassium acetate | 0.05 | 0.48 |
|  | Quinalizarin | 0.05 |  |
| Example 10-3 | Rubidium acetate | 0.05 | 0.45 |
|  | Anthrarobin | 0.05 |  |
| Example 10-4 | Cesium acetate | 0.05 | 0.52 |
|  | Calix [8] arene | 0.05 |  |
| Example 10-5 | Beryllium acetylacetonate | 0.05 | 0.47 |
|  | Morin | 0.05 |  |
| Example 10-6 | Silicon acetate | 0.05 | 0.51 |
|  | Morin | 0.05 |  |
| Example 10-7 | Copper acetate | 0.05 | 0.60 |
|  | Calix [8] arene | 0.05 |  |
| Example 10-8 | Sodium acetate | 0.05 | 0.56 |
|  | Calix [8] arene | 0.05 |  |

TABLE 10-2

|  | Catalyst composiiton | PET polymerization catalyst amount (mol %) | IV (dl/g) |
|---|---|---|---|
| Comparative example 10-1 | Sodium acetate | 0.05 | 0.27 |
| Comparative example 10-2 | Potassium acetate | 0.05 | 0.27 |
| Comparative example 10-3 | Rubidium acetate | 0.05 | 0.29 |
| Comparative example 10-4 | Cesium acetate | 0.05 | 0.29 |
| Comparative example 10-5 | Beryllium acetylacetonate | 0.05 | 0.27 |
| Comparative example 10-6 | Silicon acetate | 0.05 | 0.26 |
| Comparative example 10-7 | Copper acetate | 0.05 | 0.26 |
| Comparative example 10-8 | Quinalizarin (A) | 0.05 | 0.25 |
| Comparative example 10-9 | Anthrarobin (H) | 0.05 | 0.26 |

TABLE 10-2-continued

| | Catalyst composiiton | PET polymerization catalyst amount (mol %) | IV (dl/g) |
|---|---|---|---|
| Comparative example 10-10 | Morin (K) | 0.05 | 0.25 |
| Comparative example 10-11 | Calix [8] arene | 0.05 | 0.27 |
| Comparative example 10-12 | None | — | 0.25 |
| Comparative example 10-13 | Antimony trioxide (reference) | 0.05 | 0.57 |

TABLE 11

| | | | Polybutylene terephthalate | |
|---|---|---|---|---|
| | | Catalyst | Polymerization time (min) | Reduced viscosity (dl/g) |
| Example | 11-1 | Example 1-92 | 40 | 0.92 |
| | 11-2 | Example 1-100 | 50 | 1.01 |
| | 11-3 | Example 1-94 | 45 | 0.95 |
| | 11-4 | Example 1-119 | 50 | 0.94 |
| | 11-5 | Example 1-101 | 50 | 0.91 |
| | 11-6 | Example 1-106 | 55 | 1.02 |
| | 11-7 | Example 1-107 | 45 | 0.93 |
| | 11-8 | Example 1-97 | 45 | 0.96 |
| | 11-9 | Example 1-99 | 40 | 0.98 |
| | 11-10 | Example 1-120 | 45 | 0.95 |
| | 11-11 | Example 1-121 | 50 | 0.91 |
| | 11-12 | Example 1-122 | 40 | 0.97 |
| | 11-13 | Example 1-123 | 50 | 0.96 |
| | 11-14 | Example 1-124 | 55 | 1.02 |
| | 11-15 | Example 1-125 | 50 | 0.87 |
| | 11-16 | Example 1-126 | 50 | 0.92 |
| | 11-17 | Example 1-127 | 55 | 0.95 |
| | 11-18 | Example 1-128 | 50 | 1.03 |
| | 11-19 | Example 1-129 | 45 | 0.97 |
| | 11-20 | Example 1-130 | 40 | 1.01 |
| | 11-21 | Example 1-131 | 50 | 0.96 |
| | 11-22 | Example 1-116 | 55 | 1.00 |
| | 11-23 | Example 1-108 | 55 | 0.94 |
| | 11-24 | Example 1-132 | 65 | 0.86 |
| | 11-25 | Example 1-133 | 50 | 0.92 |
| | 11-26 | Example 1-134 | 55 | 0.90 |
| Comparative example | 11-1 | Comparative example 1-8 | 90 | 0.75 |
| | 11-2 | Comparative example 1-24 | 90 | 0.43 |
| | 11-3 | Comparative example 1-25 | 90 | 0.38 |

TABLE 12

| | | | Polyethylene naphthalate | |
|---|---|---|---|---|
| | | Catalyst | Polymerization time (min) | IV (dl/g) |
| Example | 12-1 | Example 1-92 | 40 | 0.57 |
| | 12-2 | Example 1-100 | 45 | 0.58 |
| | 12-3 | Example 1-94 | 40 | 0.57 |
| | 12-4 | Example 1-119 | 45 | 0.56 |
| | 12-5 | Example 1-101 | 45 | 0.54 |
| | 12-6 | Example 1-106 | 45 | 0.56 |
| | 12-7 | Example 1-107 | 45 | 0.57 |
| | 12-8 | Example 1-97 | 45 | 0.55 |
| | 12-9 | Example 1-99 | 40 | 0.60 |
| | 12-10 | Example 1-120 | 45 | 0.56 |
| | 12-11 | Example 1-121 | 45 | 0.53 |
| | 12-12 | Example 1-122 | 40 | 0.60 |
| | 12-13 | Example 1-123 | 50 | 0.51 |
| | 12-14 | Example 1-124 | 45 | 0.58 |
| | 12-15 | Example 1-125 | 55 | 0.50 |
| | 12-16 | Example 1-126 | 55 | 0.52 |
| | 12-17 | Example 1-127 | 50 | 0.57 |
| | 12-18 | Example 1-128 | 40 | 0.58 |
| | 12-19 | Example 1-129 | 45 | 0.58 |
| | 12-20 | Example 1-130 | 40 | 0.62 |
| | 12-21 | ExamPle 1-131 | 45 | 0.55 |
| | 12-22 | Example 1-116 | 45 | 0.55 |
| | 12-23 | Example 1-108 | 45 | 0.56 |
| | 12-24 | Example 1-132 | 60 | 0.50 |
| | 12-25 | Example 1-133 | 55 | 0.53 |
| | 12-26 | Example 1-134 | 45 | 0.59 |
| Comparative example | 12-1 | Comparative example 1-8 | 120 | 0.56 |
| | 12-2 | Comparative example 1-24 | | |
| | 12-3 | Comparative example 1-25 | 120 | 0.32 |

TABLE 13

| | | | Polypropylene terephthalate | |
|---|---|---|---|---|
| | | Catalyst | Polymerization time (min) | IV (dl/g) |
| Example | 13-1 | Example 1-92 | 80 | 0.75 |
| | 13-2 | Example 1-100 | 75 | 0.68 |
| | 13-3 | Example 1-94 | 80 | 0.70 |
| | 13-4 | Example 1-119 | 75 | 0.77 |
| | 13-5 | Example 1-101 | 75 | 0.72 |
| | 13-6 | Example 1-106 | 85 | 0.81 |
| | 13-7 | Example 1-107 | 80 | 0.73 |
| | 13-8 | Example 1-97 | 80 | 0.75 |
| | 13-9 | Example 1-99 | 75 | 0.81 |
| | 13-10 | Example 1-120 | 80 | 0.74 |
| | 13-11 | Example 1-121 | 80 | 0.73 |
| | 13-12 | Example 1-122 | 75 | 0.82 |
| | 13-13 | Example 1-123 | 80 | 0.80 |
| | 13-14 | Example 1-124 | 75 | 0.72 |
| | 13-15 | Example 1-125 | 80 | 0.74 |
| | 13-16 | Example 1-126 | 80 | 0.73 |
| | 13-17 | Example 1-127 | 80 | 0.81 |
| | 13-18 | Example 1-128 | 85 | 0.82 |
| | 13-19 | Example 1-129 | 75 | 0.78 |
| | 13-20 | Example 1-130 | 75 | 0.84 |
| | 13-21 | Example 1-131 | 75 | 0.76 |
| | 13-22 | Example 1-116 | 80 | 0.81 |
| | 13-23 | Example 1-108 | 80 | 0.75 |
| | 13-24 | Example 1-132 | 85 | 0.67 |
| | 13-25 | Example 1-133 | 80 | 0.71 |
| | 13-26 | Example 1-134 | 85 | 0.73 |
| Comparative example | 13-1 | Comparative example 1-8 | 150 | 0.58 |
| | 13-2 | Comparative example 1-24 | 180 | 0.31 |
| | 13-3 | Comparative example 1-25 | 180 | 0.25 |

TABLE 14

| | | | CHDM copolymeric polyester | |
|---|---|---|---|---|
| | | Catalyst | Polymerization time (min) | Reduced viscosity (dl/g) |
| Example | 14-1 | Example 1-92 | 70 | 0.84 |
| | 14-2 | Example 1-100 | 65 | 0.78 |

TABLE 14-continued

| | | Catalyst | CHDM copolymeric polyester | |
|---|---|---|---|---|
| | | | Polymerization time (min) | Reduced viscosity (dl/g) |
| | 14-3 | Example 1-94 | 70 | 0.75 |
| | 14-4 | Example 1-119 | 70 | 0.82 |
| | 14-5 | Example 1-101 | 70 | 0.76 |
| | 14-6 | Example 1-106 | 75 | 0.85 |
| | 14-7 | Example 1-107 | 75 | 0.82 |
| | 14-8 | Example 1-97 | 70 | 0.73 |
| | 14-9 | Example 1-99 | 60 | 0.81 |
| | 14-10 | Example 1-120 | 65 | 0.78 |
| | 14-11 | Example 1-121 | 65 | 0.75 |
| | 14-12 | Example 1-122 | 60 | 0.83 |
| | 14-13 | Example 1-123 | 65 | 0.81 |
| | 14-14 | Example 1-124 | 60 | 0.77 |
| | 14-15 | Example 1-125 | 65 | 0.72 |
| | 14-16 | Example 1-126 | 65 | 0.74 |
| | 14-17 | Example 1-127 | 60 | 0.78 |
| | 14-18 | Example 1-128 | 65 | 0.84 |
| | 14-19 | Example 1-129 | 60 | 0.77 |
| | 14-20 | Example 1-130 | 60 | 0.85 |
| | 14-21 | Example 1-131 | 65 | 0.81 |
| | 14-22 | Example 1-116 | 65 | 0.73 |
| | 14-23 | Example 1-108 | 65 | 0.77 |
| | 14-24 | Example 1-132 | 75 | 0.68 |
| | 14-25 | Example 1-133 | 70 | 0.76 |
| | 14-26 | Example 1-134 | 75 | 0.75 |
| Comparative example | 14-1 | Comparative example 1-8 | 140 | 0.66 |
| | 14-2 | Comparative example 1-24 | 150 | 0.32 |
| | 14-3 | Comparative example 1-25 | 150 | 0.29 |

TABLE 15

| | | Catalyst employed | Foreign bodies in PET film (pieces/g) |
|---|---|---|---|
| Example | 15-1 | Example 1-92 | 21 |
| | 15-2 | Example 1-100 | 25 |
| | 15-3 | Example 1-94 | 12 |
| | 15-4 | Example 1-119 | 3 |
| | 15-5 | Example 1-101 | 24 |
| | 15-6 | Example 1-106 | 35 |
| | 15-7 | Example 1-107 | 23 |
| | 15-8 | Example 1-97 | 10 |
| | 15-9 | Example 1-99 | 15 |
| | 15-10 | Example 1-120 | 5 |
| | 15-11 | Example 1-121 | 4 |
| | 15-12 | Example 1-122 | 8 |
| | 15-13 | Example 1-123 | 10 |
| | 15-14 | Example 1-124 | 7 |
| | 15-15 | Example 1-125 | 5 |
| | 15-16 | Example 1-126 | 4 |
| | 15-17 | Example 1-127 | 25 |
| | 15-18 | Example 1-128 | 24 |
| | 15-19 | Example 1-129 | 15 |
| | 15-20 | Example 1-130 | 19 |
| | 15-21 | Example 1-131 | 12 |
| | 15-22 | Example 1-116 | 14 |
| | 15-23 | Example 1-108 | 10 |
| | 15-24 | Example 1-132 | 6 |
| | 15-25 | Example 1-133 | 3 |
| | 15-26 | Example 1-134 | 12 |
| Comparative example | 15-1 | Comparative example 1-8 | 5 |
| | 15-2 | Comparative example 1-24 | — |
| | 15-3 | Comparative example 1-25 | — |
| | 15-4 | Comparative example 1-26 | 65 |

TABLE 16

| | | Catalyst employed | Haze of molded PET sheet (%) |
|---|---|---|---|
| Example | 16-1 | Example 1-92 | 4.7 |
| | 16-2 | Example 1-100 | 3.5 |
| | 16-3 | Example 1-94 | 4.3 |
| | 16-4 | Example 1-119 | 3.2 |
| | 16-5 | Example 1-101 | 3.3 |
| | 16-6 | Example 1-106 | 4.5 |
| | 16-7 | Example 1-107 | 5.3 |
| | 16-8 | Example 1-97 | 3.7 |
| | 16-9 | Example 1-99 | 3.1 |
| | 16-10 | Example 1-120 | 3.3 |
| | 16-11 | Example 1-121 | 2.8 |
| | 16-12 | Example 1-122 | 2.7 |
| | 16-13 | Example 1-123 | 3.6 |
| | 16-14 | Example 1-124 | 4.1 |
| | 16-15 | Example 1-125 | 3.8 |
| | 16-16 | Example 1-126 | 4.5 |
| | 16-17 | Example 1-127 | 4.6 |
| | 16-18 | Example 1-128 | 6.9 |
| | 16-19 | Example 1-129 | 4.4 |
| | 16-20 | Example 1-130 | 3.2 |
| | 16-21 | Example 1-131 | 4.0 |
| | 16-22 | Example 1-116 | 3.7 |
| | 16-23 | Example 1-108 | 4.5 |
| | 16-24 | Example 1-132 | 5.7 |
| | 16-25 | Example 1-133 | 3.8 |
| | 16-26 | Example 1-134 | 4.4 |
| Comparative example | 16-1 | Comparative example 1-8 | 2.7 |
| | 16-2 | Comparative example 1-24 | — |
| | 16-3 | Comparative example 1-25 | — |
| | 16-4 | Comparative example 1-26 | 24.5 |

TABLE 17

| | | Catalyst employed | Foreign bodies in PET fiber (pieces/g) |
|---|---|---|---|
| Example | 17-1 | Example 1-92 | 0 |
| | 17-2 | Example 1-100 | 0 |
| | 17-3 | Example 1-94 | 1 |
| | 17-4 | Example 1-119 | 1 |
| | 17-5 | Example 1-101 | 0 |
| | 17-6 | Example 1-106 | 1 |
| | 17-7 | Example 1-107 | 1 |
| | 17-8 | Example 1-97 | 1 |
| | 17-9 | Example 1-99 | 0 |
| | 17-10 | Example 1-120 | 0 |
| | 17-11 | Example 1-121 | 0 |
| | 17-12 | Example 1-122 | 0 |
| | 17-13 | Example 1-123 | 1 |
| | 17-14 | Example 1-124 | 0 |
| | 17-15 | Example 1-125 | 0 |
| | 17-16 | Example 1-126 | 0 |
| | 17-17 | Example 1-127 | 1 |
| | 17-18 | Example 1-128 | 0 |
| | 17-19 | Example 1-129 | 0 |
| | 17-20 | Example 1-130 | 1 |
| | 17-21 | Example 1-131 | 0 |
| | 17-22 | Example 1-116 | 0 |
| | 17-23 | Example 1-108 | 0 |
| | 17-24 | Example 1-132 | 2 |
| | 17-25 | Example 1-133 | 0 |
| | 17-26 | Example 1-134 | 0 |
| Comparative example | 17-1 | Comparative example 1-8 | 0 |

TABLE 17-continued

|  |  | Catalyst employed | Foreign bodies in PET fiber (pieces/g) |
|---|---|---|---|
| ple | 17-2 | Comparative example 1-24 | — |
|  | 17-3 | Comparative example 1-25 | — |
|  | 17-4 | Comparative example 1-26 | 15 |

TABLE 18

|  |  |  | PET for fiber | |
|---|---|---|---|---|
|  |  | Catalyst | Polymerization time (min) | IV (dl/g) |
| Example | 18-1 | Example 1-92 | 74 | 0.63 |
|  | 18-2 | Example 1-100 | 80 | 0.61 |
|  | 18-3 | Example 1-94 | 78 | 0.61 |
|  | 18-4 | Example 1-119 | 104 | 0.62 |
|  | 18-5 | Example 1-101 | 87 | 0.62 |
|  | 18-6 | Example 1-106 | 80 | 0.63 |
|  | 18-7 | Example 1-107 | 81 | 0.61 |
|  | 18-8 | Example 1-97 | 94 | 0.61 |
|  | 18-9 | Example 1-99 | 71 | 0.62 |
|  | 18-10 | Example 1-120 | 99 | 0.62 |
|  | 18-11 | Example 1-121 | 105 | 0.61 |
|  | 18-12 | Example 1-122 | 70 | 0.61 |
|  | 18-13 | Example 1-123 | 95 | 0.61 |
|  | 18-14 | Example 1-124 | 102 | 0.63 |
|  | 18-15 | Example 1-125 | 104 | 0.62 |
|  | 18-16 | Example 1-126 | 108 | 0.62 |
|  | 18-17 | Example 1-127 | 93 | 0.61 |
|  | 18-18 | Example 1-128 | 84 | 0.61 |
|  | 18-19 | Example 1-129 | 102 | 0.61 |
|  | 18-20 | Example 1-130 | 69 | 0.62 |
|  | 18-21 | Example 1-131 | 79 | 0.62 |
|  | 18-22 | Example 1-116 | 96 | 0.61 |
|  | 18-23 | Example 1-108 | 90 | 0.61 |
|  | 18-24 | Example 1-132 | 141 | 0.61 |
|  | 18-25 | Example 1-133 | 120 | 0.61 |
|  | 18-26 | Example 1-134 | 87 | 0.62 |
| Comparative example | 18-1 | Comparative example 1-8 | 205 | 0.60 |
|  | 18-2 | Comparative example 1-24 | — | — |
|  | 18-3 | Comparative example 1-25 | — | — |
|  | 18-4 | Comparative example 1-26 | 88 | 0.63 |

TABLE 19

|  |  |  | Modified PET | |
|---|---|---|---|---|
|  |  | Catalyst | Polymerization time (min) | IV (dl/g) |
| Example | 19-1 | Example 1-92 | 80 | 0.55 |
|  | 19-2 | Example 1-100 | 90 | 0.56 |
|  | 19-3 | Example 1-94 | 90 | 0.57 |
|  | 19-4 | Example 1-119 | 120 | 0.55 |
|  | 19-5 | Example 1-101 | 100 | 0.58 |
|  | 19-6 | Example 1-106 | 90 | 0.58 |
|  | 19-7 | Example 1-107 | 90 | 0.56 |
|  | 19-8 | Example 1-97 | 105 | 0.56 |
|  | 19-9 | Example 1-99 | 80 | 0.58 |
|  | 19-10 | Example 1-120 | 115 | 0.56 |
|  | 19-11 | Example 1-121 | 120 | 0.59 |
|  | 19-12 | Example 1-122 | 80 | 0.57 |
|  | 19-13 | Example 1-123 | 110 | 0.60 |
|  | 19-14 | Example 1-124 | 115 | 0.58 |
|  | 19-15 | Example 1-125 | 115 | 0.57 |
|  | 19-16 | Example 1-126 | 125 | 0.57 |
|  | 19-17 | Example 1-127 | 105 | 0.59 |
|  | 19-18 | Example 1-128 | 95 | 0.57 |
|  | 19-19 | Example 1-129 | 115 | 0.58 |
|  | 19-20 | Example 1-130 | 80 | 0.58 |
|  | 19-21 | Example 1-131 | 90 | 0.57 |
|  | 19-22 | Example 1-116 | 105 | 0.56 |
|  | 19-23 | Example 1-108 | 100 | 0.56 |
|  | 19-24 | Example 1-132 | 160 | 0.55 |
|  | 19-25 | Example 1-133 | 135 | 0.57 |
|  | 19-26 | Example 1-134 | 100 | 0.56 |
| Comparative example | 19-1 | Comparative example 1-8 | 200 | 0.55 |
|  | 19-2 | Comparative example 1-24 | — | — |
|  | 19-3 | Comparative example 1-25 | — | — |
|  | 19-4 | Comparative example 1-26 | 95 | 0.57 |

TABLE 20

|  |  |  | Flame retaradant PET | |
|---|---|---|---|---|
|  |  | Catalyst | Polymerization time (min) | IV (dl/g) |
| Example | 20-1 | Example 1-92 | 80 | 0.62 |
|  | 20-2 | Example 1-100 | 95 | 0.63 |
|  | 20-3 | Example 1-94 | 85 | 0.62 |
|  | 20-4 | Example 1-119 | 110 | 0.65 |
|  | 20-5 | Example 1-101 | 95 | 0.64 |
|  | 20-6 | Example 1-106 | 85 | 0.61 |
|  | 20-7 | Example 1-107 | 85 | 0.61 |
|  | 20-8 | Example 1-97 | 105 | 0.64 |
|  | 20-9 | Example 1-99 | 80 | 0.64 |
|  | 20-10 | Example 1-120 | 115 | 0.63 |
|  | 20-11 | Example 1-121 | 120 | 0.63 |
|  | 20-12 | Example 1-122 | 80 | 0.65 |
|  | 20-13 | Example 1-123 | 115 | 0.63 |
|  | 20-14 | Example 1-124 | 125 | 0.65 |
|  | 20-15 | Example 1-125 | 120 | 0.64 |
|  | 20-16 | Example 1-126 | 125 | 0.63 |
|  | 20-17 | Example 1-127 | 110 | 0.64 |
|  | 20-18 | Example 1-128 | 90 | 0.63 |
|  | 20-19 | Example 1-129 | 115 | 0.65 |
|  | 20-20 | Example 1-130 | 80 | 0.65 |
|  | 20-21 | Example 1-131 | 90 | 0.64 |
|  | 20-22 | Example 1-116 | 100 | 0.63 |
|  | 20-23 | Example 1-108 | 105 | 0.63 |
|  | 20-24 | Example 1-132 | 150 | 0.61 |
|  | 20-25 | Example 1-133 | 130 | 0.62 |
|  | 20-26 | Example 1-134 | 100 | 0.62 |
| Comparative example | 20-1 | Comparative example 1-8 | 195 | 0.62 |
|  | 20-2 | Comparative example 1-24 | — | — |
|  | 20-3 | Comparative example 1-25 | — | — |
|  | 20-4 | Comparative example 1-26 | 95 | 0.63 |

What is claimed is:

1. A method of producing a polyester comprising:
    contacting an acid component and an alcohol component in the presence of a catalyst, the polyester having a glycol component consisting mainly of at least one of ethylene glycol, 1,3-propanediol, 1,4-butanediol, and 1,4-cyclohexane dimethanol, the catalyst comprising at least one metal-containing component having substantially no catalytic activity for a polyester polymerization, selected from the group consisting of metals and metal compounds, wherein said metal-containing component comprises no antimony or germanium; and an organic compound component having substantially no catalytic activity for a polyester polymerization, wherein said organic compound component is at least one compound containing at least one moiety represented by Formula 1:

Ar—O—                    (Formula 1)

wherein Ar represents an aryl group, wherein the aryl group is not a phenyl group ($C_6H_5$), wherein the metal containing component and the organic compound component are added separately, wherein the activity parameter of the catalyst is less than 2 times the activity parameter observed when using antimony trioxide as a catalyst in the polymerization of polyethylene terephthalate, wherein the activity parameter of the catalyst, AP, fulfills the formula

AP<2T wherein AP is the amount of time required for a polymerization using the catalyst conducted at 275° C. under reduced pressure of 0.1 Torr to obtain a polyethylene terephthalate whose intrinsic viscosity is 0.5 dl/g, and wherein T is an AP observed when using antimony trioxide as a catalyst at a level of 0.05 mol % as antimony atom based on an acid component in a resultant polyethylene terephthalate.

2. The method according to claim 1 wherein said metal-containing component is at least one selected from the group consisting of an alkali metal, an alkaline earth metal, and compounds thereof.

3. The method according to claim 2 wherein said alkali metal or alkaline earth metal is at least one selected from the group consisting of Li, Na, K, Rb, Cs, Be, Mg, Ca, Sr and Ba.

4. The method according to claim 1 wherein said metal-containing component is at least one selected from the group consisting of Al, Ga, Tl, Pb, Bi and compounds thereof.

5. The method according to claim 1 wherein said metal-containing component is at least one selected from the group consisting of Tl, Pb, Bi and compounds thereof.

6. The method according to claim 1 wherein said metal-containing component is at least one selected from the group consisting of Cr, Ni, Mo, Tc, Re and compounds thereof.

7. The method according to claim 1 wherein said metal-containing component is at least one selected from the group consisting of Cr, Ni and compounds thereof.

8. The method according to claim 1 wherein said metal-containing component is at least one selected from the group consisting of Sc, Y, Zr, Hf, V and compounds thereof.

9. The method according to claim 1 wherein said metal-containing component is at least one selected from the group consisting of Ru, Rh, Pd, Os, Ir, Pt and compounds thereof.

10. The method according to claim 1 wherein said metal-containing component is at least one selected from the group consisting of Ru, Pd and compounds thereof.

11. The method according to claim 1 wherein said metal-containing component is at least one selected from the group consisting of Cu, Ag, Au, Cd, Hg and compounds thereof.

12. The method according to claim 1 wherein said metal-containing component is at least one selected from the group consisting of lanthanide metals and compounds thereof.

13. The method according to claim 1 wherein said metal-containing component is at least one selected from the group consisting of In and a compound thereof.

14. The method according to claim 1 wherein said metal-containing component is at least one selected from the group consisting of Mn, Co, Zn and compounds thereof.

15. The method according to claim 1 wherein said metal-containing component is at least one selected from the group consisting of Fe, Nb, Ta, W and compounds thereof.

16. The method according to claim 1 wherein said metal-containing component is at least one selected from the group consisting of Fe and a compound thereof.

17. The method according to claim 1 wherein the at least one moiety represented by Formula 1 is at least one moiety represented by Formula 3:

Ar—O—$X^1$              (Formula 3)

wherein Ar represents an aryl group, each of $X^1$, $X^2$ and $X^3$ independently represents hydrogen, a hydrocarbyl group, an acyl group, a sulfonyl-containing group, a phosphoryl-containing group or an ether-group-containing hydrocarbyl group.

18. The method according to claim 17 wherein Ar is selected from the group consisting of moieties represented by Formulae 6 to 12:

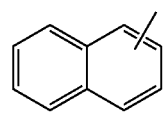

(Formula 6)

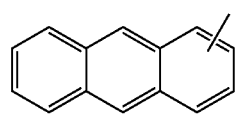

(Formula 7)

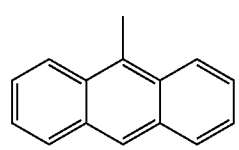

(Formula 8)

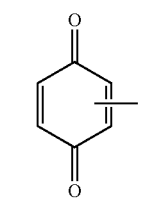

(Formula 9)

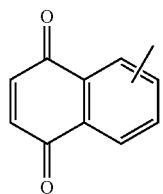

(Formula 10)

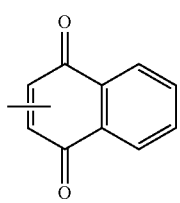

(Formula 11)

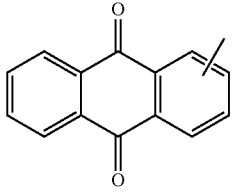

(Formula 12)

19. The method according to claim 17 wherein the compound containing the at least one moiety represented by said Formula 3 is a linear compound of Formula 13 and derivatives thereof:

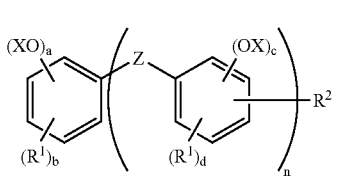

(Formula 13)

wherein each $R^1$ is the same or different and represents a $C_1$-$C_{20}$ hydrocarbyl group, a hydroxyl group- or halogen group-carrying $C_1$-$C_{20}$ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each $R^2$ is the same or different and represents hydrogen, a $C_1$-$C_{20}$ hydrocarbyl group, a hydroxyl group- or halogen group-carrying $C_1$-$C_{20}$ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each X is the same or different and represents hydrogen, a $C_1$-$C_{20}$ hydrocarbyl group, a hydroxyl group- or halogen group-carrying $C_1$-$C_{20}$ hydrocarbyl group, an acyl group, a sulfonyl-containing group, a phosphoryl-containing group or an ether-group-containing hydrocarbyl group, each Z is the same or different and represents a direct bond, a $C_1$-$C_{10}$ alkylene group, (alkylene)-O—, -(alkylene)-S—, —O—, —S—, —SO$_2$—, —CO— or —COO—, n represents an integer of 1 to 100, each of a and c is an integer of 1 to 3, each of b and d is 0 or an integer of 1 to 3, provided that $1 \leq a+b \leq 5$, $1 \leq c+d \leq 4$, and each d is the same or different, and derivatives thereof.

20. The method according to claim 17 wherein the compound containing the at least one moiety represented by said Formula 3 is a branched linear compound represented by Formula 15 and derivatives thereof:

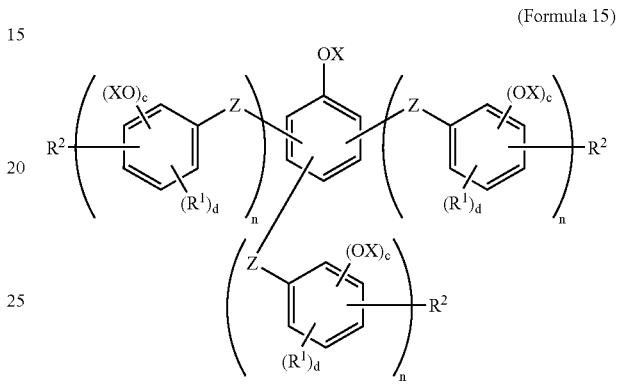

(Formula 15)

wherein each $R^1$ is the same or different and represents a $C_1$-$C_{20}$ hydrocarbyl group, a hydroxyl group- or halogen group-carrying $C_1$-$C_{20}$ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each $R^2$ is the same or different and represents hydrogen, a $C_1$-$C_{20}$ hydrocarbyl group, a hydroxyl group- or halogen group-carrying $C_1$-$C_{20}$ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each X is the same or different and represents hydrogen, a $C_1$-$C_{20}$ hydrocarbyl group, a hydroxyl group- or halogen group-carrying $C_1$-$C_{20}$ hydrocarbyl group, an acyl group, a sulfonyl-containing group, a phosphoryl-containing group or an ether-group-containing hydrocarbyl group, each Z is the same or different and represents a direct bond, a $C_1$-$C_{10}$ alkylene group, -(alkylene)-O—, -(alkylene) S—, —O—, —S—, —SO$_2$—, —CO— or —COO—, each n is the same or different and represents an integer of 1 to 100, each c is the same or different and represents an integer of 1 to 3, each d is the same or different and represents 0 or an integer of 1 to 3, provided that $1 \leq c+d \leq 4$, and derivatives thereof.

21. The method according to claim 17 wherein the compound containing the at least one moiety represented by said Formula 3 is a cyclic compound represented by Formula 17 and derivatives thereof:

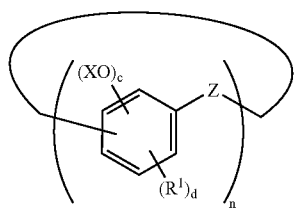

(Formula 17)

wherein each $R^1$ is the same or different and represents a $C_1$-$C_{20}$ hydrocarbyl group, a hydroxyl group- or halogen group-carrying $C_1$-$C_{20}$ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each X is the same or different and represents hydrogen, a $C_1$-$C_{20}$ hydrocarbyl group, a hydroxyl group- or halogen group-carrying $C_1$-$C_{20}$ hydrocarbyl group, an acyl group, a sulfonyl-containing group, a phosphoryl-containing group or an ether-group-containing hydrocarbyl group, each Z is the same or different and represents a direct bond, a $C_1$-$C_{10}$ alkylene group, -(alkylene)-O—, -(alkylene)-S—, —O—, —S—, —$SO_2$—, —CO— or —COO—, n represents an integer of 1 to 100, c represents an integer of 1 to 3, d represents 0 or an integer of 1 to 3, provided that $1 \leqq c+d \leqq 4$, and each d is the same or different, and derivatives thereof.

22. The method according to claim 17 wherein the compound containing the at least one moiety represented by said Formula 3 is a compound selected from the group consisting of a coumarine derivative represented by Formula 19 and a chromone derivative represented by Formula 21:

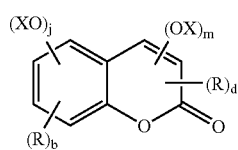

(Formula 19)

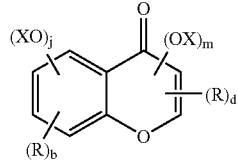

(Formula 21)

wherein each R is the same or different and represents a $C_1$-$C_{20}$ hydrocarbyl group, a hydroxyl group- or halogen group-carrying $C_1$-$C_{20}$ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each X is the same or different and represents hydrogen, a $C_1$-$C_{20}$ hydrocarbyl group, a hydroxyl group- or halogen group-carrying $C_1$-$C_{20}$ hydrocarbyl group, an acyl group, a sulfonyl-containing group, a phosphoryl-containing group or an ether-group-containing hydrocarbyl group, each of j and b is 0 or an integer of 1 to 3, each of m and d is 0 or an integer of 1 to 2, provided that $0 \leqq j+b \leqq 4$, $0 \leqq m+d \leqq 2$ and $1 \leqq j+m \leqq 5$, and derivatives thereof.

23. The method according to claim 17 wherein the compound containing the at least one moiety represented by said Formula 3 is a compound selected from the group consisting of a dihydrocoumarine derivative represented by Formula 23, a chromanone derivative represented by Formula 25, and an isochromanone derivative represented by Formula 27:

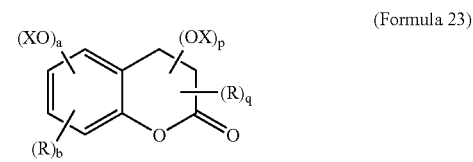

(Formula 23)

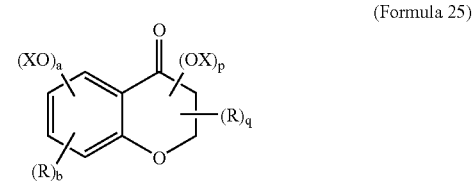

(Formula 25)

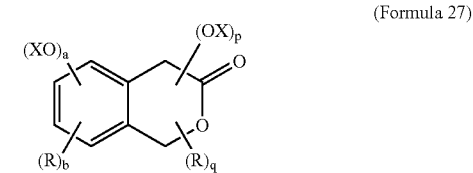

(Formula 27)

wherein each R is the same or different and represents a $C_1$-$C_{20}$ hydrocarbyl group, a hydroxyl group- or halogen group-carrying $C_1$-$C_{20}$ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each X is the same or different and represents hydrogen, a $C_1$-$C_{20}$ hydrocarbyl group, a hydroxyl group- or halogen group-carrying $C_1$-$C_{20}$ hydrocarbyl group, an acyl group, a sulfonyl-containing group, a phosphoryl-containing group or an ether-group-containing hydrocarbyl group, a is an integer of 1 to 3, b is 0 or an integer of 1 to 3, and each of p and q is 0 or an integer of 1 to 2, provided that $1 \leqq a+b \leqq 4$ and $0 \leqq p+q \leqq 2$, and derivatives thereof.

24. The method according to claim 17 wherein the compound containing the at least one moiety represented by said Formula 3 is a compound selected from the group consisting of a chroman derivative represented by Formula 29 and an isochroman derivative represented by Formula 31:

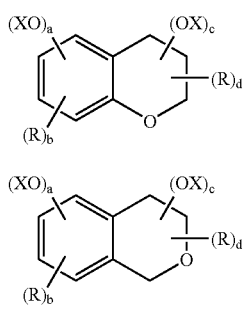

(Formula 29)

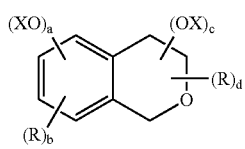

(Formula 31)

wherein each R is the same or different and represents a $C_1$-$C_{20}$ hydrocarbyl group, a hydroxyl group- or halogen group-carrying $C_1$-$C_{20}$ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each X is the same or different and represents hydrogen, a $C_1$-$C_{20}$ hydrocarbyl group, a hydroxyl group- or halogen group-carrying $C_1$-$C_{20}$ hydrocarbyl group, an acyl group, a sulfonyl-containing group, a phosphoryl-containing group or an ether-group-containing hydrocarbyl group, a is an integer of 1 to 3, b is 0 or an integer of 1 to 3, each of c and d is 0 or an integer of 1 to 3, provided that $1 \leq a+b \leq 4$ and $0 \leq c+d \leq 3$, and derivatives thereof.

25. The method according to claim 17 wherein the compound containing the at least one moiety represented by said Formula 3 is a compound selected from the group consisting of a naphthalene derivative represented by Formula 33 and a bisnaphthyl derivative represented by Formula 35:

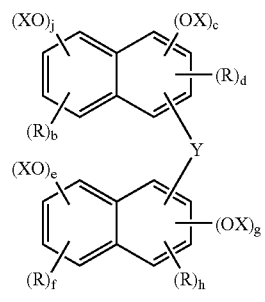

(Formula 35)

wherein each R is the same or different and represents a $C_1$-$C_{20}$ hydrocarbyl group, a hydroxyl group- or halogen group-carrying $C_1$-$C_{20}$ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each X is the same or different and represents hydrogen, a $C_1$-$C_{20}$ hydrocarbyl group, a hydroxyl group- or halogen group-carrying $C_1$-$C_{20}$ hydrocarbyl group, an acyl group, a sulfonyl-containing group, a phosphoryl-containing group or an ether-group-containing hydrocarbyl group, Z represents a direct bond, a $C_1$-$C_{10}$ alkylene group, -(alkylene)-O—, -(alkylene)-S—, —O—, —S—, —SO$_2$—, —CO— or —COO—, each of j, b, c, d, e, f, g and h is 0 or an integer of 1 to 3, provided that $0 \leq j+b \leq 4$, $0 \leq c+d \leq 3$, $0 \leq e+f \leq 4$, $0 \leq g+h \leq 3$ and $1 \leq j+c+e+g \leq 12$, and derivatives thereof.

26. The method according to claim 17 wherein the compound containing the at least one moiety represented by said Formula 3 is an anthracene derivative represented by Formula 37:

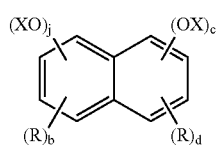

(Formula 33)

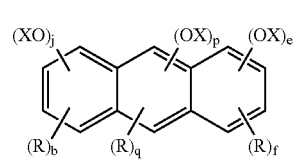

(Formula 37)

wherein each R is the same or different and represents a $C_1$-$C_{20}$ hydrocarbyl group, a hydroxyl group- or halogen group-carrying $C_1$-$C_{20}$ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each X is the same or different and represents hydrogen, a $C_1$-$C_{20}$ hydrocarbyl group, a hydroxyl group- or halogen group-carrying $C_1$-$C_{20}$ hydrocarbyl group, an acyl group, a sulfonyl-containing group, a phosphoryl-containing group or an ether-group-containing hydrocarbyl group, each of j, b, c and d is 0 or an integer of 1 to 3, provided that $0 \leq j+b \leq 4$, $0 \leq c+d \leq 4$ and $1 \leq j+c \leq 6$, wherein each R is the same or different and represents a $C_1$-$C_{20}$ hydrocarbyl group, a hydroxyl group- or halogen group-carrying $C_1$-$C_{20}$ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each X is the same or different and represents hydrogen, a $C_1$-$C_{20}$ hydrocarbyl group, a hydroxyl group- or halogen group-carrying $C_1$-$C_{20}$ hydrocarbyl group, an acyl group, a sulfonyl-containing group, a phosphoryl-containing group or an ether-group-containing hydrocarbyl group, each of j, b, e and f is 0 or an integer of 1 to 3, each of p and q is 0 or an integer of 1 to 2, provided that $0 \leq j+b \leq 4$, $0 \leq p+q \leq 2$, $0 \leq e+f \leq 4$ and $1 \leq j+p+e \leq 8$.

27. The method according to claim 17 wherein the compound containing the at least one moiety represented by said Formula 3 is a benzoquinone derivative represented by Formula 39:

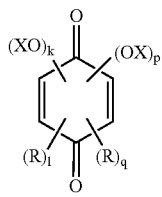

(Formula 39)

wherein each R is the same or different and represents a $C_1$-$C_{20}$ hydrocarbyl group, a hydroxyl group- or halogen group-carrying $C_1$-$C_{20}$ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each X is the same or different and represents hydrogen, a $C_1$-$C_{20}$ hydrocarbyl group, a hydroxyl group- or halogen group-carrying $C_1$-$C_{20}$ hydrocarbyl group, an acyl group, a sulfonyl-containing group, a phosphoryl-containing group or an ether-group-containing hydrocarbyl group, each of k, l, p and q is 0 or an integer of 1 to 2, provided that $0 \leq k+l \leq 2$, $0 \leq p+q \leq 2$ and $1 \leq k+p \leq 4$.

28. The method according to claim 17 wherein the compound containing the at least one moiety represented by said Formula 3 a naphthoquinone derivative represented by Formula 41:

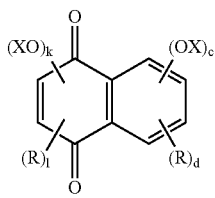

(Formula 41)

wherein each R is the same or different and represents a $C_1$-$C_{20}$ hydrocarbyl group, a hydroxyl group- or halogen group-carrying $C_1$-$C_{20}$ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each X is the same or different and represents hydrogen, a $C_1$-$C_{20}$ hydrocarbyl group, a hydroxyl group- or halogen group-carrying $C_1$-$C_{20}$ hydrocarbyl group, an acyl group, a sulfonyl-containing group, a phosphoryl-containing group or an ether-group-containing hydrocarbyl group, each of k and l is 0 or an integer of 1 to 2, each of c and d is 0 or an integer of 1 to 3, provided that $0 \leq k+l \leq 2$, $0 \leq c+d \leq 4$ and $1 \leq k+c \leq 5$.

29. The method according to claim 17 wherein the compound containing the at least one moiety represented by said Formula 3 is an anthraquinone derivative represented by Formula 43:

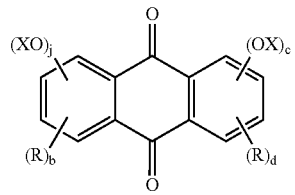

(Formula 43)

wherein each R is the same or different and represents a $C_1$-$C_{20}$ hydrocarbyl group, a hydroxyl group- or halogen group-carrying $C_1$-$C_{20}$ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each X is the same or different and represents hydrogen, a $C_1$-$C_{20}$ hydrocarbyl group, a hydroxyl group- or halogen group-carrying $C_1$-$C_{20}$ hydrocarbyl group, an acyl group, a sulfonyl-containing group, a phosphoryl-containing group or an ether-group-containing hydrocarbyl group, each of j, b, c and d is 0 or an integer of 1 to 3, provided that $0 \leq j+b \leq 4$, $0 \leq c+d \leq 4$ and $1 \leq j+c \leq 6$.

30. The method according to claim 17 wherein the compound containing the at least one moiety represented by said Formula 3 is 2,2'-bisphenol represented by Formula 45:

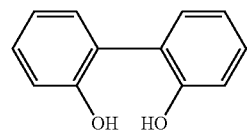

(Formula 45)

and derivatives thereof.

31. The method according to claim 17 wherein the compound containing the at least one moiety represented by said Formula 3 is a compound selected from the group consisting of 2,2'-dihydroxydiphenylether represented by Formula 47, 2,2'-thiobis(4-t-octylphenol) represented by Formula 48 and 2,2'-methylenebis(6-t-butyl-p-cresol) represented by Formula 49:

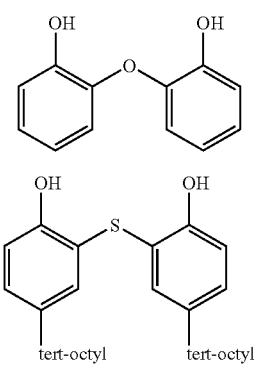

(Formula 47)

(Formula 48)

-continued (Formula 49)

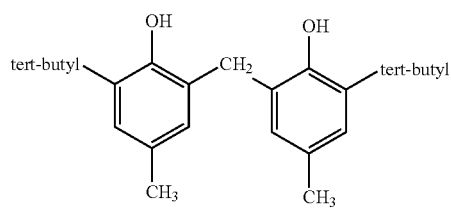

and derivatives thereof.

32. The method according to claim 17 wherein the compound containing the at least one moiety represented by said Formula 3 is a compound selected from the group consisting of a methylene-bridged linear phenol compound represented by Formula 50 (mixture of dimer to 100-mer) and a methylene-bridged linear p-t-butylphenol compound represented by Formula 51 (mixture of dimer to 100-mer):

(Formula 50)

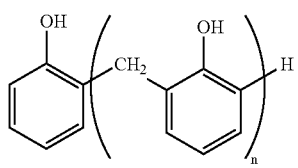

wherein n is an integer of 1 to 99, (Formula 51)

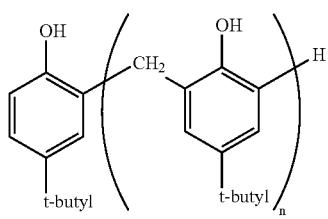

wherein n is an integer of 1 to 99, and derivatives thereof.

33. The method according to claim 17 wherein the compound containing the at least one moiety represented by said Formula 3 is a compound selected from the group consisting of Calix [4] arene represented by Formula 52, Calix [6] arene represented by Formula 53, Calix [8] arene represented by Formula 54, p-t-butyl Calix [4] arene represented by Formula 55, p-t-butyl Calix [6] arene represented by Formula 56 and p-t-butyl Calix [8] arene represented by Formula 57:

(Formula 52)

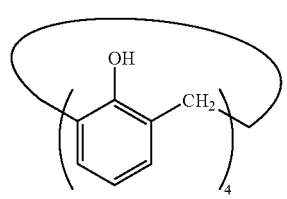

-continued (Formula 53)

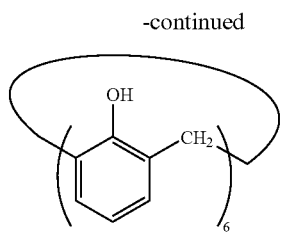

(Formula 54)

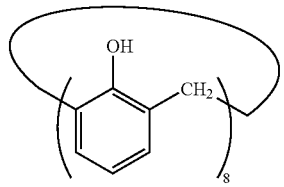

(Formula 55)

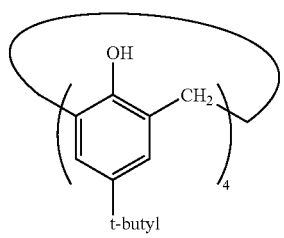

(Formula 56)

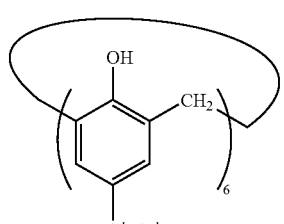

(Formula 57)

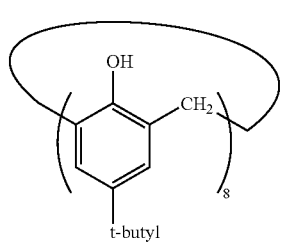

and derivatives thereof.

34. The method according to claim 17 wherein the compound containing the at least one moiety represented by said Formula 3 is esculetin represented by Formula 58:

(Formula 58)

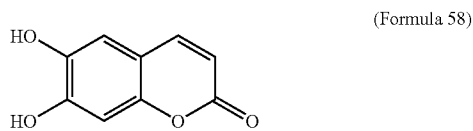

and derivatives thereof.

35. The method according to claim 17 wherein the compound containing the at least one moiety represented by said Formula 3 is a compound selected from the group consisting of chrysin represented by Formula 60 and morin represented by Formula 61:

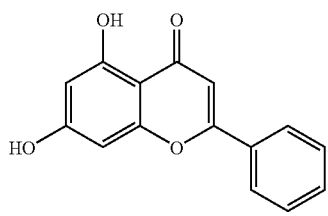
(Formula 60)

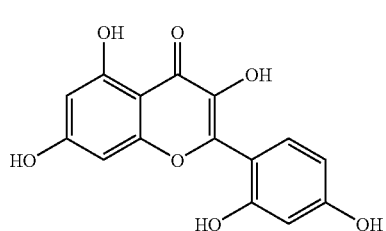
(Formula 61)

and derivatives thereof.

36. The method according to claim 17 wherein the compound containing the at least one moiety represented by said Formula 3 is a compound selected from the group consisting of epicatechin represented by Formula 63 and epigallocatechin gallate represented by Formula 64:

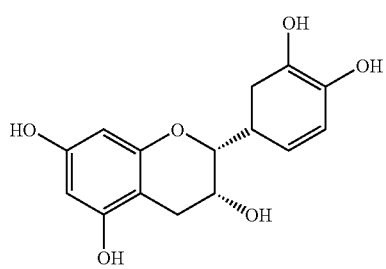
(Formula 63)

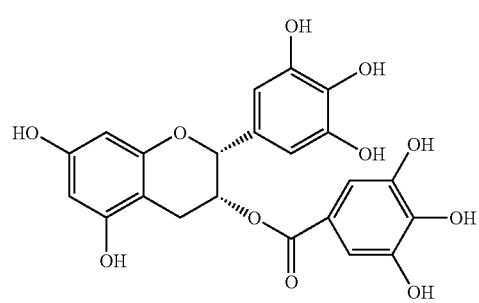
(Formula 64)

and derivatives thereof.

37. The method according to claim 17 wherein the compound containing the at least one moiety represented by said Formula 3 is a compound selected from the group consisting of disodium 4,5-dihydroxynaphthalene-2,7-disulfonate represented by Formula 65, naphthol AS represented by Formula 67, and 1,1'-bi-2-naphthol represented by Formula 68:

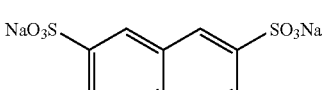
(Formula 65)

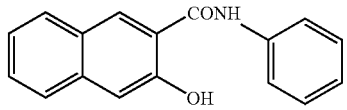
(Formula 67)

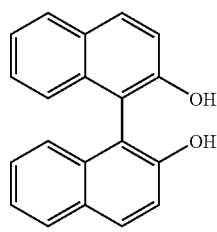
(Formula 68)

and derivatives thereof.

38. The method according to claim 17 wherein the compound containing the at least one moiety represented by said Formula 3 is a compound selected from the group consisting of anthrarobin represented by Formula 70 and 9,10-dimethoxyanthracene represented by Formula 71:

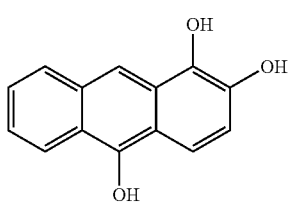
(Formula 70)

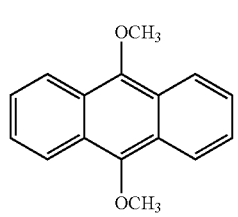
(Formula 71)

and derivatives thereof.

39. The method according to claim 17 wherein the compound containing the at least one moiety represented by said Formula 3 is 2,5-dihydroxybenzoquinone represented by Formula 73:

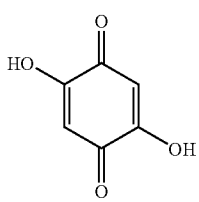
(Formula 73)

and derivatives thereof.

40. The method according to claim 17 wherein the compound containing the at least one moiety represented by said Formula 3 is 5,8-dihydroxy-1,4-naphthoquinone represented by Formula 74:

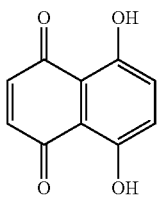
(Formula 74)

and derivatives thereof.

41. The method according to claim 17 wherein the compound containing the at least one moiety represented by said Formula 3 is a compound selected from the group consisting of quinalizarin represented by Formula 76, alizarin represented by Formula 77, quinizarin represented by Formula 78, anthrarufin represented by Formula 79, emodine represented by Formula 80, and 1,8-diamino-4,5-dihydroxyanthraquinone represented by Formula 82:

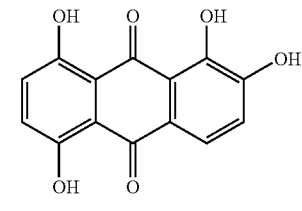
(Formula 76)

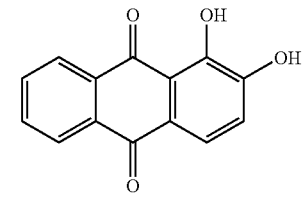
(Formula 77)

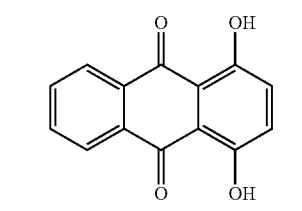
(Formula 78)

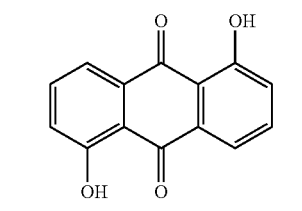
(Formula 79)

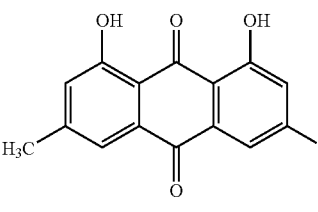
(Formula 80)

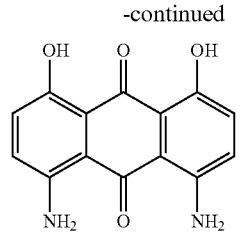
(Formula 82)

and derivatives thereof.

42. A method of producing a polyester comprising:
contacting an acid component and an alcohol component in the presence of a catalyst,
the polyester having a glycol component consisting mainly of at least one of ethylene glycol, 1,3-propanediol, 1,4-butanediol, and 1,4-cyclohexane dimethanol,
the catalyst comprising
at least one metal-containing component having substantially no catalytic activity for a polyester polymerization, selected from the group consisting of metals and metal compounds, wherein said metal-containing component comprises no antimony or germanium; and
an organic compound component having substantially no catalytic activity for a polyester polymerization, wherein said organic compound component is at least one compound containing at least one moiety represented by Formula 2:

Ar—N<     (Formula 2)

wherein Ar represents an aryl group wherein the aryl group is not a phenyl group ($C_6H_5$),
wherein the metal containing component and the organic compound component are added separately and wherein said metal-containing component is at least one selected from the group consisting of Cr, Ni, Mo, Tc, Re and compounds thereof.

43. A method of producing a polyester comprising:
contacting an acid component and an alcohol component in the presence of a catalyst,
the polyester having a glycol component consisting mainly of at least one of ethylene glycol, 1,3-propanediol, 1,4-butanediol, and 1,4-cyclohexane dimethanol,
the catalyst comprising
at least one metal-containing component having substantially no catalytic activity for a polyester polymerization, selected from the group consisting of metals and metal compounds, wherein said metal-containing component comprises no antimony or germanium; and
an organic compound component having substantially no catalytic activity for a polyester polymerization, wherein said organic compound component is at least one compound containing at least one moiety represented by Formula 2:

Ar—N<     (Formula 2)

wherein Ar represents an aryl group wherein the aryl group is not a phenyl group ($C_6H_5$),
wherein the metal containing component and the organic compound component are added separately and wherein said metal-containing component is at least one selected from the group consisting of Cr, Ni and compounds thereof.

44. A method of producing a polyester comprising:
contacting an acid component and an alcohol component in the presence of a catalyst,
the polyester having a glycol component consisting mainly of at least one of ethylene glycol, 1,3-propanediol, 1,4-butanediol, and 1,4-cyclohexane dimethanol,
the catalyst comprising
at least one metal-containing component having substantially no catalytic activity for a polyester polymerization, selected from the group consisting of metals and metal compounds, wherein said metal-containing component comprises no antimony or germanium; and
an organic compound component having substantially no catalytic activity for a polyester polymerization, wherein said organic compound component is at least one compound containing at least one moiety represented by Formula 2:

Ar—N< (Formula 2)

wherein Ar represents an aryl group wherein the aryl group is not a phenyl group ($C_6H_5$),
wherein the metal containing component and the organic compound component are added separately and wherein said metal-containing component is at least one selected from the group consisting of Sc, Y, Zr, Hf, V and compounds thereof.

45. A method of producing a polyester comprising:
contacting an acid component and an alcohol component in the presence of a catalyst,
the polyester having a glycol component consisting mainly of at least one of ethylene glycol, 1,3-propanediol, 1,4-butanediol, and 1,4-cyclohexane dimethanol,
the catalyst comprising
at least one metal-containing component having substantially no catalytic activity for a polyester polymerization, selected from the group consisting of metals and metal compounds, wherein said metal-containing component comprises no antimony or germanium; and
an organic compound component having substantially no catalytic activity for a polyester polymerization, wherein said organic compound component is at least one compound containing at least one moiety represented by Formula 2:

Ar—N< (Formula 2)

wherein Ar represents an aryl group wherein the aryl group is not a phenyl group ($C_6H_5$),
wherein the metal containing component and the organic compound component are added separately and wherein said metal-containing component is at least one selected from the group consisting of Ru, Rh, Pd, Os, Ir, Pt and compounds thereof.

46. A method of producing a polyester comprising:
contacting an acid component and an alcohol component in the presence of a catalyst,
the polyester having a glycol component consisting mainly of at least one of ethylene glycol, 1,3-propanediol, 1,4-butanediol, and 1,4-cyclohexane dimethanol,
the catalyst comprising at least one metal-containing component having substantially no catalytic activity for a polyester polymerization, selected from the group consisting of metals and metal compounds, wherein said metal-containing component comprises no antimony or germanium; and
an organic compound component having substantially no catalytic activity for a polyester polymerization, wherein said organic compound component is at least one compound containing at least one moiety represented by Formula 2:

Ar—N< (Formula 2)

wherein Ar represents an aryl group wherein the aryl group is not a phenyl group ($C_6H_5$),
wherein the metal containing component and the organic compound component are added separately and wherein said metal-containing component is at least one selected from the group consisting of Ru, Pd and compounds thereof.

47. A method of producing a polyester comprising:
contacting an acid component and an alcohol component in the presence of a catalyst,
the polyester having a glycol component consisting mainly of at least one of ethylene glycol, 1,3-propanediol, 1,4-butanediol and 1,4-cyclohexane dimethanol,
the catalyst comprising
at least one metal-containing component having substantially no catalytic activity for a polyester polymerization, selected from the group consisting of metals and metal compounds, wherein said metal-containing component comprises no antimony or germanium; and
an organic compound component having substantially no catalytic activity for a polyester polymerization, wherein said organic compound component is at least one compound containing at least one moiety represented by Formula 2:

Ar—N< (Formula 2)

wherein Ar represents an aryl group wherein the aryl group is not a phenyl group ($C_6H_5$),
wherein the metal containing component and the organic compound component are added separately and wherein said metal-containing component is at least one selected from the group consisting of Cu, Ag, Au, Cd, Hg and compounds thereof.

48. A method of producing a polyester comprising:
contacting an acid component and an alcohol component in the presence of a catalyst,
the polyester having a glycol component consisting mainly of at least one of ethylene glycol, 1,3-propanediol, 1,4-butanediol, and 1,4-cyclohexane dimethanol,
the catalyst comprising
at least one metal-containing component having substantially no catalytic activity for a polyester polymerization, selected from the group consisting of metals and metal compounds, wherein said metal-containing component comprises no antimony or germanium, and
an organic compound component having substantially no catalytic activity for a polyester polymerization, wherein said organic compound component is at least one compound containing at least one moiety represented by Formula 2:

Ar—N< (Formula 2)

wherein Ar represents an aryl group wherein the aryl group is not a phenyl group ($C_6H_5$), wherein the metal containing component and the organic compound component are added separately and wherein said metal-containing component is at least one selected from the group consisting of lanthanide metals and compounds thereof.

49. A method of producing a polyester comprising:

contacting an acid component and an alcohol component in the presence of a catalyst, the polyester having a glycol component consisting mainly of at least one of ethylene glycol, 1,3-propanediol, 1,4-butanediol, and 1,4-cyclohexane dimethanol, the catalyst comprising at least one metal-containing component having substantially no catalytic activity for a polyester polymerization, selected from the group consisting of metals and metal compounds, wherein said metal-containing component comprises no antimony or germanium; and an organic compound component having substantially no catalytic activity for a polyester polymerization, wherein said organic compound component is at least one compound containing at least one moiety represented by Formula 2:

Ar—N< (Formula 2)

wherein Ar represents an aryl group wherein the aryl group is not a phenyl group ($C_6H_5$), wherein the metal containing component and the organic compound component are added separately and wherein said metal-containing component is at least one selected from the group consisting of In and a compound thereof.

50. A method of producing a polyester comprising:

contacting an acid component and an alcohol component in the presence of a catalyst, the polyester having a glycol component consisting mainly of at least one of ethylene glycol, 1,3-propanediol, 1,4-butanediol, and 1,4-cyclohexane dimethanol, the catalyst comprising at least one metal-containing component having substantially no catalytic activity for a polyester polymerization, selected from the group consisting of metals and metal compounds, wherein said metal-containing component comprises no antimony or germanium; and an organic compound component having substantially no catalytic activity for a polyester polymerization, wherein said organic compound component is at least one compound containing at least one moiety represented by Formula 2:

Ar—N< (Formula 2)

wherein Ar represents an aryl group wherein the aryl group is not a phenyl group ($C_6H_5$), wherein the metal containing component and the organic compound component are added separately and wherein said metal-containing component is at least one selected from the group consisting of Mn, Co, Zn and compounds thereof.

51. A method of producing a polyester comprising:

contacting an acid component and an alcohol component in the presence of a catalyst, the polyester having a glycol component consisting mainly of at least one of ethylene glycol, 1,3-propanediol, 1,4-butanediol, and 1,4-cyclohexane dimethanol, the catalyst comprising at least one metal-containing component having substantially no catalytic activity for a polyester polymerization, selected from the group consisting of metals and metal compounds, wherein said metal-containing component comprises no antimony or germanium; and an organic compound component having substantially no catalytic activity for a polyester polymerization, wherein said organic compound component is at least one compound containing at least one moiety represented by Formula 2:

Ar—N< (Formula 2)

wherein Ar represents an aryl group wherein the aryl group is not a phenyl group ($C_6H_5$), wherein the metal containing component and the organic compound component are added separately and wherein said metal-containing component is at least one selected from the group consisting of Fe, Nb, Ta, W and compounds thereof.

52. A method of producing a polyester comprising:

contacting an acid component and an alcohol component in the presence of a catalyst, the polyester having a glycol component consisting mainly of at least one of ethylene glycol, 1,3-propanediol, 1,4-butanediol, and 1,4-cyclohexane dimethanol, the catalyst comprising at least one metal-containing component having substantially no catalytic activity for a polyester polymerization, selected from the group consisting of metals and metal compounds, wherein said metal-containing component comprises no antimony or germanium; and an organic compound component having substantially no catalytic activity for a polyester polymerization, wherein said organic compound component is at least one compound containing at least one moiety represented by Formula 2:

Ar—N< (Formula 2)

wherein Ar represents an aryl group wherein the aryl group is not a phenyl group ($C_6H_5$), wherein the metal containing component and the organic compound component are added separately and wherein said metal-containing component is at least one selected from the group consisting of Fe and a compound thereof.

53. A method of producing a polyester comprising:

contacting an acid component and an alcohol component in the presence of a catalyst, the polyester having a glycol component consisting mainly of at least one of ethylene glycol, 1,3-propanediol, 1,4-butanediol, and 1,4-cyclohexane dimethanol, the catalyst comprising at least one metal-containing component having substantially no catalytic activity for a polyester polymerization, selected from the group consisting of metals and metal compounds, wherein said metal-containing component comprises no antimony or germanium; and an organic compound component having substantially no catalytic activity for a polyester polymerization, wherein said organic compound component is at least one compound containing at least one moiety represented by Formula 4:

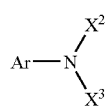

(Formula 4)

wherein Ar represents an aryl group, each of $X^2$ and $X^3$ independently represents hydrogen, a hydrocarbyl group, an acyl group wherein the aryl group is not a phenyl group ($C_6H_5$), a sulfonyl-containing group, a phosphoryl-containing group or an ether-group-containing hydrocarbyl group;

wherein the metal containing component and the organic compound component are added separately, and wherein Ar is selected from the group consisting of moieties represented by Formulae 5 to 12:

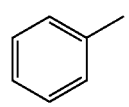

(Formula 5)

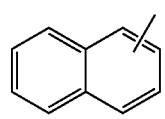

(Formula 6)

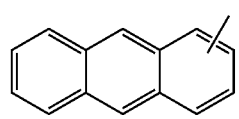

(Formula 7)

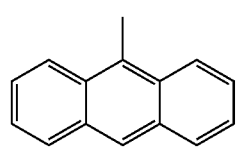

(Formula 8)

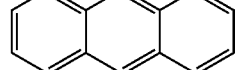

(Formula 9)

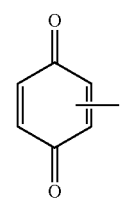

-continued

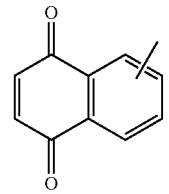

(Formula 10)

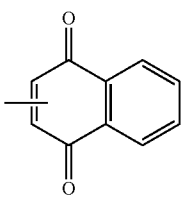

(Formula 11)

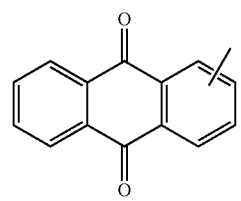

(Formula 12)

54. A method of producing a polyester comprising:

contacting an acid component and an alcohol component in the presence of a catalyst, the polyester having a glycol component consisting mainly of at least one of ethylene glycol, 1,3-propanediol, 14-butanediol, and 1,4-cyclohexane dimethanol, the catalyst comprising at least one metal-containing component having substantially no catalytic activity for a polyester polymerization, selected from the group consisting of metals and metal compounds, wherein said metal-containing component comprises no antimony or germanium; and an organic compound component having substantially no catalytic activity for a polyester polymerization, wherein said organic compound component is at least one compound containing at least one moiety represented by Formula 4:

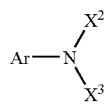

(Formula 4)

wherein Ar represents an aryl group, each of $X^2$ and $X^3$ independently represents hydrogen, a hydrocarbyl group, an acyl group, a sulfonyl-containing group, a phosphoryl-containing group or an ether-group-containing hydrocarbyl group;

wherein the metal containing component and the organic compound component are added separately, and wherein the compound containing the at least one moiety represented by said Formula 4 is a linear compound of Formula 14 and derivatives thereof:

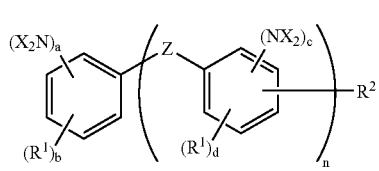

(Formula 14)

wherein each $R^1$ is the same or different and represents a $C_1$-$C_{20}$ hydrocarbyl group, a hydroxyl group- or halogen group-carrying $C_1$-$C_{20}$ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each $R^2$ is the same or different and represents hydrogen, a $C_1$-$C_{20}$ hydrocarbyl group, a hydroxyl group- or halogen group-carrying $C_1$-$C_{20}$ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each X is the same or different and represents hydrogen, a $C_1$-$C_{20}$ hydrocarbyl group, a hydroxyl group- or halogen group-carrying $C_1$-$C_{20}$ hydrocarbyl group, an acyl group, a sulfonyl-containing group, a phosphoryl-containing group or an ether-group-containing hydrocarbyl group, each Z is the same or different and represents a direct bond, a $C_1$-$C_{10}$ alkylene group, -(alkylene)-O—, -(alkylene)-S—, —O—, —S—, —$SO_2$—, —CO— or —COO—, n represents an integer of 1 to 100, each of a and c is an integer of 1 to 3, each of b and d is 0 or an integer of 1 to 3, provided that $1 \leq a+b \leq 5$, $1 \leq c+d \leq 4$, and each d is the same or different, and derivatives thereof.

55. A method of producing a polyester comprising:
contacting an acid component and an alcohol component in the presence of a catalyst,
the polyester having a glycol component consisting mainly of at least one of ethylene glycol, 1,3-propanediol, 1,4-butanediol, and 1,4-cyclohexane dimethanol,
the catalyst comprising
at least one metal-containing component having substantially no catalytic activity for a polyester polymerization, selected from the group consisting of metals and metal compounds, wherein said metal-containing component comprises no antimony or germanium; and
an organic compound component having substantially no catalytic activity for a polyester polymerization,
wherein said organic compound component is at least one compound containing at least one moiety represented by Formula 4:

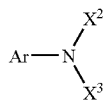

(Formula 4)

wherein Ar represents an aryl group, each of $X^2$ and $X^3$ independently represents hydrogen, a hydrocarbyl group, an acyl group, a sulfonyl-containing group, a phosphoryl-containing group or an ether-group-containing hydrocarbyl group;
wherein the metal containing component and the organic compound component are added separately, and
wherein the compound containing the at least one moiety represented by said Formula 4 is a branched linear compound represented by Formula 16 and derivatives thereof:

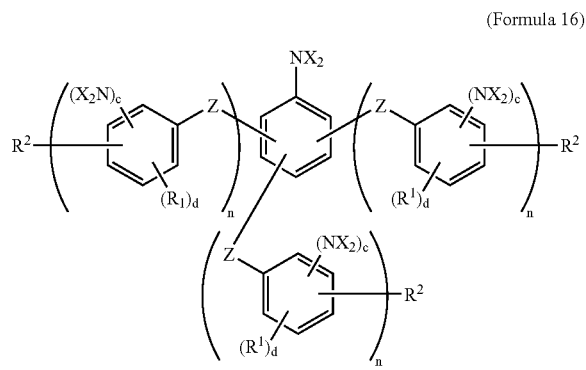

(Formula 16)

wherein each $R^1$ is the same or different and represents a $C_1$-$C_{20}$ hydrocarbyl group, a hydroxyl group- or halogen group-carrying $C_1$-$C_{20}$ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each $R^2$ is the same or different and represents hydrogen, a $C_1$-$C_{20}$ hydrocarbyl group, a hydroxyl group- or halogen group-carrying $C_1$-$C_{20}$ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each X is the same or different and represents hydrogen, a $C_1$-$C_{20}$ hydrocarbyl group, a hydroxyl group- or halogen group-carrying $C_1$-$C_{20}$ hydrocarbyl group, an acyl group, a sulfonyl-containing group, a phosphoryl-containing group or an ether-group-containing hydrocarbyl group, each Z is the same or different and represents a direct bond, a $C_1$-$C_{10}$ alkylene group, -(alkylene)-O—, -(alkylene) S—, —O—, —S—, —$SO_2$—, —CO— or —COO—, each n is the same or different and represents an integer of 1 to 100, each c is the same or different and represents an integer of 1 to 3, each d is the same or different and represents 0 or an integer of 1 to 3, provided that $1 \leq c+d \leq 4$, and derivatives thereof.

56. A method of producing a polyester comprising:

contacting an acid component and an alcohol component in the presence of a catalyst, the polyester having a glycol component consisting mainly of at least one of ethylene glycol, 1,3-propanediol, 1,4-butanediol, and 1,4-cyclohexane dimethanol, the catalyst comprising at least one metal-containing component having substantially no catalytic activity for a polyester polymerization, selected from the group consisting of metals and metal compounds, wherein said metal-containing component comprises no antimony or germanium; and an organic compound component having substantially no catalytic activity for a polyester polymerization, wherein said organic compound component is at least one compound containing at least one moiety represented by Formula 4:

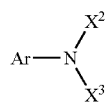

(Formula 4)

wherein Ar represents an aryl group, each of $X^2$ and $X^3$ independently represents hydrogen, a hydrocarbyl group, an acyl group, a sulfonyl-containing group, a phosphoryl-containing group or an ether-group-containing hydrocarbyl group;

wherein the metal containing component and the organic compound component are added separately, and wherein the compound containing the at least one moiety represented by said Formula 4 is a cyclic compound represented by Formula 18 and derivatives thereof:

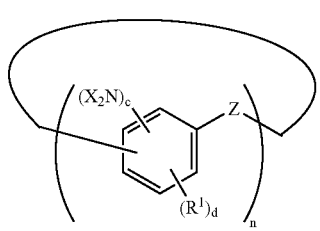

(Formula 18)

wherein each $R^1$ is the same or different and represents a $C_1$-$C_{20}$ hydrocarbyl group, a hydroxyl group- or halogen group-carrying $C_1$-$C_{20}$ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each X is the same or different and represents hydrogen, a $C_1$-$C_{20}$ hydrocarbyl group, a hydroxyl group- or halogen group-carrying $C_1$-$C_{20}$ hydrocarbyl group, an acyl group, a sulfonyl-containing group, a phosphoryl-containing group or an ether-group-containing hydrocarbyl group, each Z is the same or different and represents a direct bond, a $C_1$-$C_{10}$ alkylene group, -(alkylene)-O—, -(alkylene)-S—, —O—, —S—, —SO$_2$—, —CO— or —COO—, n represents an integer of 1 to 100, c represents an integer of 1 to 3, d represents 0 or an integer of 1 to 3, provided that $1 \leq c+d \leq 4$, and each d is the same or different, and derivatives thereof.

57. A method of producing a polyester comprising:

contacting an acid component and an alcohol component in the presence of a catalyst, the polyester having a glycol component consisting mainly of at least one of ethylene glycol, 1,3-propanediol, 1,4-butanediol, and 1,4-cyclohexane dimethanol, the catalyst comprising at least one metal-containing component having substantially no catalytic activity for a polyester polymerization, selected from the group consisting of metals and metal compounds, wherein said metal-containing component comprises no antimony or germanium; and an organic compound component having substantially no catalytic activity for a polyester polymerization, wherein said organic compound component is at least one compound containing at least one moiety represented by Formula 4:

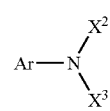

(Formula 4)

wherein Ar represents an aryl group, each of $X^2$ and $X^3$ independently represents hydrogen, a hydrocarbyl group, an acyl group, a sulfonyl-containing group, a phosphoryl-containing group or an ether-group-containing hydrocarbyl group;

wherein the metal containing component and the organic compound component are added separately, and wherein the compound containing the at least one moiety represented by said Formula 4 is a compound selected from the group consisting of a coumarine derivative represented by Formula 20 and a chromone derivative represented by Formula 22:

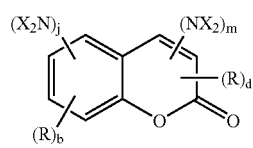

(Formula 20)

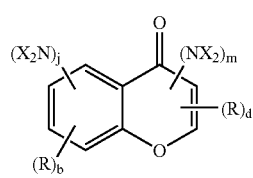

(Formula 22)

wherein each R is the same or different and represents a $C_1$-$C_{20}$ hydrocarbyl group, a hydroxyl group- or halogen group-carrying $C_1$-$C_{20}$ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each X is the same or different and represents hydrogen, a $C_1$-$C_{20}$ hydrocarbyl group, a hydroxyl group- or halogen group-carrying $C_1$-$C_{20}$ hydrocarbyl group, an acyl group, a sulfonyl-containing group, a phosphoryl-containing group or an ether-group-containing hydrocarbyl group, each of j and b is 0 or an integer of 1 to 3, each of m and d is 0 or an integer of 1 to 2, provided that $0\leqq j+b \leqq 4$, $0\leqq m+d \leqq 2$ and $1\leqq j+m \leqq 5$, and derivatives thereof.

58. A method of producing a polyester comprising:
contacting an acid component and an alcohol component in the presence of a catalyst,
the polyester having a glycol component consisting mainly of at least one of ethylene glycol, 1,3-propanediol, 1,4-butanediol, and 1,4-cyclohexane dimethanol,
the catalyst comprising
at least one metal-containing component having substantially no catalytic activity for a polyester polymerization, selected from the group consisting of metals and metal compounds, wherein said metal-containing component comprises no antimony or germanium; and
an organic compound component having substantially no catalytic activity for a polyester polymerization,
wherein said organic compound component is at least one compound containing at least one moiety represented by Formula 4:

(Formula 4)

wherein Ar represents an aryl group, each of $X^2$ and $X^3$ independently represents hydrogen, a hydrocarbyl group, an acyl group, a sulfonyl-containing group, a phosphoryl-containing group or an ether-group-containing hydrocarbyl group;
wherein the metal containing component and the organic compound component are added separately, and
wherein the compound containing the at least one moiety represented by said Formula 4 is a compound selected from the group consisting of a dihydrocoumarine derivative represented by Formula 24, a chromanone derivative represented by Formula 26, and an isochromanone derivative represented by Formula 28:

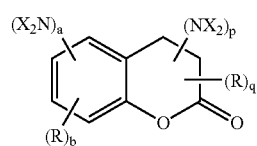
Formula 24)

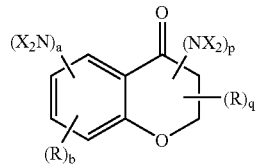
(Formula 26)

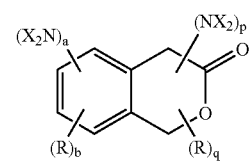
(Formula 28)

wherein each R is the same or different and represents a $C_1$-$C_{20}$ hydrocarbyl group, a hydroxyl group- or halogen group-carrying $C_1$-$C_{20}$ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each X is the same or different and represents hydrogen, a $C_1$-$C_{20}$ hydrocarbyl group, a hydroxyl group- or halogen group-carrying $C_1$-$C_{20}$ hydrocarbyl group, an acyl group, a sulfonyl-containing group, a phosphoryl-containing group or an ether-group-containing hydrocarbyl group, a is an integer of 1 to 3, b is 0 or an integer of 1 to 3, and each of p and q is 0 or an integer of 1 to 2, provided that $1\leqq a+b \leqq 4$ and $0\leqq p+q \leqq 2$, and derivatives thereof.

59. A method of producing a polyester comprising:
contacting an acid component and an alcohol component in the presence of a catalyst,
the polyester having a glycol component consisting mainly of at least one of ethylene glycol, 1,3-propanediol, 1,4-butanediol, and 1,4-cyclohexane dimethanol,
the catalyst comprising
at least one metal-containing component having substantially no catalytic activity for a polyester polymerization, selected from the group consisting of metals and metal compounds, wherein said metal-containing component comprises no antimony or germanium; and
an organic compound component having substantially no catalytic activity for a polyester polymerization,
wherein said organic compound component is at least one compound containing at least one moiety represented by Formula 4:

(Formula 4)

wherein Ar represents an aryl group, each of $X^2$ and $X^3$ independently represents hydrogen, a hydrocarbyl group, an acyl group, a sulfonyl-containing group, a phosphoryl-containing group or an ether-group-containing hydrocarbyl group;

wherein the metal containing component and the organic compound component are added separately, and wherein the compound containing the at least one moiety represented by said Formula 4 is a compound selected from the group consisting of a chroman derivative represented by Formula 30 and an isochroman derivative represented by Formula 32:

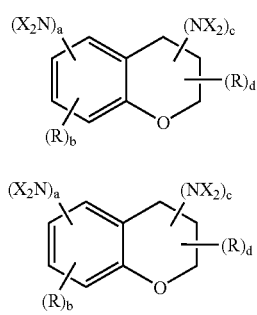

wherein each R is the same or different and represents a C₁-C₂₀ hydrocarbyl group, a hydroxyl group- or halogen group-carrying C₁-C₂₀ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each X is the same or different and represents hydrogen, a C₁-C₂₀ hydrocarbyl group, a hydroxyl group- or halogen group-carrying C₁-C₂₀ hydrocarbyl group, an acyl group, a sulfonyl-containing group, a phosphoryl-containing group or an ether-group-containing hydrocarbyl group, a is an integer of 1 to 3, b is 0 or an integer of 1 to 3, each of c and d is 0 or an integer of 1 to 3, provided that 1≦a+b≦4 and 0≦c+d≦3, and derivatives thereof.

60. A method of producing a polyester comprising:

contacting an acid component and an alcohol component in the presence of a catalyst, the polyester having a glycol component consisting mainly of at least one of ethylene glycol, 1,3-propanediol, 1,4-butanediol, and 1,4-cyclohexane dimethanol, the catalyst comprising at least one metal-containing component having substantially no catalytic activity for a polyester polymerization, selected from the group consisting of metals and metal compounds, wherein said metal-containing component comprises no antimony or germanium; and an organic compound component having substantially no catalytic activity for a polyester polymerization, wherein said organic compound component is at least one compound containing at least one moiety represented by Formula 4:

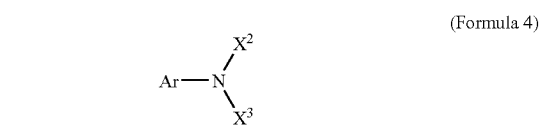

wherein Ar represents an aryl group, each of X² and X³ independently represents hydrogen, a hydrocarbyl group, an acyl group, a sulfonyl-containing group, a phosphoryl-containing group or an ether-group-containing hydrocarbyl group;

wherein the metal containing component and the organic compound component are added separately, and wherein the compound containing the at least one moiety represented by said Formula 4 is a compound selected from the group consisting of a naphthalene derivative represented by Formula 34 and a bisnaphthyl derivative represented by Formula 36:

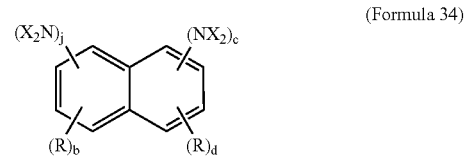

wherein each R is the same or different and represents a C₁-C₂₀ hydrocarbyl group, a hydroxyl group- or halogen group-carrying C₁-C₂₀ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each X is the same or different and represents hydrogen, a C₁-C₂₀ hydrocarbyl group, a hydroxyl group- or halogen group-carrying C₁-C₂₀ hydrocarbyl group, an acyl group, a sulfonyl-containing group, a phosphoryl-containing group or an ether-group-containing hydrocarbyl group, each of j, b, c and d is 0 or an integer of 1 to 3, provided that 0≦j+b≦4, 0≦c+d≦4 and 1≦j+c≦6,

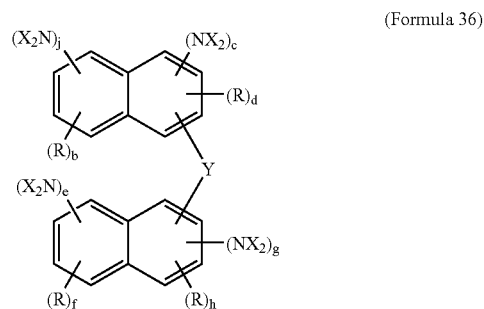

wherein each R is the same or different and represents a C₁-C₂₀ hydrocarbyl group, a hydroxyl group- or halogen group-carrying C₁-C₂₀ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each X is the same or different and represents hydrogen, a $C_1$-$C_{20}$ hydrocarbyl group, a hydroxyl group- or halogen group-carrying $C_1$-$C_{20}$ hydrocarbyl group, an acyl group, a sulfonyl-containing group, a phosphoryl-containing group or an ether-group-containing hydrocarbyl group, Z represents a direct bond, a $C_1$-$C_{10}$ alkylene group, -(alkylene)-O—, -(alkylene)-S—, —O—, —S—, —$SO_2$—, —CO— or —COO—, each of j, b, c, d, e, f, g and h is 0 or an integer of 1 to 3, provided that $0 \leq j+b \leq 4$, $0 \leq c+d \leq 3$, $0 \leq e+f \leq 4$, $0 \leq g+h \leq 3$ and $1 \leq j+c+e+g \leq 12$, and derivatives thereof.

61. A method of producing a polyester comprising:
contacting an acid component and an alcohol component in the presence of a catalyst,
the polyester having a glycol component consisting mainly of at least one of ethylene glycol, 1,3-propanediol, 1,4-butanediol, and 1,4-cyclohexane dimethanol,
the catalyst comprising
at least one metal-containing component having substantially no catalytic activity for a polyester polymerization, selected from the group consisting of metals and metal compounds, wherein said metal-containing component comprises no antimony or germanium; and
an organic compound component having substantially no catalytic activity for a polyester polymerization,
wherein said organic compound component is at least one compound containing at least one moiety represented by Formula 4:

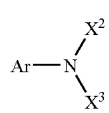

(Formula 4)

wherein Ar represents an aryl group, each of $X^2$ and $X^3$ independently represents hydrogen, a hydrocarbyl group, an acyl group, a sulfonyl-containing group, a phosphoryl-containing group or an ether-group-containing hydrocarbyl group;
wherein the metal containing component and the organic compound component are added separately, and
wherein the compound containing the at least one moiety represented by said Formula 4 is an anthracene derivative represented by Formula 38:

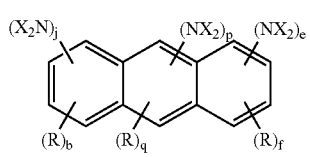

(Formula 38)

wherein each R is the same or different and represents a $C_1$-$C_{20}$ hydrocarbyl group, a hydroxyl group- or halogen group-carrying $C_1$-$C_{20}$ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each X is the same or different and represents hydrogen, a $C_1$-$C_{20}$ hydrocarbyl group, a hydroxyl group- or halogen group-carrying $C_1$-$C_{20}$ hydrocarbyl group, an acyl group, a sulfonyl-containing group, a phosphoryl-containing group or an ether-group-containing hydrocarbyl group, each of j, b, e and f is 0 or an integer of 1 to 3, each of p and q is 0 or an integer of 1 to 2, provided that $0 \leq j+b \leq 4$, $0 \leq p+q \leq 2$, $0 \leq e+f \leq 4$ and $1 \leq j+p+e \leq 8$.

62. A method of producing a polyester comprising:
contacting an acid component and an alcohol component in the presence of a catalyst,
the polyester having a glycol component consisting mainly of at least one of ethylene glycol, 1,3-propanediol, 1,4-butanediol, and 1,4-cyclohexane dimethanol,
the catalyst comprising
at least one metal-containing component having substantially no catalytic activity for a polyester polymerization, selected from the group consisting of metals and metal compounds, wherein said metal-containing component comprises no antimony or germanium; and
an organic compound component having substantially no catalytic activity for a polyester polymerization,
wherein said organic compound component is at least one compound containing at least one moiety represented by Formula 4:

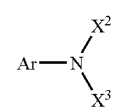

(Formula 4)

wherein Ar represents an aryl group, each of $X^2$ and $X^3$ independently represents hydrogen, a hydrocarbyl group, an acyl group, a sulfonyl-containing group, a phosphoryl-containing group or an ether-group-containing hydrocarbyl group;
wherein the metal containing component and the organic compound component are added separately, and
wherein the compound containing the at least one moiety represented by said Formula 4 is a benzoquinone derivative represented by Formula 40:

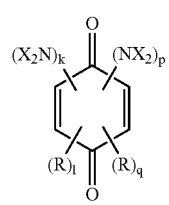

(Formula 40)

wherein each R is the same or different and represents a $C_1$-$C_{20}$ hydrocarbyl group, a hydroxyl group- or halogen group-carrying $C_1$-$C_{20}$ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each X is the same or different and represents hydrogen, a $C_1$-$C_{20}$ hydrocarbyl group, a hydroxyl group- or halogen group-carrying $C_1$-$C_{20}$ hydrocarbyl group, an acyl group, a sulfonyl-containing group, a phosphoryl-containing group or an ether-group-containing hydrocarbyl group, each of k, l, p and q is 0 or an integer of 1 to 2, provided that $0 \leq k+l \leq 2$, $0 \leq p+q \leq 2$ and $1 \leq k+p \leq 4$.

63. A method of producing a polyester comprising:
contacting an acid component and an alcohol component in the presence of a catalyst,
the polyester having a glycol component consisting mainly of at least one of ethylene glycol, 1,3-propanediol, 1,4-butanediol, and 1,4-cyclohexane dimethanol,
the catalyst comprising
at least one metal-containing component having substantially no catalytic activity for a polyester polymerization, selected from the group consisting of metals and metal compounds, wherein said metal-containing component comprises no antimony or germanium; and
an organic compound component having substantially no catalytic activity for a polyester polymerization,
wherein said organic compound component is at least one compound containing at least one moiety represented by Formula 4:

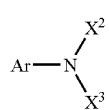

(Formula 4)

wherein Ar represents an aryl group, each of $X^2$ and $X^3$ independently represents hydrogen, a hydrocarbyl group, an acyl group, a sulfonyl-containing group, a phosphoryl-containing group or an ether-group-containing hydrocarbyl group;
wherein the metal containing component and the organic compound component are added separately, and
wherein the compound containing the at least one moiety represented by said Formula 4 is a naphthoquinone derivative represented by Formula 42:

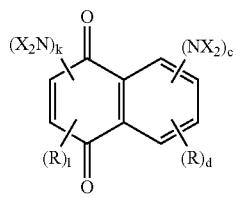

(Formula 42)

wherein each R is the same or different and represents a $C_1$-$C_{20}$ hydrocarbyl group, a hydroxyl group- or halogen group-carrying $C_1$-$C_{20}$ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each X is the same or different and represents hydrogen, a $C_1$-$C_{20}$ hydrocarbyl group, a hydroxyl group- or halogen group-carrying $C_1$-$C_{20}$ hydrocarbyl group, an acyl group, a sulfonyl-containing group, a phosphoryl-containing group or an ether-group-containing hydrocarbyl group, each of k and l is 0 or an integer of 1 to 2, each of c and d is 0 or an integer of 1 to 3, provided that $0 \leq k+l \leq 2$, $0 \leq c+d \leq 4$ and $1 \leq k+c \leq 5$.

64. A method of producing a polyester comprising:
contacting an acid component and an alcohol component in the presence of a catalyst,
the polyester having a glycol component consisting mainly of at least one of ethylene glycol, 1,3-propanediol, 1,4-butanediol, and 1,4-cyclohexane dimethanol,
the catalyst comprising
at least one metal-containing component having substantially no catalytic activity for a polyester polymerization, selected from the group consisting of metals and metal compounds, wherein said metal-containing component comprises no antimony or germanium; and
an organic compound component having substantially no catalytic activity for a polyester polymerization,
wherein said organic compound component is at least one compound containing at least one moiety represented by Formula 4:

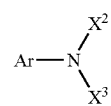

(Formula 4)

wherein Ar represents an aryl group, each of $X^2$ and $X^3$ independently represents hydrogen, a hydrocarbyl group, an acyl group, a sulfonyl-containing group, a phosphoryl-containing group or an ether-group-containing hydrocarbyl group;
wherein the metal containing component and the organic compound component are added separately, and
wherein the compound containing the at least one moiety represented by said Formula 4 is an anthraquinone derivative represented by Formula 44:

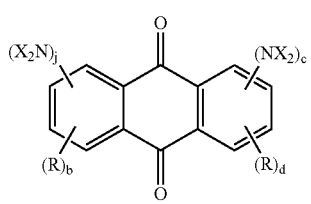

(Formula 44)

wherein each R is the same or different and represents a C$_1$-C$_{20}$ hydrocarbyl group, a hydroxyl group- or halogen group-carrying C$_1$-C$_{20}$ hydrocarbyl group, a halogen group, a carboxyl group or its ester, a formyl group, an acyl group, a group represented by (acyl)-O—, an amino group, a mono- or dialkylamino group, an amide group or its substituted form, a hydroxyl group, an alkoxyl group, an alkylthio group, a sulfonyl-containing group, a phosphoryl-containing group, a nitro group, a cyano group or a thiocyano group, each X is the same or different and represents hydrogen, a C$_1$-C$_{20}$ hydrocarbyl group, a hydroxyl group- or halogen group-carrying C$_1$-C$_{20}$ hydrocarbyl group, an acyl group, a sulfonyl-containing group, a phosphoryl-containing group or an ether-group-containing hydrocarbyl group, each of j, b, c and d is 0 or an integer of 1 to 3, provided that $0 \leq j+b \leq 4$, $0 \leq c+d \leq 4$ and $1 \leq j+c \leq 6$.

65. A method of producing a polyester comprising:
contacting an acid component and an alcohol component in the presence of a catalyst,
the polyester having a glycol component consisting mainly of at least one of ethylene glycol, 1,3-propanediol, 1,4-butanediol, and 1,4-cyclohexane dimethanol,
the catalyst comprising
at least one metal-containing component having substantially no catalytic activity for a polyester polymerization, selected from the group consisting of metals and metal compounds, wherein said metal-containing component comprises no antimony or germanium; and
an organic compound component having substantially no catalytic activity for a polyester polymerization,
wherein said organic compound component is at least one compound containing at least one moiety represented by Formula 4:

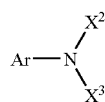

(Formula 4)

wherein Ar represents an aryl group, each of X$^2$ and X$^3$ independently represents hydrogen, a hydrocarbyl group, an acyl group, a sulfonyl-containing group, a phosphoryl-containing group or an ether-group-containing hydrocarbyl group;
wherein the metal containing component and the organic compound component are added separately, and
wherein the compound containing the at least one moiety represented by said Formula 4 is 2-aminobiphenyl represented by Formula 46:

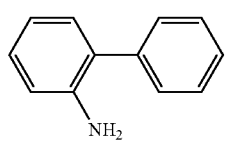

(Formula 46)

and derivatives thereof.

66. A method of producing a polyester comprising:
contacting an acid component and an alcohol component in the presence of a catalyst,
the polyester having a glycol component consisting mainly of at least one of ethylene glycol, 1,3-propanediol, 1,4-butanediol, and 1,4-cyclohexane dimethanol,
the catalyst comprising
at least one metal-containing component having substantially no catalytic activity for a polyester polymerization, selected from the group consisting of metals and metal compounds, wherein said metal-containing component comprises no antimony or germanium; and
an organic compound component having substantially no catalytic activity for a polyester polymerization,
wherein said organic compound component is at least one compound containing at least one moiety represented by Formula 4:

(Formula 4)

wherein Ar represents an aryl group, each of X$^2$ and X$^3$ independently represents hydrogen, a hydrocarbyl group, an acyl group, a sulfonyl-containing group, a phosphoryl-containing group or an ether-group-containing hydrocarbyl group;
wherein the metal containing component and the organic compound component are added separately, and
wherein the compound containing the at least one moiety represented by said Formula 4 is 7-amino-4-methylcoumarine represented by Formula 59:

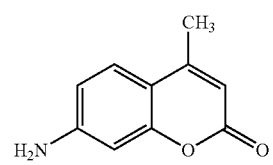

(Formula 59)

and derivatives thereof.

67. A method of producing a polyester comprising:
contacting an acid component and an alcohol component in the presence of a catalyst,
the polyester having a glycol component consisting mainly of at least one of ethylene glycol, 1,3-propanediol, 1,4-butanediol, and 1,4-cyclohexane dimethanol,
the catalyst comprising
at least one metal-containing component having substantially no catalytic activity for a polyester polymerization, selected from the group consisting of metals and metal compounds, wherein said metal-containing component comprises no antimony or germanium, and
an organic compound component having substantially no catalytic activity for a polyester polymerization, wherein said organic compound component is at least one compound containing at least one moiety represented by Formula 4:

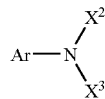

(Formula 4)

wherein Ar represents an aryl group, each of $X^2$ and $X^3$ independently represents hydrogen, a hydrocarbyl group, an acyl group, a sulfonyl-containing group, a phosphoryl-containing group or an ether-group-containing hydrocarbyl group;

wherein the metal containing component and the organic compound component are added separately, and wherein the compound containing the at least one moiety represented by said Formula 4 is 2-aminochromone represented by Formula 62:

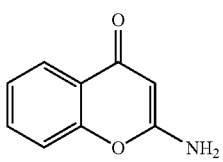

(Formula 62)

and derivatives thereof.

68. A method of producing a polyester comprising:

contacting an acid component and an alcohol component in the presence of a catalyst, the polyester having a glycol component consisting mainly of at least one of ethylene glycol, 1,3-propanediol, 1,4-butanediol, and 1,4-cyclohexane dimethanol, the catalyst comprising at least one metal-containing component having substantially no catalytic activity for a polyester polymerization, selected from the group consisting of metals and metal compounds, wherein said metal-containing component comprises no antimony or germanium; and an organic compound component having substantially no catalytic activity for a polyester polymerization, wherein said organic compound component is at least one compound containing at least one moiety represented by Formula 4:

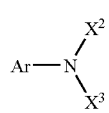

(Formula 4)

wherein Ar represents an aryl group, each of $X^2$ and $X^3$ independently represents hydrogen, a hydrocarbyl group, an acyl group, a sulfonyl-containing group, a phosphoryl-containing group or an ether-group-containing hydrocarbyl group;

wherein the metal containing component and the organic compound component are added separately, and wherein the compound containing the at least one moiety represented by said Formula 4 is a compound selected from the group consisting of 1,8-diaminonaphthalene represented by Formula 66, naphthol AS represented by Formula 67, and 1,1'-binaphthyl-2,2'-diamine represented by Formula 69:

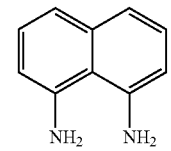

(Formula 66)

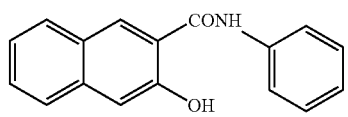

(Formula 67)

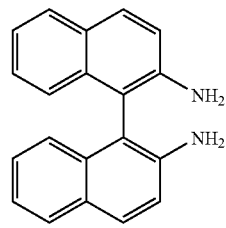

(Formula 69)

and derivatives thereof.

69. A method of producing a polyester comprising:

contacting an acid component and an alcohol component in the presence of a catalyst, the polyester having a glycol component consisting mainly of at least one of ethylene glycol, 1,3-propanediol, 1,4-butanediol, and 1,4-cyclohexane dimethanol, the catalyst comprising at least one metal-containing component having substantially no catalytic activity for a polyester polymerization, selected from the group consisting of metals and metal compounds, wherein said metal-containing component comprises no antimony or germanium; and an organic compound component having substantially no catalytic activity for a polyester polymerization, wherein said organic compound component is at least one compound containing at least one moiety represented by Formula 4:

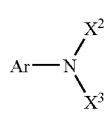

(Formula 4)

wherein Ar represents an aryl group, each of $X^2$ and $X^3$ independently represents hydrogen, a hydrocarbyl group, an acyl group, a sulfonyl-containing group, a phosphoryl-containing group or an ether-group-containing hydrocarbyl group;

wherein the metal containing component and the organic compound component are added separately, and wherein the compound containing the at least one moiety represented by said Formula 4 is 2-aminoanthracene represented by Formula 72:

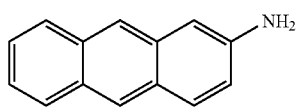

(Formula 72)

and derivatives thereof.

70. A method of producing a polyester comprising:

contacting an acid component and an alcohol component in the presence of a catalyst, the polyester having a glycol component consisting mainly of at least one of ethylene glycol, 1,3-propanediol, 1,4-butanediol, and 1,4-cyclohexane dimethanol, the catalyst comprising at least one metal-containing component having substantially no catalytic activity for a polyester polymerization, selected from the group consisting of metals and metal compounds, wherein said metal-containing component comprises no antimony or germanium; and an organic compound component having substantially no catalytic activity for a polyester polymerization, wherein said organic compound component is at least one compound containing at least one moiety represented by Formula 4:

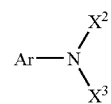

(Formula 4)

wherein Ar represents an aryl group, each of $X^2$ and $X^3$ independently represents hydrogen, a hydrocarbyl group, an acyl group, a sulfonyl-containing group, a phosphoryl-containing group or an ether-group-containing hydrocarbyl group;

wherein the metal containing component and the organic compound component are added separately, and wherein the compound containing the at least one moiety represented by said Formula 4 is 2-aminonaphthoquinone represented by Formula 75:

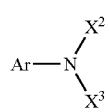

(Formula 75)

and derivatives thereof.

71. A method of producing a polyester comprising:

contacting an acid component and an alcohol component in the presence of a catalyst, the polyester having a glycol component consisting mainly of at least one of ethylene glycol, 1,3-propanediol, 1,4-butanediol, and 1,4-cyclohexane dimethanol, the catalyst comprising at least one metal-containing component having substantially no catalytic activity for a polyester polymerization, selected from the group consisting of metals and metal compounds, wherein said metal-containing component comprises no antimony or germanium; and an organic compound component having substantially no catalytic activity for a polyester polymerization, wherein said organic compound component is at least one compound containing at least one moiety represented by Formula 4:

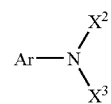

(Formula 4)

wherein Ar represents an aryl group, each of $X^2$ and $X^3$ independently represents hydrogen, a hydrocarbyl group, an acyl group, a sulfonyl-containing group, a phosphoryl-containing group or an ether-group-containing hydrocarbyl group;

wherein the metal containing component and the organic compound component are added separately, and wherein the compound containing the at least one moiety represented by said Formula 4 is a compound selected from the group consisting of 1,4-diaminoanthraquinone represented by Formula 81, 1,8-diamino-4,5-dihydroxyanthraquinone represented by Formula 82 and acid blue 25 represented by Formula 83:

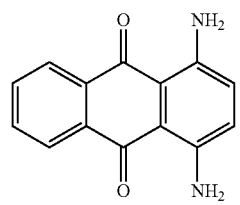

(Formula 81)

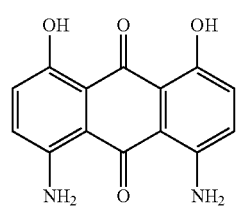

(Formula 82)

-continued

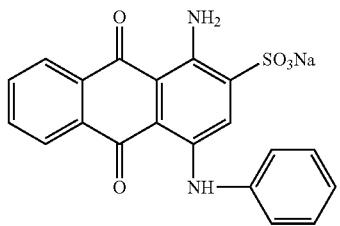

(Formula 83)

and derivatives thereof.

72. The method according to claim 1, wherein TD<25%, wherein TD is the percent reduction in the intrinsic viscosity after keeping 1 gram of a polymerized polyethylene terephthalate in a melted state in a glass tube under a nitrogen atmosphere at 300° C. for 2 hours, wherein prior to testing in the glass tube, the polymerized polyethylene terephthalate having an initial intrinsic viscosity of 0.6 dl/g is dried at 130° C. for 12 hours in vacuum.

73. The method according to claim 1, wherein the catalyst is contacted with the acid component and the alcohol component by adding the catalyst as a powder, as neat, or as a slurry.

* * * * *